(12) United States Patent
Wakamiya et al.

(10) Patent No.: US 6,604,682 B2
(45) Date of Patent: Aug. 12, 2003

(54) METHOD OF AND APPARATUS FOR READING A TWO-DIMENSIONAL BAR CODE SYMBOL AND DATA STORAGE MEDIUM

(75) Inventors: Hitomi Wakamiya, Shiojiri (JP); Shinichi Arazaki, Shimusuwa-machi (JP); Fumio Koyama, Suwa (JP); Satoshi Yanagida, Shiojiri (JP); Haruyoshi Ohori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 09/828,453

(22) Filed: Apr. 6, 2001

(65) Prior Publication Data

US 2002/0020747 A1 Feb. 21, 2002

(30) Foreign Application Priority Data

Apr. 6, 2000 (JP) .................................. 2000-104970
Jul. 3, 2000 (JP) .................................. 2000-201279
Aug. 4, 2000 (JP) .................................. 2000-237086
Nov. 22, 2000 (JP) .................................. 2000-355940

(51) Int. Cl.⁷ .............................................. G06K 7/10
(52) U.S. Cl. ......................... 235/462.01; 235/462.1; 235/462.25
(58) Field of Search .................. 235/462.01, 462.07, 235/462.08, 462.09, 462.24, 462.25, 462.41, 462.11

(56) References Cited

U.S. PATENT DOCUMENTS

| | | | | |
|---|---|---|---|---|
| 4,889,367 A | * | 12/1989 | Miller .................... | 235/462.01 |
| 5,189,292 A | | 2/1993 | Batterman et al. .......... | 235/494 |
| 5,515,447 A | | 5/1996 | Zheng et al. | |
| 5,591,956 A | * | 1/1997 | Longacre, Jr. et al. ...... | 235/494 |
| 5,637,849 A | | 6/1997 | Wang et al. | |
| 5,742,041 A | * | 4/1998 | Liu ........................ | 235/462.01 |
| 5,761,219 A | * | 6/1998 | Maltsev ..................... | 235/437 |
| 5,786,583 A | | 7/1998 | Maltsev | |
| 6,094,509 A | | 7/2000 | Zheng et al. | |
| 6,122,410 A | | 9/2000 | Zheng et al. | |
| 6,267,296 B1 | * | 7/2001 | Ooshima et al. ............ | 235/487 |
| 6,302,329 B1 | * | 10/2001 | Iwai et al. .................. | 235/494 |
| 6,412,695 B1 | * | 7/2002 | Reber et al. ........... | 235/462.07 |

FOREIGN PATENT DOCUMENTS

| | | |
|---|---|---|
| JP | 10-21322 | 1/1998 |
| JP | 10-501082 | 1/1998 |
| JP | 2764224 | 4/1998 |
| JP | 2771899 | 4/1998 |
| WO | 95/34043 | 12/1995 |
| WO | WO 95/34043 | 12/1995 |

* cited by examiner

*Primary Examiner*—Daniel St. Cyr
(74) *Attorney, Agent, or Firm*—Hogan & Hartson, LLP

(57) ABSTRACT

A two-dimensional bar code reading method and apparatus search the finder pattern in a scanned image of a two-dimensional bar code symbol, find orientation modules, find data modules, and convert the symbol to data characters as part of the decoding process for the scanned image of a MaxiCode symbol. In the data module search part of a MaxiCode symbol decoding process, position and shape information is calculated for data modules on an orientation axis, assuming an orientation axis passing the finder pattern center point, inside orientation module center point, and outside orientation module center point (step to S1801). Based on pixel data corresponding to the calculated location of the center point in each module, a bit pattern is generated where black data cells are 1 bits and white cells are 0 bits (S1802). The locations of MaxiCode symbol data modules in the area between orientation axes are then calculated (S1803). Pixel data corresponding to the calculated location of the center point of each data module is then converted to a bit pattern where black data cells are 1 bits and white data cells are 0 bits (S1804), and the data module search process then ends.

65 Claims, 61 Drawing Sheets

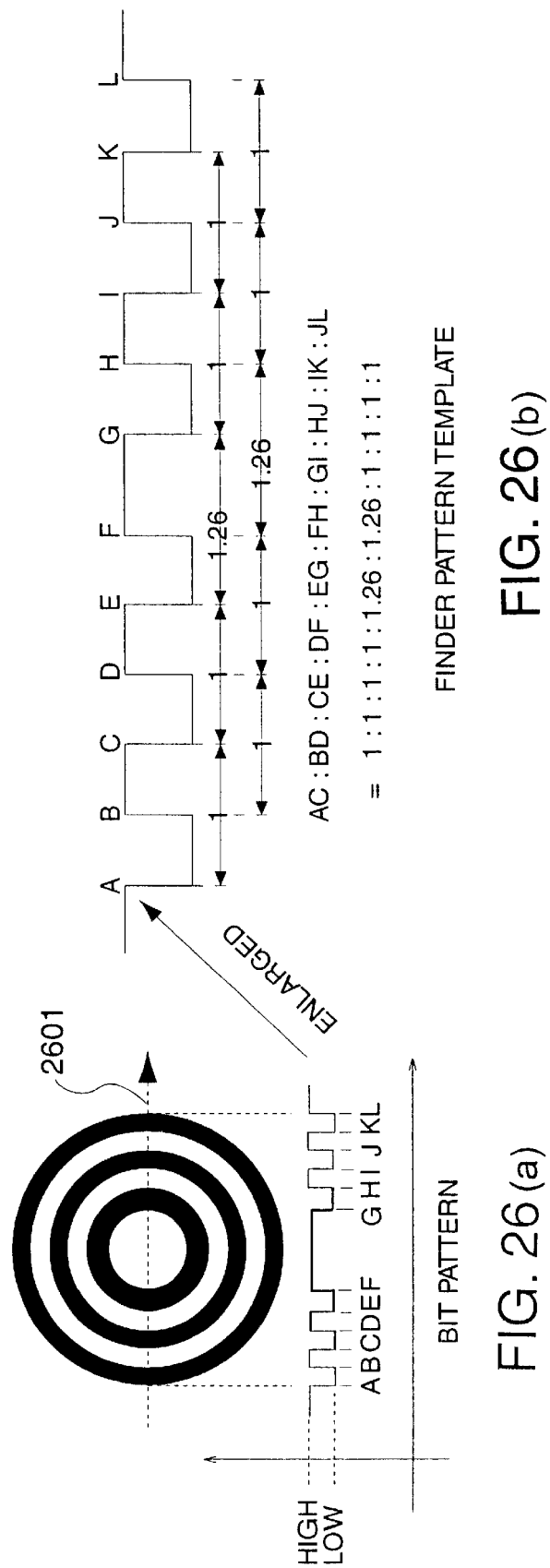

FIG. 33(a)
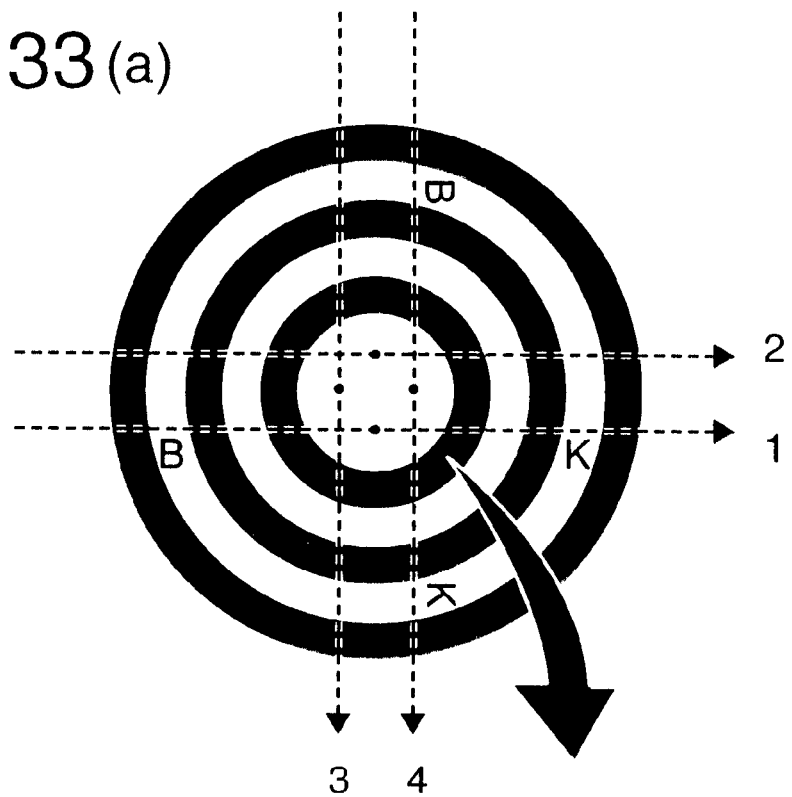
ENLARGED
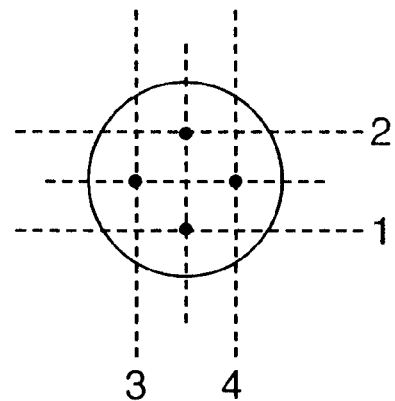
FIG. 33(b)

CIRCLE ON RADIUS L1
(W = (HEIGHT OF FINDER PATTERN LONG AXIS)/RATE)

| INSIDE | 1 | 0 | 1 | 1 | 0 | 1 | 1 | 0 | 1 | 1 | 0 | 1 |
|---|---|---|---|---|---|---|---|---|---|---|---|---|
| OUTSIDE | 0 | 0 | 1 | 0 | 1 | 1 | 0 | 0 | 1 | 0 | 1 | 1 |
| CENTER | 1 | 0 | 1 | 1 | 1 | 0 | 1 | 0 | 1 | 1 | 1 | 0 |

| SEQUENCE: | 0 | 1 | 2 | 3 | 4 | 5 |
|---|---|---|---|---|---|---|
| INSIDE: | BLACK | WHITE | BLACK | BLACK | WHITE | BLACK |
| OUTSIDE | WHITE | WHITE | BLACK | WHITE | BLACK | BLACK |
| CENTER: | BLACK | WHITE | BLACK | BLACK | BLACK | WHITE |

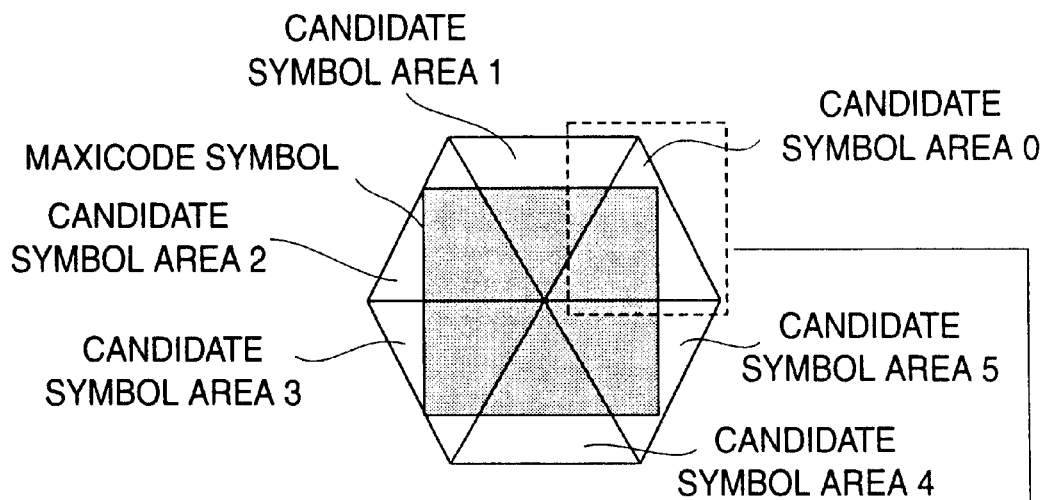
FIG. 46(a)
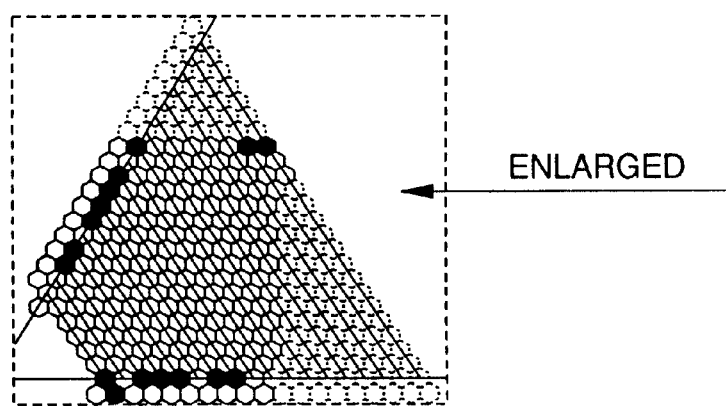
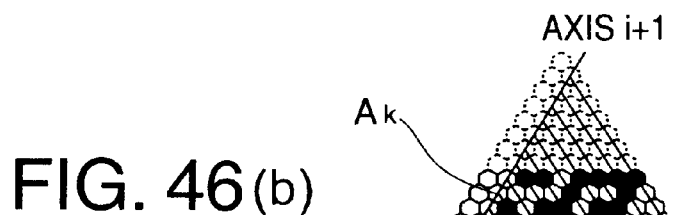
FIG. 46(b)

| (23.0) 7936 | (24.0) 8193 | (25.0) 8192 | (26.0) 8449 | (27.0) 8448 | (28.0) 37120 | (29.0) 37120 |
|---|---|---|---|---|---|---|
| (23.1) 7938 | (24.1) 8195 | (25.1) 8194 | (26.1) 8451 | (27.1) 8450 | (28.1) 34816 | |
| (23.2) 7940 | (24.2) 8197 | (25.2) 8196 | (26.2) 8453 | (27.2) 8452 | (28.2) 34818 | (29.2) 34817 |
| (23.3) 9216 | (24.3) 8961 | (25.3) 8980 | (26.3) 8705 | (27.3) 8704 | (28.3) 34819 | |

CODEWORD MATRIX (PARTIAL)

FIG. 56

| SYMBOL CHARACTERS (CODEWORDS) | Code Set A | Code Set B | ----- |
|---|---|---|---|
| 0(00000000) | CR | ' | |
| 1(00000001) | A | a | |
| 2(00000010) | B | b | |
| 3(00000011) | C | c | |
| 4(00000100) | D | d | |
| 5(00000101) | E | e | |
| 6(00000110) | F | f | |
| - | - | - | |
| - | - | - | |
| - | - | - | |
| - | - | - | |

DEFAULT CHARACTER SET (PARTIAL)

FIG. 58

METHOD OF AND APPARATUS FOR READING A TWO-DIMENSIONAL BAR CODE SYMBOL AND DATA STORAGE MEDIUM

BACKGROUND OF THE INVENTION

1. Field of the Invention

The present invention relates to a two-dimensional bar code reading method, a data storage medium carrying a computer program product embodying the method, and two-dimensional bar code reading apparatus. More particularly, the present invention relates to a two-dimensional bar code reading method, data storage medium, and two-dimensional bar code reading apparatus for locating the finder pattern in an image captured by scanning a two-dimensional code symbol, locating the direction module, locating the data module, and converting the data module to data characters.

2. Description of Related Art

Bar codes are a type of automated recognition technology that developed in the retail industry as a way to look up information in a database about an item quickly and accurately. Bar codes have since evolved and found application in such diverse industries as warehousing and distribution, government, medicine, research, and event management. As bar codes and their applications have become more varied, demand for bar codes has spread to industries and applications for which traditional bar codes are ill-suited, including bar code miniaturization for imprinting on very small items and high coding capacity. Two-dimensional bar codes addressing these needs have been developed in recent years.

There are two types of two-dimensional bar codes: stacked symbology (or multi-row codes), and matrix codes. Stacked symbologies comprise multiple rows of one-dimensional bar codes stacked in a vertical alignment. Stacked symbologies can be read using a laser scanner, CCD scanner, or other scanning method. Matrix codes encode data using black and white data cells arranged in a pattern determined by the particular code protocol. Matrix codes can be read using a CCD image reader or other image sensing method.

One type of matrix code is called MaxiCode. MaxiCode was designed for sorting and tracking package shipments. Package delivery services in the United States use MaxiCode in their collection and distribution centers for shorting shipments by destination and for ship loading. The two-dimensional (2D) symbol generated and displayed according to the MaxiCode standard is referred to below as the MaxiCode symbol.

A typical MaxiCode symbol is shown in FIG. 59. FIG. 59(a) shows a complete MaxiCode symbol, and FIG. 59(b) shows the finder pattern and orientation module of the MaxiCode symbol.

As shown in FIG. 59(a), a finder pattern 5901 is positioned at the center of every MaxiCode symbol 5900. Every finder pattern 5901 comprises six concentric parts, including a white center circle, two white rings, and three black rings. The finder pattern 5901 is used to locate and isolate the MaxiCode symbol 5900 from the captured image. The center of the MaxiCode symbol is identified by locating the center of the finder pattern 5901.

The space within the MaxiCode symbol around the finder pattern 5901 is populated by module groups consisting in total of 884 black or white interlocking modules 5902. Each module 5902 is a regular hexagon. The module groups consist of six orientation module groups 5903 and a data module group. Each orientation module group consists of the 3 orientation modules indicating the orientation of the MaxiCode symbol 5900. The data module group consists of the 864 data modules representing the encoded data; one data module corresponds to one data bit. Data modules are used for encoding data, and are used for error correction processing. Note that the two modules at the top right of the symbol are not used.

As shown in FIG. 59(b), the regular hexagon module 5902 is sized so that it is internally tangent to the white center bullseye of the finder pattern 5901. The orientation module groups 5903 define a virtual regular hexagon of which the center is the center point 0 of the finder pattern 5901. Each orientation module group 5903 includes an inside orientation module 5904, outside orientation module 5905, and center orientation module 5906. The six orientation module groups 5903 thus comprise a total 18 orientation modules. Finding these 18 orientation modules identifies the orientation of the MaxiCode symbol and enables the data to be read from the data modules.

It should be noted here that in each orientation module group 5903 the inside orientation module 5904 is the one located at the shortest distance from the center point 0, the outside orientation module 5905 is the one located at the farthest distance from the center point 0, and the center orientation module 5906 is the one located at a distance from the center point 0 that is between the distance from center point 0 to the inside orientation module 5904 and the distance from center point 0 to the outside orientation module 5905.

An image sensing technique is used to read MaxiCode symbols, which as noted above are a type of two-dimensional code symbology. In other words, a MaxiCode symbol is captured as image data which is then interpreted (decoded). This operation is described more fully below.

The first step is to find the MaxiCode symbol finder pattern and orientation modules in the captured image, and then recognize the data modules. A bit pattern is then generated from the data modules, assigning a bit value of 1 to each dark (typically black) data module, and 0 to each light (typically white) data module. The resulting bit pattern is then converted to corresponding data characters to decode the data in the MaxiCode symbol. Various methods have been developed for decoding the scanned image of a MaxiCode symbol.

It is always necessary to find the center of the finder pattern to decode a MaxiCode to symbol. JP-A-10-21322 teaches one method for finding the center of the finder pattern.

This method first finds all Jordan curves having an angular distance between two points less than $\Sigma$; then, finds all convex Jordan curves within the found Jordan curves; determines the equations of a pair of tangents from the end points of each convex Jordan curve; determines the equations of the center lines for each pair of tangents; determines the point of intersection of the center lines; and thus finds the center point of the finder pattern based on the intersection of the center lines. Decoding the MaxiCode symbol then proceeds.

A problem with the method taught in JP-A-10-21322 is that processing is time-consuming because of the steps needed to isolate all convex Jordan curves from among all Jordan curves found, then determine the equations of the tangents, and finally look for the center of the finder pattern of the symbol.

A method using templates to find the center of the finder pattern is taught in WO95/34043. However, WO95/34043 simply says that the six symbol axes, which are offset 60 degrees each, pass through the center of the bull's-eye, and that the center of the template is overlaid to the center of the bull's-eye. It says nothing specific about how to overlay the template with the center of the bull's-eye.

Finding the orientation modules is also important, and various methods of accomplishing this have been proposed. Finding the orientation modules is essentially finding the location and shape of the orientation modules. By finding the location and shape of the orientation modules it is not only possible to detect the location of each data module based on the dimensions of a MaxiCode symbol module, it is also possible to identify the color, that is, the bit value, of the detected data modules.

FIG. 60 shows module groups in a MaxiCode symbol. As shown in FIG. 60, module group 6000 comprises orientation module groups 6001a, 6001b, 6001c, 6001d, 6001e, 6001f, each containing plural orientation modules as noted above, and data module group 6002 comprising the individual data modules. Note, further, that the bit pattern (where black=1 and white=0) of the three orientation modules constituting each of the six orientation module groups 6001a, 6001b, 6001c, 6001d, 6001e, 6001f differs according to the orientation. Various methods have therefore been proposed for locating the orientation modules, but each of these methods requires a complex process. The orientation module location process is therefore time-consuming.

Various methods have also been proposed for detecting data module locations based on the found orientation modules, and converting the bit pattern corresponding to the colors of the detected modules to data characters in a single continuous process. These methods also necessitate a complex process, and are therefore also time-consuming.

The process for decoding the scanned MaxiCode symbol image can decode scanned images captured as direct frontal images. However, depending upon where on the packages to be stored the respective MaxiCode symbol is placed and the location of the two-dimensional bar code scanner, the MaxiCode symbol is not necessarily captured as a frontal view. In practice, it is commonly necessary to decode scanned images captured at an angle, but it is often not possible to decode such images.

FIG. 62 shows the relationship between an actual MaxiCode symbol and the captured scanned image of the MaxiCode symbol. FIG. 62(a) shows the relationship between a MaxiCode symbol scanned from the front and the resulting scanned image, and FIG. 62(b) shows the relationship between a MaxiCode symbol scanned from an angle and the resulting scanned image.

As shown in FIG. 62(a), the scanned image of a MaxiCode symbol scanned from the front and the actual MaxiCode symbol are similar. More specifically, the relative positions of the finder pattern and various modules in the scanned image of the MaxiCode symbol are the same as the relative positions of the finder pattern and modules in the actual MaxiCode symbol. The shapes of the finder pattern and modules in the scanned image are also similar to the finder pattern and modules in the actual MaxiCode symbol.

When the scanned image of a MaxiCode symbol captured from an angle is compared with the actual MaxiCode symbol, however, the relative positions of the finder pattern and modules in the scanned image are obviously different from the relative positions of the finder pattern and modules in the actual MaxiCode symbol as shown in FIG. 62(b). In addition, the shapes of the finder pattern and modules in the scanned image are not similar to the shape of the finder pattern and modules in the actual MaxiCode symbol, instead the scanned image is deformed. It is therefore generally difficult to recognize the position and colors of the data modules constituting the MaxiCode symbol.

Decoding scanned images of MaxiCode symbols, which is a typical two-dimensional bar code symbology, when the image is captured at an angle is thus subject to a high error rate, making it impossible in some cases to decode the MaxiCode symbol.

Resolving this problem has required a distortion correction operation to convert distorted scanned images to images with no distortion. A commonly used distortion correction method is normalization.

FIG. 63 is used below to describe distortion correction of an image using normalization. FIG. 63(a) shows two types of distortion, and FIG. 63(b) shows a scanned image decoding process using normalization.

As shown in FIG. 63(a), distorted images can have perspective distortion or rotational distortion. Both types can be corrected to distortion-free images through normalization. As shown in FIG. 63(b), a process for decoding a distorted scanned image first extracts the symbol image, then normalizes the extracted image, and finally decodes the distortion-corrected image to read the information encoded in the symbol.

As shown in FIG. 59 and described above, a MaxiCode symbol has the finder pattern located in the center thereof with all surrounding modules being regular hexagons. As a result, is it difficult to mathematically characterize the symbol shape when the border around the symbol or the data modules at the vertices are white. Normalization, which is a common distortion correction technique, cannot be used to accurately normalize a distorted MaxiCode symbol.

Furthermore, even if normalization can be successfully applied to correct distortion, the correction process is quite time-consuming.

SUMMARY OF THE INVENTION

The present invention is directed to a solution for the above problems. More specifically, it is the object of the present invention to provide a method and a reading apparatus that allow shortening the time required for decoding a scanned image of a two-dimensional code system, in particular a MaxiCode symbol.

This is accomplished by finding the center point of the MaxiCode symbol finder pattern using a method that is simple, fast, and does not impose a high processing burden on the computer; correcting the scanned image based on the relationship between the two-dimensional bar code symbol and the scanned image of the two-dimensional bar code symbol so that a decoding process can be applied to a scanned image captured from an angle; detecting pixel data matching a color template pattern based on pixel data in the orientation module search range of the scanned image of the two-dimensional bar code symbol; finding all orientation modules based on the detected pixel data; finding all data modules based on the identified orientation modules; and converting the data modules to data characters based on the identified data modules.

As a result of our research into solutions for the above described problems, we demonstrated the following.

First, the center point of a finder pattern can be found in the scanned image of a MaxiCode symbol by detecting, from among the detection patterns on scan lines through the scanned image, a detection pattern matching a specific reference pattern along a scan line through the finder pattern center point.

In addition, the process time needed to detect module dimensions and the location of the center point of the orientation modules in the scanned image of a MaxiCode symbol based on detected pixel data can be shortened compared with conventional methods by detecting all pixel data color patterns disposed a specific distance from the finder pattern center point and at a specific angle interval.

Furthermore, scanned images of MaxiCode symbols captured from an angle can be decoded as well as MaxiCode symbols captured from the front by computing an equation correlating an actual MaxiCode symbol finder pattern to the scanned image of a MaxiCode symbol captured from an angle similarly to an equation correlating a circle to an ellipse, and using this equation to correct the scanned image.

Furthermore, the orientation axes of a distorted scanned image can be corrected in the scanned image of a MaxiCode symbol by correcting the orientation axis angle so that the axis passes orientation module and data module center points based on the area of black module groups on an orientation axis passing the center of the finder pattern and an orientation module.

Furthermore, the position and shape of modules on the orientation axes of a distorted scanned image can be corrected based on the area of same-color module groups on a corrected orientation axis, and the positions of data modules between orientation axes can be corrected based on the position and shape of modules on the corrected orientation axes.

We also demonstrated that by detecting module position and shape information based on a corrected scanned image, the processing time of a decoding process for decoding a scanned image of a MaxiCode symbol can be shortened.

Yet further, we also demonstrated that by converting the detected data modules to a bit sequence, storing the converted data to a bit matrix table, and converting the bit data to codewords based on a two-dimensional codeword conversion table, the process time for converting data to data characters can be shortened compared with conventional methods.

Based on the above research results, the object of the invention is achieved with a method as claimed in claims 1, 7, 15, 23 and 30, an apparatus as claimed in claims 35, 44, 52 and 59, and a data storage medium as claimed in claim 64, respectively. Preferred embodiments of the invention are subject-matter of the dependent claims.

A two-dimensional bar code reading method according to one aspect of our invention comprises a data module search step for calculating position and shape information for all modules constituting a two-dimensional bar code symbol by calculating an orientation axis passing through an orientation module and finder pattern center point in a scanned image of a two-dimensional bar code symbol based on finder pattern position, orientation module position, and orientation module shape information in the scanned image.

In another aspect of the present invention the data module search step comprises the following steps:(a) an orientation axis module position calculating step for calculating, based on finder pattern position information and orientation module position information and shape information, position and shape information for a plurality of modules constituting a module group on said orientation axis; (b) an orientation axis data module bit pattern detecting step for detecting a bit pattern of said plural data modules on the orientation axis calculated by the orientation axis module position calculating step; (c) a between-orientation axis module position calculating step for calculating, based on the position and shape information of the plural modules of the module group on the orientation axis calculated by the orientation axis module position calculating step, position information for a plurality of modules constituting a module group between adjacent orientation axes; and (d) a between-orientation axis data module bit pattern detecting step for detecting the bit pattern of the plural data modules present between the orientation axes calculated by the between-orientation axis module position calculating step.

In another aspect of the present invention the orientation axis module position calculating step comprises the following steps: (a) an orientation axis angle correcting step for correcting the angle of the orientation axis so that the orientation axis passes the center points of the plural modules constituting a module group on the orientation axis; (b) an orientation axis actual module width correcting step for calculating position information for a plurality of actual modules present on an orientation axis corrected by the orientation axis angle correcting step and based on the calculated position information correcting the module width, which is shape information for the plural actual modules; (c) an orientation axis candidate module width correcting step for calculating position information for a plurality of candidate modules present on the orientation axis based on actual module position and shape information calculated by the orientation axis actual module width correcting step.

In another aspect of the present invention the orientation axis angle correcting step comprises the following steps: (a) a first corrected center point calculating step for calculating, based on a black module group area containing one or a plurality of contiguous black modules present on the orientation axis, a first corrected center point of a black module closest to the finder pattern in the black module group; (b) a second corrected center point calculating step for calculating a second corrected black module center point based on the area of a black module group comprising one or a plurality of contiguous black modules including the black module present on a neighboring reserve axis parallel to an orientation axis adjacent to the orientation axis and passing through the first corrected black module center point calculated by the first corrected center point calculating step; (c) a center point calculating step for calculating a black module center point based on the second corrected black module center point calculated by the second corrected center point calculating step, and the area of a black module group comprising one or a plurality of contiguous black modules including the black module present on an orientation reserve axis passing the finder pattern center point; and (d) an orientation axis correction angle calculating step for calculating a correction angle of an orientation axis passing the finder pattern center point and black module center point calculated by the center point calculating step.

In another aspect of the present invention the orientation axis actual module width correcting step comprises a step for calculating a center point and module width of actual modules constituting a same-color actual module group based on the area of a same-color actual module group comprising one or a plurality of contiguous same-color actual modules on the same orientation axis.

In another aspect of the present invention the orientation axis candidate module width correcting step comprises the following steps: (a) a reference orientation axis detecting step for detecting a reference orientation axis as the orientation axis having the least correction of all orientation axes; (b) a step for calculating center points and module widths for a plurality of candidate modules present on an orientation axis based on shape information for the black module farthest from the finder pattern on the reference orientation axis detected by the reference orientation axis detecting step; and (c) a step for calculating center points and module widths for a plurality of candidate modules present on an orientation axis other than the reference orientation axis based on actual module and candidate module positions on the reference orientation axis.

Another aspect of the present invention is a two-dimensional bar code reading method comprising a finder pattern search step for searching a scanned image of a two-dimensional bar code symbol for a scan line where a detected pattern in a specific scanning direction matches a specified reference pattern, detecting a finder pattern in the scanned two-dimensional bar code symbol image based on plural searched scan lines, and obtaining finder pattern position and shape information.

In another aspect of the present invention the finder pattern search step comprises steps for: (a) scanning a scanned image of a two-dimensional bar code symbol in a first scanning direction; (b) obtaining a first detection pattern by means of the first scanning step; (c) comparing the first detection pattern obtained by step (b) with a previously stored specific reference pattern; (d) defining said scan line as a first center line when step (c) determines the first detection pattern matches the specific reference pattern; (e) scanning the finder pattern in a second scanning direction that is different from the first scanning direction; (f) obtaining a second detection pattern by means of the second scanning step; (g) comparing the second detection pattern with the previously stored specific reference pattern; (h) defining said scan line as a second center line when step (g) determines the second detection pattern matches the specific reference pattern; and (i) setting the intersection of the first center line and the second center line as the center point of the finder pattern.

In another aspect of the present invention the finder pattern search step comprises steps for: (a) scanning a scanned image of a two-dimensional bar code symbol in a first scanning direction; (b) obtaining a first detection pattern by means of the first scanning step; (c) comparing the first detection pattern obtained by step (b) with a previously stored specific reference pattern; (d) setting said scan line as a first center line when step (c) determines the first detection pattern matches the specific reference pattern; (e) setting the midpoint between the two intersections of the first center line and outside circumference member of the finder pattern as a first center point; (f) repeating steps (b) to (e) after shifting parallel to the first center line to find plural first center points; (g) calculating a distribution of said plural first center points to the second scanning direction, which is different from the first scanning direction; (h) detecting a segment where the distribution to the second scanning direction is highest as a first line segment where the number of plural first center points in the second scanning direction is highest; (i) scanning in a second scanning direction on a line where the number of plural center points in the second scanning direction is highest;(j) obtaining a second detection pattern by means of the second scanning step; (k) comparing the second detection pattern with the previously stored specific reference pattern; (l) setting said scan line as a second center line when step (k) determines the second detection pattern matches the specific reference pattern; and (m) setting the midpoint between the two intersections of the second center line and outside circumference member of the finder pattern as a second center point; (n) repeating steps (j) to (m) after shifting parallel to the second center line to find plural second center points; (o) calculating a distribution of said plural second center points to the first scanning direction; (p) detecting a segment where the distribution to the first scanning direction is highest as a second line segment where the number of plural second center points in the first scanning direction is highest; and (q) setting the finder pattern center point to the intersection of the first line segment and second line segment.

In another aspect of the present invention the finder pattern search step comprises steps for: (a) scanning a scanned image of a two-dimensional bar code symbol in a first scanning direction; (b) obtaining a first detection pattern by means of the first scanning step; (c) comparing the first detection pattern obtained by step (b) with a previously stored specific reference pattern; (d) setting the midpoint between the two intersections of the scan line and outside circumference member of the finder pattern as a first center point when step (c) detects a match between the first detection pattern and the specific reference pattern; (e) finding plural first center points by shifting parallel to the first scanning direction and repeating steps (b) to (d); (f) scanning the finder pattern in a second scanning direction, which is different from the first scanning direction; (g) obtaining a second detection pattern by means of the second scanning step; (h) comparing the second detection pattern with the previously stored specific reference pattern; (i) setting the midpoint between the two intersections of the scan line and outside circumference member of the finder pattern as a second center point when step (h) detects a match between the second detection pattern and the specific reference pattern; (j) finding plural second center points by shifting parallel to the second scanning direction and repeating steps (g) to (i); (k) setting the finder pattern center point to the intersection of a line connecting the plural first center points and a line connecting the plural second center points.

In another aspect of the present invention the finder pattern search step comprises steps for: (a) scanning a scanned image of a two-dimensional bar code symbol in a first scanning direction; (b) obtaining a first detection pattern by means of the first scanning step; (c) comparing the first detection pattern obtained by step (b) with a previously stored specific reference pattern; (d) setting a first center line to the scan line from which the first detection pattern was obtained when step (c) detects a match between the first detection pattern and the specific reference pattern; (e) setting the midpoint between the two intersections of the first center line and outside circumference member of the finder pattern as a first center point; (f) scanning a second scanning direction different from the first scanning direction through the first center point; (g) obtaining a second detection pattern by means of the second scanning step; (h) comparing the second detection pattern with the previously stored specific reference pattern; (i) setting a second center line to the scan line from which the second detection pattern was obtained when step (h) detects a match between the second detection pattern and the specific reference pattern; (j) setting the midpoint between the two intersections of the second center line and outside circumference member of the finder pattern as a second center point; (k) calculating two intersections of the first center line and inside circumference member of the finder pattern, and two intersections of the second center line and inside circumference member of the finder pattern, from the midpoint between two intersections of the second center line and outside circumference member of the finder pattern; and (l) setting a barycenter determined from the two intersections of the first center line and inside circumference member of the finder pattern, and two intersections of the second center line and inside circumference member of the finder pattern, as the finder pattern center point.

In another aspect of the present invention the second scanning direction is orthogonal to the first scanning direction.

In another aspect of the present invention the finder pattern consists of plural concentric black circles and white circles, and comparison of the specific reference pattern with the first detection pattern and/or second detection pattern uses a ratio between an edge-to-edge distance between concentric black circles, and an edge-to-edge distance between concentric white circles.

In another aspect of the present invention the finder pattern search step comprises: (a) a first step for comparing a detected black and white pattern of a finder pattern obtained by scanning in the first scanning direction with a specific black and white reference pattern; (b) a second step for comparing a detected black and white pattern of a finder pattern obtained by scanning in the second scanning direction with a specific black and white reference pattern; and (c) obtaining center coordinates of the finder pattern by means of the first step and second step.

Another aspect of the present invention is a two-dimensional bar code reading method comprising an image correction step for calculating an equation indicating a correlation between a two-dimensional bar code symbol and a scanned image of the two-dimensional bar code symbol, and correcting the scanned image of the two-dimensional bar code symbol based on the equation.

In another aspect of the present invention, the image correction step generates a relation table achieving a specific correction precision by means of the equation indicating a correlation between a two-dimensional bar code symbol and a scanned image of the two-dimensional bar code symbol, and correcting the scanned image by means of the relation table.

In another aspect of the present invention the two-dimensional bar code symbol exists on a specific plane in the image correction step.

In another aspect of the present invention the scanned image is an image captured from an angle in the image correction step.

In another aspect of the present invention the equation indicating a correlation between a two-dimensional bar code symbol and a scanned image of the two-dimensional bar code symbol is a bias angle correction equation, and the scanned image is corrected by computing the bias angle correction equation, in the image correction step.

In another aspect of the present invention a circle in the scanned image is an element of the two-dimensional bar code symbol, or the shape of a deformed circle in the scanned image approximates an ellipse when a center of an element of the two-dimensional bar code symbol is on a specific circle.

In another aspect of the present invention a bias angle correction table is generated by means of a bias angle correction equation for an ellipse based on a specific correction angle division indicative of a correction precision.

In another aspect of the present invention a value of the bias angle correction equation at an angle equal to the correction angle division plus a specific offset angle is added to the bias angle correction table.

A two-dimensional bar code reading method according to another aspect of the present invention comprises an orientation module search step for finding in a scanned image of a two-dimensional bar code symbol plural pixel data groups whereof a black or white color pattern matches a specific color template pattern, the pixel data groups being disposed a specific distance from a specific point and at a specific angle interval, detecting a plurality of orientation modules constituting an orientation module group in the scanned image of a two-dimensional bar code symbol based on the found plural pixel data groups, and obtaining position and shape information for the plural orientation modules.

In another aspect of the present invention the specific color template pattern in the orientation module search step comprises a first color template pattern, a second color template pattern, and a third color template pattern.

In another aspect of the present invention the specific distance in the orientation module search step differs according to the first color template pattern, second color template pattern, and third color template pattern.

In another aspect of the present invention the specific distance is the product of module width and a specific value.

In another aspect of the present invention the module width is calculated based on shape information for the finder pattern in the scanned image of the two-dimensional bar code symbol, and a rate, said rate being a specific interval value present in a specific range.

In another aspect of the present invention wherein the orientation module search step comprises steps for: calculating one center point candidate for an orientation module located at said specific distance based on plural same-distance candidates for orientation module center points, said plural same-distance candidates being plural pixel data groups found based on said specific distance; and calculating an orientation module center point position from orientation module center point candidates at plural specific distances calculated at said rate.

In another aspect of the present invention the orientation module search step comprises a step for converting position information of a scanned image of a two-dimensional bar code symbol so that the center point of a specific orientation module is in a specific position.

A two-dimensional bar code reading method according to another aspect of the present invention comprises a data character conversion step for converting data module bit data to codewords, and converting the converted codewords to specific data characters, by correlating the positions of data modules constituting a data module group in the scanned image of a two-dimensional bar code symbol to specific codewords and specific bit data in the specific codewords based on a specific codeword conversion table.

In another aspect of the present invention data module positions in the data character conversion step are specified by a bit matrix table having elements in matrix $BT(n,m)$.

In another aspect of the present invention said specific codeword is an i-th codeword, and said specific bit data in said specific codeword is a j-th bit of the i-th codeword, the specific codeword conversion table in the data character conversion step is a codeword matrix table of which values $CT(n,m)$ satisfy the following equations $i=[CT(n,m)/256]$ and $j=CT(n,m)-i*256$.

In each of the preceding aspects of the invention the two-dimensional bar code symbol encodes data by means of alternating black and white cells. In another aspect of the present invention the two-dimensional bar code symbol is a MaxiCode symbol.

One aspect of a two-dimensional bar code reading apparatus according to the present invention comprises a data module search unit for calculating position and shape information for all modules constituting a two-dimensional bar code symbol by calculating an orientation axis passing through an orientation module and finder pattern center point in a scanned image of a two-dimensional bar code symbol based on finder pattern position, orientation module position, and orientation module shape information in the scanned image.

In another aspect of a two-dimensional bar code reading apparatus wherein the data module search unit comprises: (a) an orientation axis module position calculating unit for calculating, based on finder pattern position information and orientation module position information and shape information, position and shape information for a plurality of modules constituting a module group on said orientation axis; (b) an orientation axis data module bit pattern detecting unit for detecting a bit pattern of said plural data modules on the orientation axis calculated by the orientation axis module position calculating unit; (c) a between-orientation axis module position calculating unit for calculating, based on the position and shape information of the plural modules of the module group on the orientation axis calculated by the orientation axis module position calculating unit, position information for a plurality of modules constituting a module group between adjacent orientation axes; and (d) a between-orientation axis data module bit pattern detecting unit for detecting the bit pattern of the plural data modules present between the orientation axes calculated by the between-orientation axis module position calculating unit.

In another aspect of a two-dimensional bar code reading apparatus the orientation axis module position calculating unit comprises: (a) an orientation axis angle correcting unit for correcting the angle of the orientation axis so that the orientation axis passes the center points of the plural modules constituting a module group on the orientation axis; (b) an orientation axis actual module width correcting unit for calculating position information for a plurality of actual modules present on an orientation axis corrected by the orientation axis angle correcting unit and based on the calculated position information correcting the module width, which is shape information for the plural actual modules; (c) an orientation axis candidate module width correcting unit for calculating position information for a plurality of candidate modules present on the orientation axis based on actual module position and shape information calculated by the orientation axis actual module width correcting unit.

In another aspect of a two-dimensional bar code reading apparatus the orientation axis angle correcting unit comprises: (a) a first corrected center point calculating unit for calculating, based on a black module group area containing one or a plurality of contiguous black modules present on the orientation axis, a first corrected center point of a black module closest to the finder pattern in the black module group; (b) a second corrected center point calculating unit for calculating a second corrected black module center point based on the area of a black module group comprising one or a plurality of contiguous black modules including the black module present on a neighboring reserve axis parallel to an orientation axis adjacent to the orientation axis and passing through the first corrected black module center point calculated by the first corrected center point calculating unit; (c) a center point calculating unit for calculating a black module center point based on the second corrected black module center point calculated by the second corrected center point calculating unit, and the area of a black module group comprising one or a plurality of contiguous black modules including the black module present on an orientation reserve axis passing the finder pattern center point; and (d) an orientation axis correction angle calculating unit for calculating a correction angle of an orientation axis passing the finder pattern center point and black module center point calculated by the center point calculating unit.

In another aspect of a two-dimensional bar code reading apparatus according to the present invention the orientation axis actual module width correcting unit comprises a calculating unit for calculating a center point and module width of actual modules constituting a same-color actual module group based on the area of a same-color actual module group comprising one or a plurality of contiguous same-color actual modules on the same orientation axis.

In another aspect of a two-dimensional bar code reading apparatus the orientation axis candidate module width correcting unit comprises: (a) a reference orientation axis detecting unit for detecting a reference orientation axis as the orientation axis having the least correction of all orientation axes; (b) a first computing unit for calculating center points and module widths for a plurality of candidate modules present on an orientation axis based on shape information for the black module farthest from the finder pattern on the reference orientation axis detected by the reference orientation axis detecting unit; and (c) a second computing unit for calculating center points and module widths for a plurality of candidate modules present on an orientation axis other than the reference orientation axis based on actual module and candidate module positions on the reference orientation axis.

Another aspect of a two-dimensional bar code reading apparatus according to the present invention comprises a finder pattern search unit for searching a scanned image of a two-dimensional bar code symbol for a scan line where a detected pattern in a specific scanning direction matches a specified reference pattern, detecting a finder pattern in the scanned two-dimensional bar code symbol image based on plural searched scan lines, and obtaining finder pattern position and shape information.

In another aspect of a two-dimensional bar code reading apparatus the finder pattern search unit comprises: (a) a scanning unit for scanning the finder pattern in plural directions; (b) a pattern detector for detecting a plurality of patterns by means of the scanning unit scanning plural directions; (c) memory for storing a specific template; (d) a comparison unit for comparing said plural patterns with each said specific template stored to memory; and (e) a decision unit for setting scan lines of the scanning unit as at least two center lines, and determining finder pattern center coordinates based on said two center lines.

In another aspect of a two-dimensional bar code reading apparatus the finder pattern search unit comprises: (a) a storage unit for prestoring a template determined by black and white pattern lengths; (b) a scanning unit for scanning the finder pattern in first and second scanning directions, and obtaining a black and white pattern; (c) a comparison unit for comparing black and white patterns of the finder pattern scanned by the scanning unit with said templates previously stored to the storage unit; (d) a decision unit for setting the first scan line scanned by the scanning unit as a first center line when the comparison unit determines the black and white pattern obtained by scanning in the first scanning direction matches the black and white pattern of the template, setting the second scan line scanned by the scanning unit as a second center line when the comparison unit determines the black and white pattern obtained by scanning in the second scanning direction matches the black and white pattern of the template, and setting the finder pattern center point to the intersection of the first center line and second center line.

Another aspect of a two-dimensional bar code reading apparatus according to the present invention comprises an image correction unit for calculating an equation indicating a correlation between a two-dimensional bar code symbol and a scanned image of the two-dimensional bar code symbol, and correcting the scanned image of the two-dimensional bar code symbol based on the equation.

In another aspect of a two-dimensional bar code reading apparatus according to the present invention the image correction unit generates a relation table achieving a specific correction precision by means of the equation indicating a correlation between a two-dimensional bar code symbol and a scanned image of the two-dimensional bar code symbol, and correcting the scanned image by means of the relation table.

In another aspect of a two-dimensional bar code reading apparatus according to the present invention the two-dimensional bar code symbol exists on a specific plane in the image correction unit.

In another aspect of a two-dimensional bar code reading apparatus according to the present invention the scanned image corrected by the image correction unit is an image captured from an angle.

In another aspect of a two-dimensional bar code reading apparatus the equation indicating a correlation between a two-dimensional bar code symbol and a scanned image of the two-dimensional bar code symbol is a bias angle correction equation, and the scanned image is corrected by computing the bias angle correction equation.

In another aspect of a two-dimensional bar code reading apparatus a circle in the scanned image is an element of the two-dimensional bar code symbol, or the shape of a deformed circle in the scanned image approximates an ellipse when a center of an element of the two-dimensional bar code symbol is on a specific circle.

In another aspect of a two-dimensional bar code reading apparatus a bias angle correction table is generated by means of a bias angle correction equation for an ellipse based on a specific correction angle division indicative of a correction precision.

In another aspect of a two-dimensional bar code reading apparatus according to the present invention a value of the bias angle correction equation at an angle equal to the correction angle division plus a specific offset angle is added to the bias angle correction table.

Another aspect of a two-dimensional bar code reading apparatus according to the present invention comprises an orientation module search unit for finding in a scanned image of a two-dimensional bar code symbol plural pixel data groups whereof a black or white color pattern matches a specific color template pattern, the pixel data groups being disposed a specific distance from a specific point and at a specific angle interval, detecting a plurality of orientation modules constituting an orientation module group in the scanned image of a two-dimensional bar code symbol based on the found plural pixel data groups, and obtaining position and shape information for the plural orientation modules.

In another aspect of a two-dimensional bar code reading apparatus according to the present invention the specific color template pattern in the orientation module search unit comprises a first color template pattern, a second color template pattern, and a third color template pattern.

In another aspect of a two-dimensional bar code reading apparatus according to the present invention the specific distance in the orientation module search unit differs according to the first color template pattern, second color template pattern, and third color template pattern.

In another aspect of a two-dimensional bar code reading apparatus according to the present invention the specific distance is the product of module width and a specific value.

In another aspect of a two-dimensional bar code reading apparatus according to the present invention the module width is calculated based on shape information for the finder pattern in the scanned image of the two-dimensional bar code symbol, and a rate, said rate being a specific interval value present in a specific range.

In another aspect of a two-dimensional bar code reading apparatus according to the present invention the orientation module search unit comprises: (a) a first calculating unit for calculating one center point candidate for an orientation module located at said specific distance based on plural same-distance candidates for orientation module center points, said plural same-distance candidates being plural pixel data groups found based on said specific distance; and (b) a second calculating unit for calculating an orientation module center point position from orientation module center point candidates at plural specific distances calculated at said rate.

In another aspect of a two-dimensional bar code reading apparatus according to the present invention the orientation module search unit comprises a conversion unit for converting position information of a scanned image of a two-dimensional bar code symbol so that the center point of a specific orientation module is in a specific position.

Another aspect of a two-dimensional bar code reading apparatus according to the present invention comprises a data character conversion unit for converting data module bit data to codewords, and converting the converted codewords to specific data characters, by correlating the positions of data modules constituting a data module group in the scanned image of a two-dimensional bar code symbol to specific codewords and specific bit data in the specific codewords based on a specific codeword conversion table.

In another aspect of a two-dimensional bar code reading apparatus according to the present invention data module positions in the data character conversion unit are specified by a bit matrix table with elements of matrix BT(n,m).

In another aspect of a two-dimensional bar code reading apparatus according to the present invention said specific codeword is an i-th codeword, and said specific bit data in said specific codeword is a j-th bit of the i-th codeword, the specific codeword conversion table in the data character conversion unit is a codeword matrix table of which values CT(n,m) satisfy the following equations:

$i=[CT(n,m)/256]$ $j=CT(n,m)-i*256.$

In another aspect of a two-dimensional bar code reading apparatus according to the present invention the two-dimensional bar code symbol encodes data by means of alternating black and white cells. Yet further preferably, the two-dimensional bar code symbol is a MaxiCode symbol.

One aspect of a data storage medium according to the present invention carries a program having steps of a two-dimensional bar code reading method according to the present invention.

Preferably, the data storage medium for recording a program according to the present invention is a Compact Disc, floppy disk, hard disk, magneto-optical disk, Digital Versatile Disc (DVD), magnetic tape, memory card or other computer readable medium.

Other objects and attainments together with a fuller understanding of the invention will become apparent and appreciated by referring to the following description of preferred embodiments taken in conjunction with the accompanying drawings.

BRIEF DESCRIPTION OF THE DRAWINGS

FIG. 26(a) shows the color pattern along line segments passing through the finder pattern center, and (b) shows a finder pattern template;

FIG. 33 shows another preferred embodiment of the present invention;

FIG. 46(a) shows an actual module and candidate module between axes, and (b) shows the location of the data module between axes;

FIG. 56 shows a codeword matrix table;

FIG. 58 shows the default character set table;

DESCRIPTION OF THE PREFERRED EMBODIMENTS

Preferred embodiments of the present invention are described below with reference to the accompanying figures. It should be noted that the following embodiments are described by way of example only, and shall not limit the scope of the accompanying claims. It will be obvious to one with ordinary skill in the related art that the present invention can also be achieved by modifying part or all of the below described elements with an equivalent, and that all such modifications are included within the scope of the present invention as defined by the appended claims.

Embodiment 1

Figure 1:
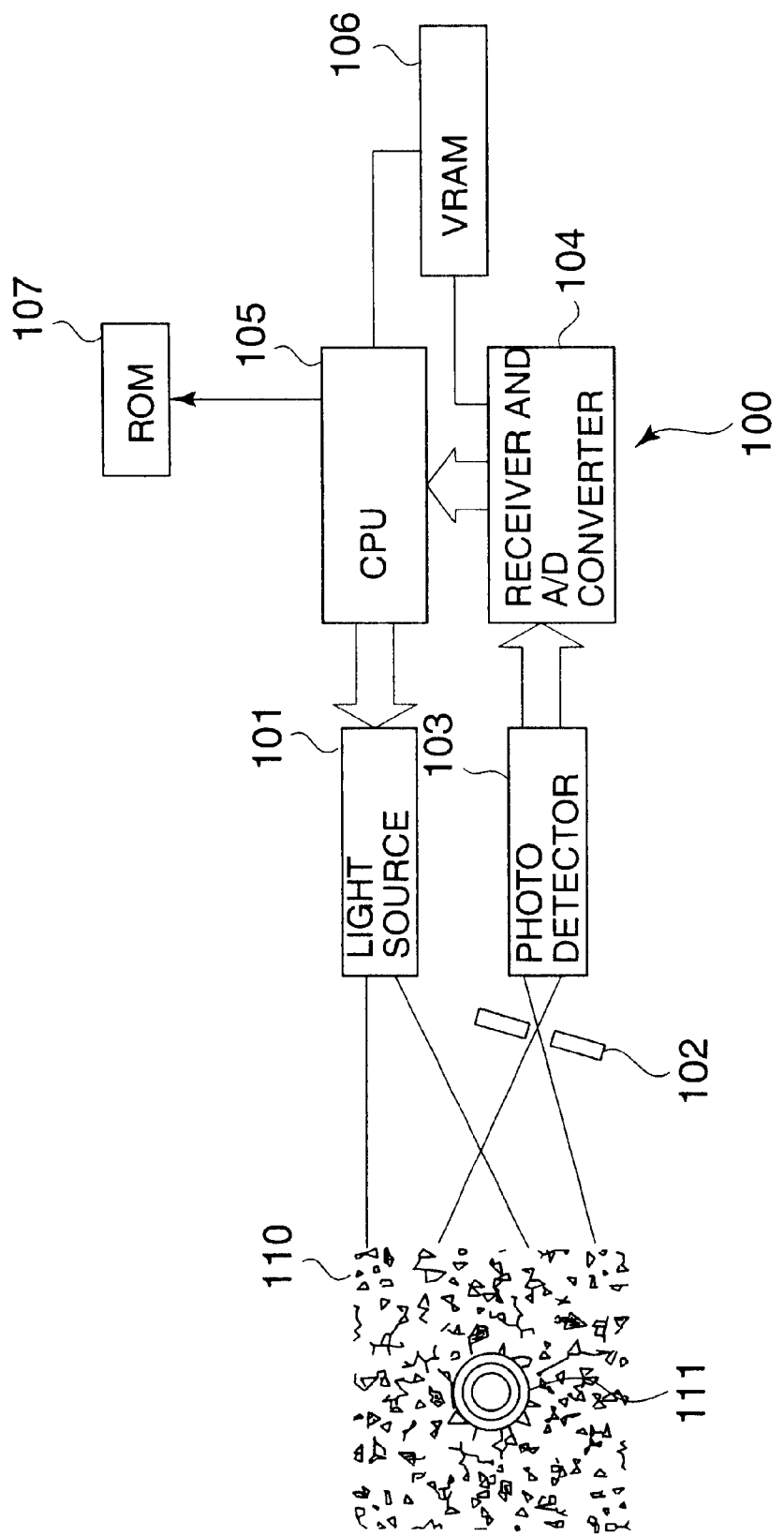
FIG. 1 is a block diagram of an apparatus according to a preferred embodiment of the present invention.

FIG. 1 is a block diagram showing the major elements of an apparatus for reading a two-dimensional bar code symbol (simply referred to as "bar code symbol" hereinafter) according to the present invention. These elements are described below.

As shown in FIG. 1, this bar code reader 100 has a light source 101, photodetector 103 with an aperture 102, receiver and A/D converter 104, CPU 105, VRAM 106, and ROM 107.

The light source 101 illuminates a MaxiCode symbol 110, and is typically a light-emitting diode or semiconductor laser. Photodetector 103 receives light reflected from the MaxiCode symbol 110, and converts the received light to an electrical signal. The photodetector 103 is typically a linear or two-dimensional CCD (charge-coupled device).

The receiver and A/D converter 104 receives the electrical signal from photodetector 103, and converts it to a signal that can be processed by the CPU 105. The CPU 105 applies a decoding process to the image signal.

The photodetector 103 generates an analog signal representing the modulated light reflected from the elements of the MaxiCode symbol 110. More specifically, the pixels of the CCD array of the photodetector 103 typically output an analog signal defining the intensity or amount of light reflected from a particular pixel, similarly to a common gray scale or video data signal.

The receiver part of the receiver and AID converter 104 receives the analog signal indicative of the modulated light, and the A/D converter section then converts the analog signal to a digital signal having the number of gray levels used by the CPU and sends the digital signal to the CPU 105. This exemplary embodiment uses 16 gray levels. The receiver and AID converter 104 then buffers the resulting digital signals to VRAM 106, S accumulating images of the MaxiCode symbol 110 represented by the digital signal. After processing the accumulated images, CPU 105 outputs the result to a peripheral device or host computer (not shown in the figure) by way of an interface.

It will be also be obvious that the image process run by this CPU 105 can be performed by the host computer.

Note that the receiver and A/D converter 104 and CPU 105 are both connected to VRAM 106. ROM 107 stores the control program run by the CPU 105, and specific values further described below.

As described before, the white center circle, two white rings, and three black rings in the center of the MaxiCode symbol 110 are the MaxiCode finder pattern 111, commonly referred to as the bullseye.

A two-dimensional bar code reading apparatus ("bar code reader" below) according to an embodiment of the present invention comprises a data module search unit for calculating location information and shape information for all modules constituting the bar code symbol. It accomplishes this by calculating orientation axes passing through the orientation modules and center point of the finder pattern based on the location of the finder pattern, the location of the orientation modules, and shape information about the orientation modules in the scanned image of the bar code symbol.

The bar code reader of an embodiment of the present invention further comprises a finder pattern search unit for finding scans line along which the pattern detected in the scanned image of the bar code symbol in a specific scanning direction matches a specific reference pattern, detecting the finder pattern in the scanned image of the bar code symbol based on the plural scan lines found, and obtaining location and shape information about the found finder pattern.

The bar code reader of an embodiment of the present invention further comprises an image correction unit for calculating an equation representing the relationship between the bar code symbol and the scanned image of the bar code symbol, and then correcting the scanned image of the bar code symbol based on the resulting equation.

The bar code reader of an embodiment of the present invention further comprises an orientation module search unit for finding in the scanned image of the bar code symbol plural pixel data groups of which the color pattern matches a specific color template pattern. The color patterns comprise black or white pixels of the respective pixel data group, which are a specific distance from a specific point in the scanned image and are disposed at a specific angular interval. Based on the found plural pixel data groups, a plurality of orientation modules constituting an orientation module group are detected in the scanned image of the bar code symbol, and the location and shape of these plural orientation modules are obtained.

The bar code reader of an embodiment of the present invention further comprises a data character conversion unit for converting data module bit data to codewords by correlating the position of the data modules constituting the data module group in the scanned image of the two-dimensional bar code symbol to specific codewords and specific bit values in the specific codewords based on a specific codeword conversion table, and then converting the resulting codewords to specific data characters.

The operation of a bar code reader thus comprised according to a preferred embodiment of the present invention is described next below with reference to the accompanying figures.

Figure 2:
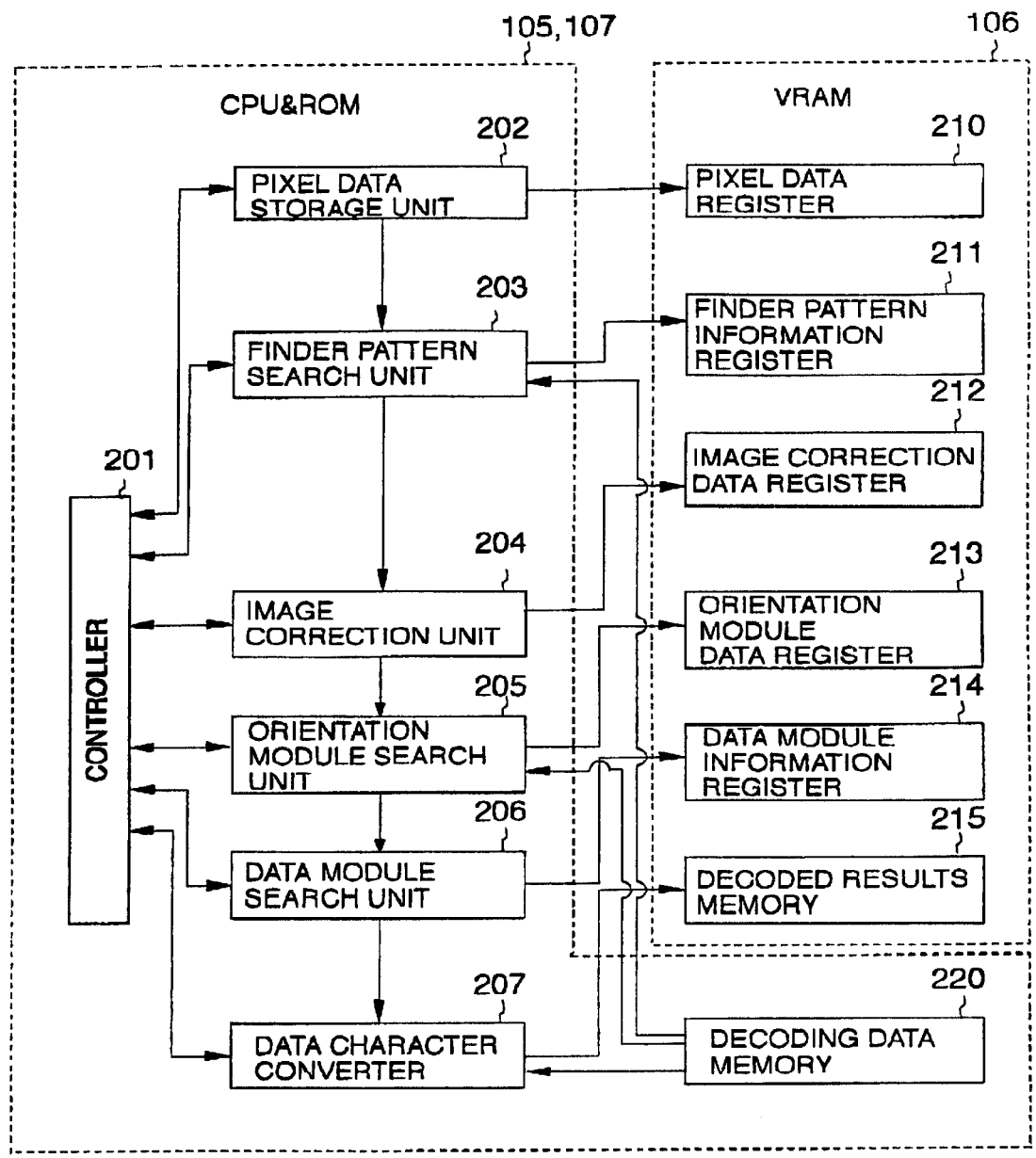
FIG. 2 is a function block diagram of an apparatus according to a preferred embodiment of the present invention.

FIG. 2 is a function block diagram of a two-dimensional bar code reading apparatus according to the present invention. The functions of the constituent parts are described below.

As shown in FIG. 2, this exemplary bar code reader comprises a controller 201, pixel data storage unit 202, finder pattern search unit 203, image correction unit 204, orientation module search unit 205, data module search unit 206, and data character converter 207.

The pixel data storage unit 202 stores image data from the scanned image captured by the photodetector 103 (not shown in the figure) to a pixel data register 210 in VRAM 106 as pixel data correlated to a specific pixel position.

The finder pattern search unit 203 searches for the finder pattern of the MaxiCode symbol based on pixel data stored to the pixel data register 210 of VRAM 106 and a specific reference pattern stored to decoding data memory 220, and then calculates the finder pattern shape information. The finder pattern shape information includes the center point, size, and shape of the finder pattern. The finder pattern search unit 203 then stores the finder pattern shape information to finder pattern information register 211 in VRAM 106.

Using the finder pattern shape information calculated from the finder pattern pixel data located by the finder pattern search unit 203, and shape information for an actual MaxiCode symbol, the image correction unit 204 calculates a bias angle correction equation for image data captured at an angle by photodetector 103. Using the resulting bias angle correction equation, the image correction unit 204 then generates a bias angle correction table, and then corrects the pixel data of the captured MaxiCode symbol image based on this bias angle correction table. The image correction unit 204 also stores the computed bias angle correction equation or table, and the corrected MaxiCode symbol image data, that is, the corrected pixel data, to image correction data register 212 in VRAM 106.

The orientation module search unit 205 searches for orientation modules based on the MaxiCode symbol image data corrected by the image correction unit 204, shape data for an actual MaxiCode symbol, and the specific color template pattern previously stored to decoding data memory 220, and calculates the location and shape information for the 18 (three in each of six directions) orientation modules. The orientation module search unit 205 also determines the orientation of the MaxiCode symbol from the calculated orientation module position information. The calculated orientation module position information and shape information is then stored to orientation module data register 213 in VRAM 106.

Based on the finder pattern shape information calculated by finder pattern search unit 203, and the orientation module position and shape information computed by the orientation module search unit 205, the data module search unit 206 finds all data modules in the MaxiCode symbol by correcting distortion in the image data captured by the photodetector 103, and calculates the data module position and shape information. The calculated data module position and shape information is then stored to data module information register 214 in VRAM 106.

The data character converter 207 then converts the color of every calculated data module to a bit pattern. This operation converts a white (light) data module to a bit value of 0, and a black (dark) data module to a bit value of 1, for example, and is referred to below as "bit conversion." The bit-converted data is then stored to a bit matrix table and, based on a codeword matrix table previously stored to decoding data memory 220, converted to data codewords each representing one character of data and error correction codewords representing error correction data. This step is referred to below as "codeword conversion." The data codewords are then restored to the correct data codewords by applying an error correction process using the error correction codewords.

The data codewords resulting from the error correction process are then converted to data characters based on a default character set table previously stored to decoding data memory 220. The data characters are stored to decoded results memory 215 in VRAM 106. Note that the bit-converted data, codeword-converted data, and error corrected data resulting from the above-noted intermediate steps in the data character conversion operation can also be stored to decoded results memory 215 in VRAM 106.

The controller 201 controls the operation and interaction of pixel data storage unit 202, finder pattern search unit 203, image correction unit 204, orientation module search unit 205, data module search unit 206, and data character converter 207.

A method of reading a two-dimensional bar code according to an embodiment of the present invention comprises a data module search step for calculating location information and shape information for all modules constituting the bar code symbol. It accomplishes this by calculating orientation axes passing through the orientation modules and center point of the finder pattern based on the location of the finder pattern, the location of the orientation modules, and shape information about the orientation modules in the scanned image of the two-bar code symbol.

The method according to the present invention preferably further comprise a finder pattern search step for finding scans line along which the pattern detected in the scanned image of the bar code symbol in a specific scanning direction matches a specific reference pattern, detecting the finder pattern in the scanned image of the bar code symbol based on the plural scan lines found, and obtaining the finder pattern location and shape information.

The method of the present invention preferably further comprise an image correction step for calculating an equation representing the relationship between the bar code symbol and the scanned image of the bar code symbol, and then correcting the scanned image of the bar code symbol based on the resulting equation.

The method of the present invention preferably further comprises an orientation module search step for finding in the scanned image of the bar code symbol plural pixel data groups of which the color pattern matches a specific color template pattern. The color patterns comprise black) or white pixels of the respective pixel data group, which are a specific distance from a specific point in the scanned image and are disposed at a specific angular interval. Based on the found plural pixel data groups, a plurality of orientation modules constituting orientation module groups are detected in the scanned image of the bar code symbol, and the location and shape of these plural orientation modules groups are obtained.

The method of the present invention preferably further comprises a data character conversion step for converting data module bit data to codewords by correlating the position of the data modules constituting the data module group in the scanned image of the bar code symbol to specific codewords and specific bit values in the specific codewords based on a specific codeword conversion table, and then converting the resulting codewords to specific data characters.

The operation of a two-dimensional bar code reading method thus comprised according to a preferred embodiment of the present invention is described next below with reference to the accompanying figures.

Figure 3:
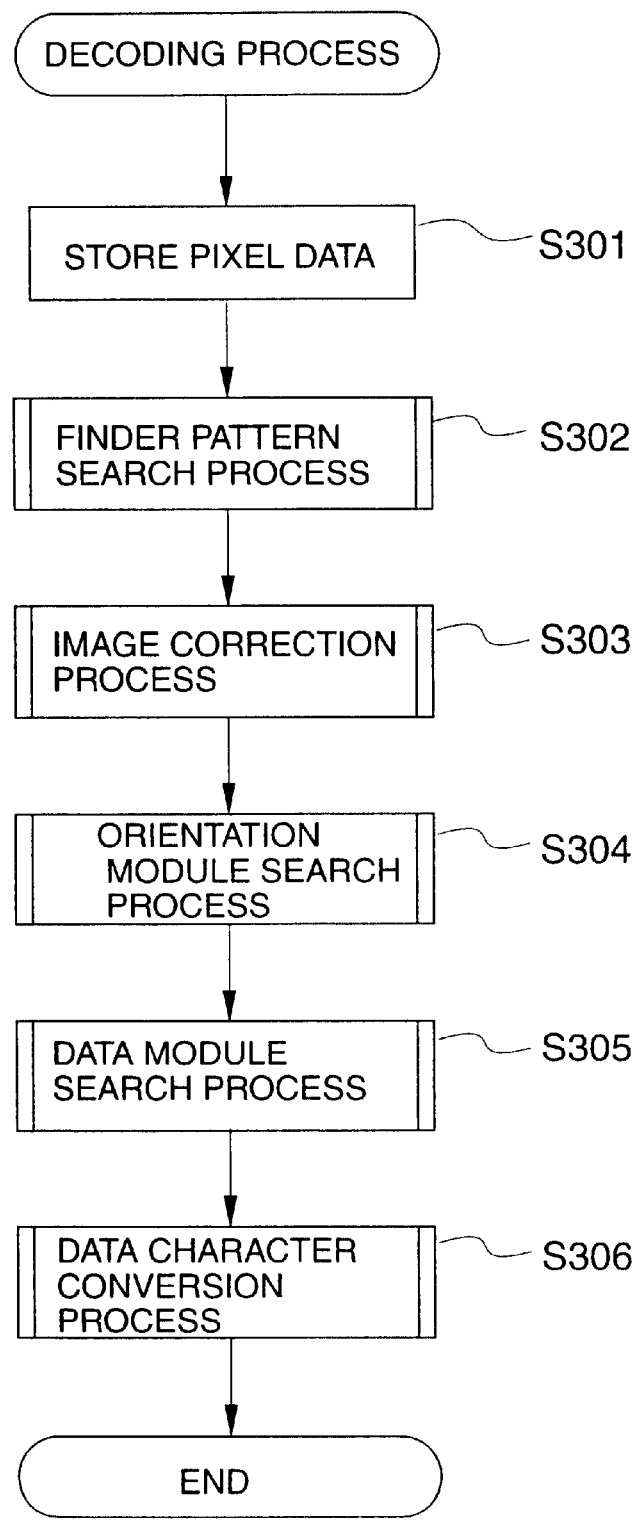
FIG. 3 is a flow chart of the decoding process in a method according to a preferred embodiment of the present invention.

FIG. 3 is a flow chart of the decoding process in the two-dimensional bar code reading method of the present invention.

As shown in FIG. 3, the first step is to store image data from the scanned image captured by the photodetector 103 (not shown in the figure) to a pixel data register 210 in VRAM 106 as pixel data correlated to a specific pixel position. (S301) The pixel data consists of coordinates indicative of the pixel position, and a gray scale value indicative of the gray level of the pixel. It is herein assumed that the gray scale value decreases in proximity to black. The gray scale values of the pixel data are then converted to binary pattern values of 1 (=black) and 0 (=white) with reference to a specific gray scale threshold value previously stored to decoding data memory 220. In other words, if the gray scale value of a pixel is less than this gray scale threshold value, the pattern value is 1 (indicating black), but if the gray scale value of the pixel is greater than or equal to the gray scale threshold value, the pattern value is 0 (indicating white). It should be noted that these pixel values of 1 (black) and 0 (white) can be stored to the pixel data register 210. The gray scale threshold value is also variable.

The next step (S302) is to search for the finder pattern, which is needed to extract the MaxiCode symbol from the scanned image, based on pixel data stored to the pixel data register 210 of VRAM 106.

Figure 59:
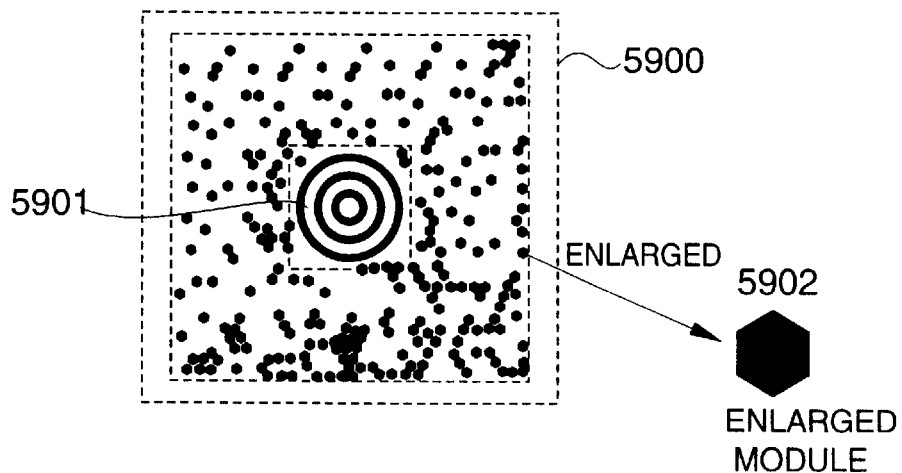
FIG. 59(a) shows a MaxiCode symbol, and (b) shows the MaxiCode symbol finder pattern and orientation modules.
Figure 59:
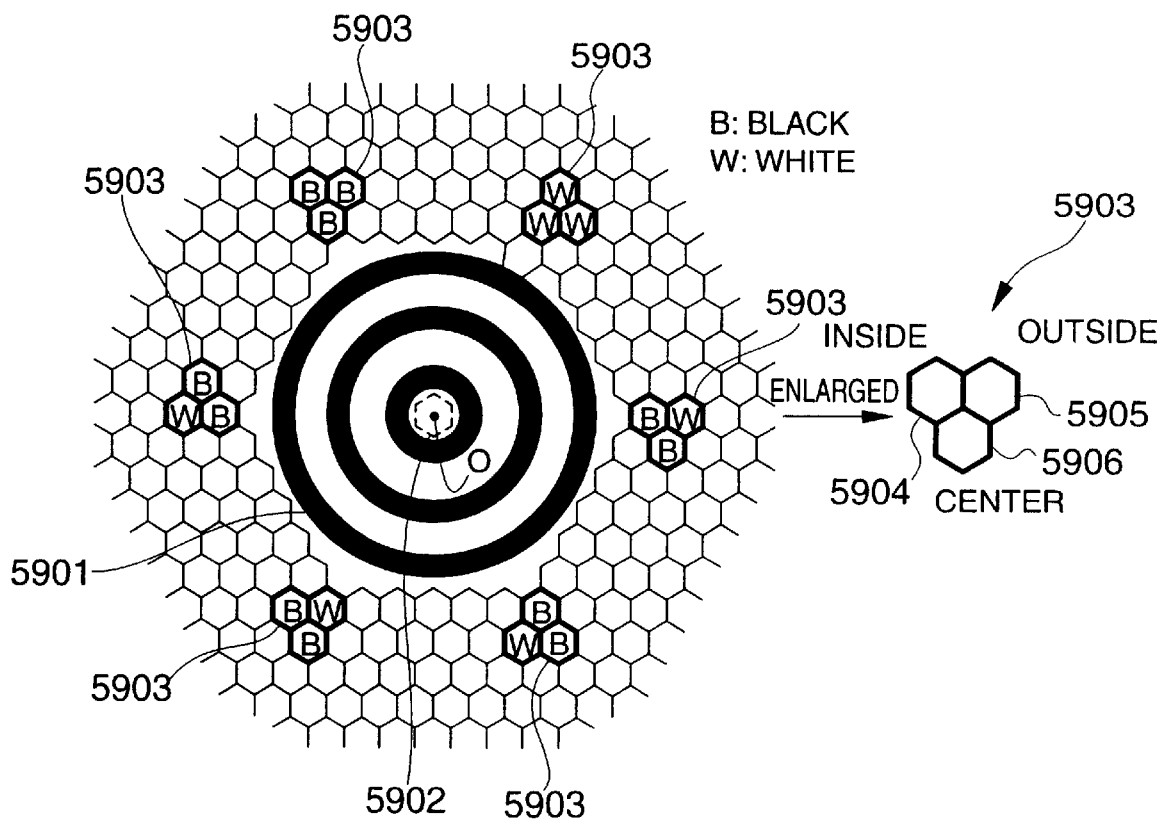

Finder pattern shape information, that is, the center point, size, and shape of the finder pattern, are calculated by the finder pattern search. As shown in FIG. 59(b), the finder pattern of an actual MaxiCode symbol is a bullseye pattern of six concentric alternating black and white circles, the inside circle always being white and the outside circle always black so that there are three white and three black circles. The coordinates for the center point of the finder pattern, and position coordinates for the color boundaries between the white and black circles of the finder pattern, are therefore computed to obtain the finder pattern shape information.

Next, the shape information for the located finder pattern is compared with the shape information for a finder pattern in a standard MaxiCode symbol to calculate a bias angle correction equation based on the angle at which the image was captured when the photodetector 103 scans the symbol image at an angle. A bias angle correction table is then generated by applying the calculated angle correction equation to achieve a specified correction precision. The resulting bias angle correction table is then used to correct the pixel data bias angle (S303).

Figure 35:
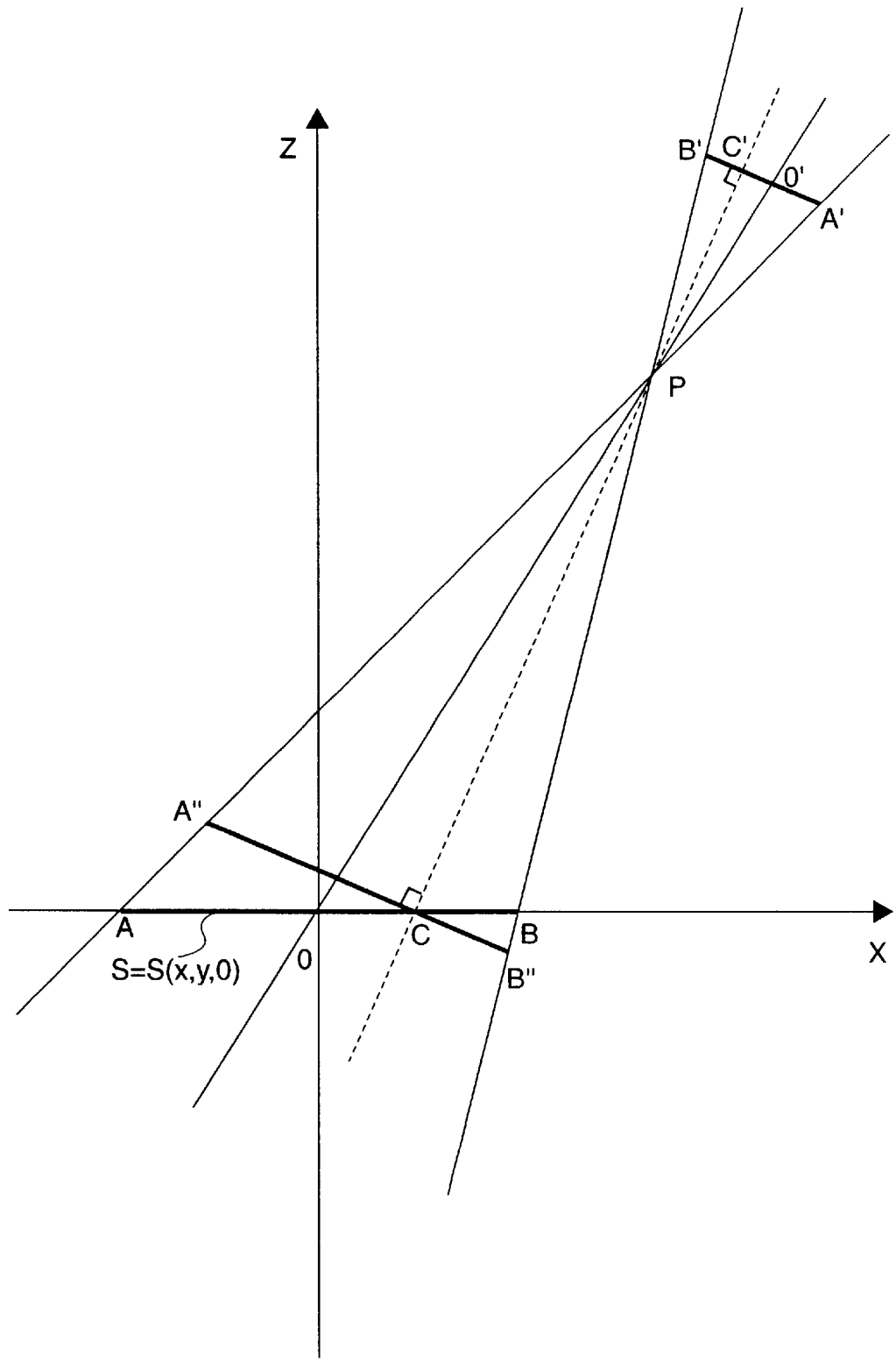
FIG. 35 shows the relationship between a captured image scanned at an angle, and the actual MaxiCode symbol.

FIG. 35 shows the relationship between a normal MaxiCode symbol and the scanned image of a MaxiCode symbol captured from an angle. FIG. 35 is a view from the positive direction of the y-axis in a right-handed three-dimensional space in which the y-axis is orthogonal to the x-axis and z-axis.

As shown in FIG. 35, shape S where $S=S(x,y,0)$ on plane x-y has points A and B. Let us assume below that shape S is a circle in the MaxiCode symbol finder pattern; line segment AB is the diameter of the finder pattern; point P was the focal point when the image was scanned by photodetector 103; and point C is the center of the scanned image. In this case the scanned image will be on a plane orthogonal to line PC, and the scanned line segment AB is line segment A'B' in the scanned image. Triangles A'B'P and A"B"P are similar, and the line on which line segment AB was captured can be thought of as line segment A"B". Point 0 is the center point of the finder pattern.

The relationship between a normal MaxiCode symbol and a scanned image captured from an angle can be determined by computing the following equations f and g, or h.

$$A''=f(A')=f(g(A))=h(A)$$

$$B''=f(B')=f(g(B))=h(B)$$

$$C=f(C')=f(g(C))=h(C)$$

The relationship between a normal MaxiCode symbol and a scanned image can also be determined by computing the following equations $f\_1$ and $g\_1$, or $h\_1$.

$$A=g\_1(A')=g\_1(f\_1(A''))=h\_1(A'')$$

$$B=g\_1(B')=g\_1(f\_1(B''))=h\_1(B'')$$

$$C=g\_1(C')=g\_1(f\_1(C))=h\_1(C)$$

Therefore, equations f and g, or h, and equations $f\_1$ and $g\_1$, or $h\_1$, define the relationship between the scanned image and the actual MaxiCode symbol when the MaxiCode symbol is captured from an angle, and can thus be used as bias angle correction equations. A bias angle correction table is then generated using the calculated bias angle correction equations to achieve the specified correction precision.

The necessary pixel data in the scanned image of the MaxiCode symbol is then image corrected based on the resulting bias angle correction table.

Furthermore, because all data modules can be found by finding the MaxiCode symbol orientation modules, it is not necessary to correct all pixel data constituting the scanned image of the MaxiCode symbol. More specifically, it is only necessary to correct pixel data in the areas in which the orientation modules are present. Therefore, the calculated bias angle correction equations only need to be true in the area in which the MaxiCode symbol orientation modules are present.

Next, all image-corrected pixel data matching a specific color template previously stored to the decoding data memory 220 is detected, and the position and shape information for the orientation modules are calculated based on the detected pixel data (S304).

Figure 60:
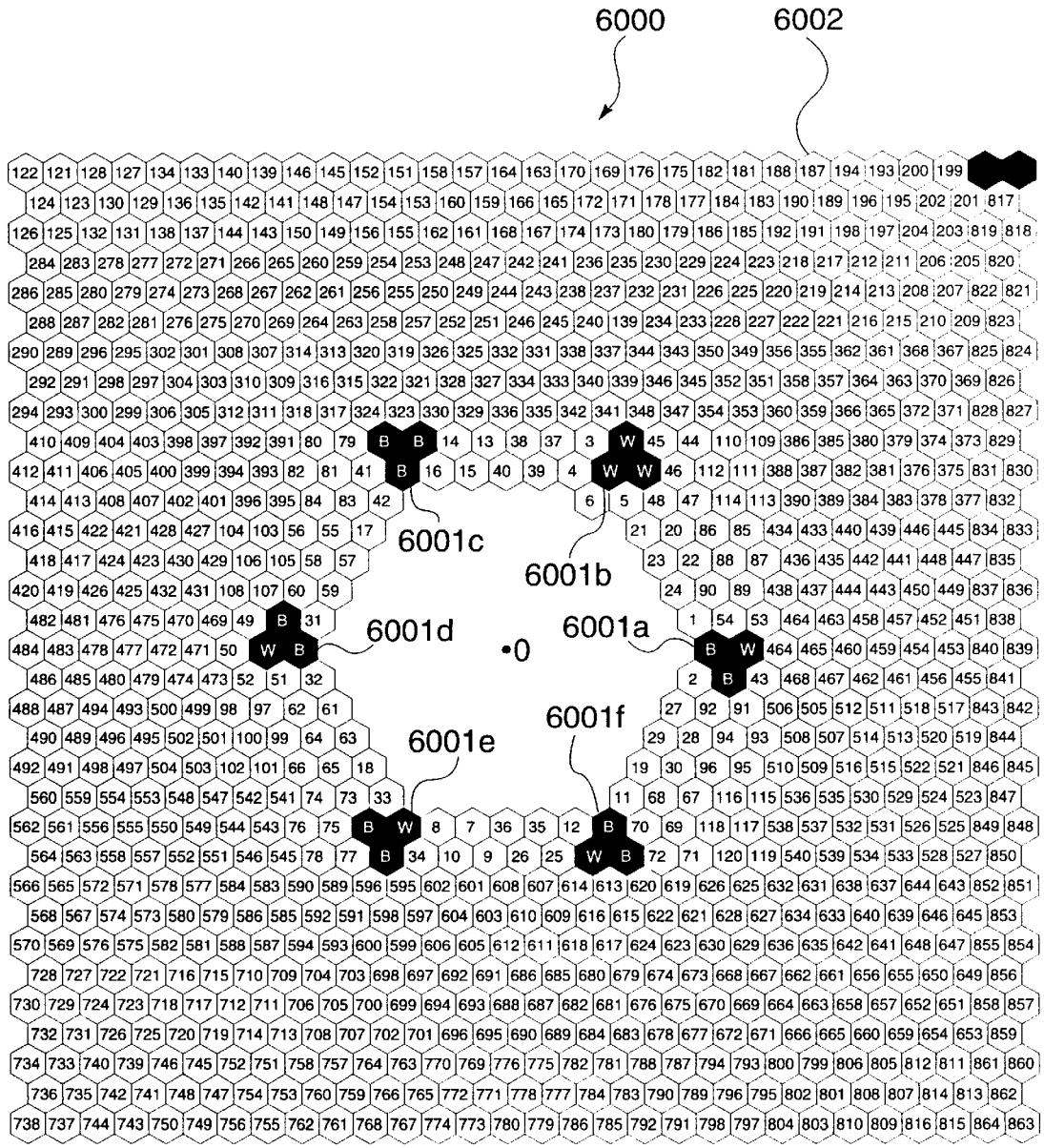
FIG. 60 shows module groups in a MaxiCode symbol.

As shown in FIG. 60 and noted above, the orientation modules indicate the orientation of a MaxiCode symbol and are placed at specific places in the MaxiCode symbol. It is therefore possible to detect the orientation of the MaxiCode symbol by locating the orientation modules and then calculating the position and shape of the orientation modules. Furthermore, once the MaxiCode symbol orientation is known, the position of every data module in the MaxiCode symbol is known, and the color of each data module is also known.

All data modules in the MaxiCode symbol are then grouped as either a data module on an orientation axis or a data module in an area between orientation axes, and the location and shape of each data module is then calculated (S305). This is accomplished by correcting distortion of the image data captured by the photodetector 103 based on the orientation axis passing through the center point of the finder pattern and the calculated orientation modules, and the location and shape information calculated for the orientation modules.

The next step (S306) identifies the color of each data module, bit converts all data modules, stores the bit-converted data to the bit matrix table, converts the data to codewords based on a specific two-dimensional codeword conversion table previously stored to decoding data memory 220, and applies an error correction process. The codewords are then converted to data characters based on the specified default character set previously stored to decoding data memory 220, and the decoding process ends.

It should be noted that the method of the present invention does not necessarily have all steps S302 to S306, and can have only any one of the steps S302 to S306. The finder pattern search steps described above are explained in further detail below with reference to FIG. 4, FIG. 26, FIG. 27, FIG. 28, and FIG. 29.

Figure 4:
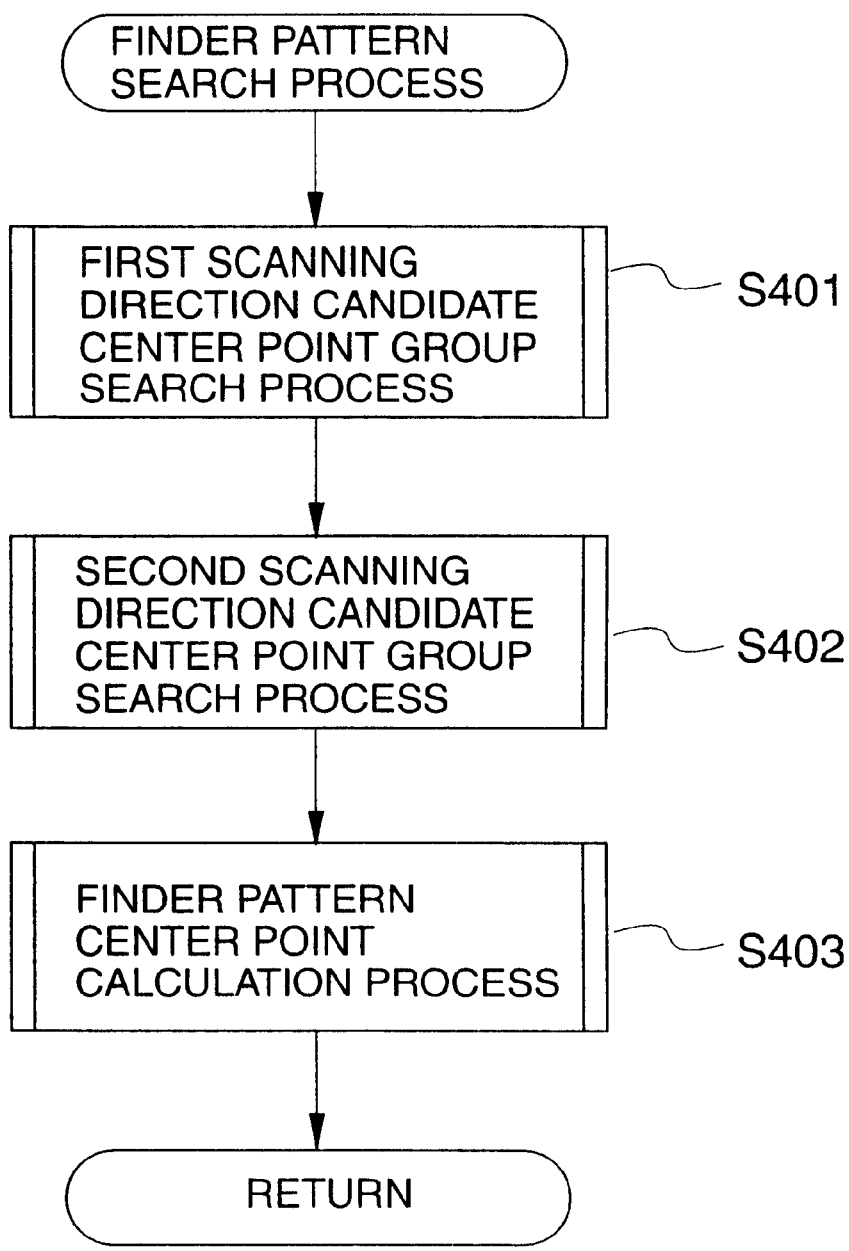
FIG. 4 is a flow chart of a finder pattern searching process in the decoding process shown in FIG. 3.

FIG. 4 is a flow chart of a finder pattern search process in the MaxiCode symbol decoding process according to the present invention shown in FIG. 3.

The MaxiCode symbol image is scanned in a first scanning direction to find a scan line passing near the center point of the finder pattern by comparing the pattern (the "color pattern relationship equation" below) detected along a particular scan line with a reference pattern (the "finder pattern template" below). The center point is then calculated from the found scan line. This operation is repeated plural times to find plural such scan lines, and the center point is calculated for each of the scan lines thus identified (S401). Note that below the scan line near the finder pattern center point scanned in a first scanning direction is referred to as the "candidate center line in the first scanning direction", the center point is referred to as the "candidate center point in the first scanning direction", and the set of plural center points as the "candidate center point group in the first scanning direction." Plural candidate center lines in the first scanning direction are therefore found, and a candidate center point group in the first scanning direction comprising plural candidate center points in the first scanning direction is calculated. The first scanning direction is further assumed below to be the horizontal direction (note that the terms "horizontal" and "vertical" as used in this text are not meant to impose any restriction on the respective directions other than that the horizontal and vertical directions are perpendicular to each other).

FIG. 26 is used to describe a finder pattern template. FIG. 26(a) shows a color pattern on a line passing through the center point of the finder pattern, and FIG. 26(b) shows the finder pattern template.

As shown in FIG. 26(a), the result of searching line 2601 passing through the finder pattern center point in the direction indicated by the arrow is a pulse wave diagram in which a high pulse indicates a white area and a low pulse indicates a black area. As shown in FIG. 26(b), if a (relative) distance from the outside edge of the first black circle (indicated by A) to the outside edge of the next black circle (at C) is 1, then the distance from the outside edge of the first white circle (B) to the same edge of the next white circle (D) is also 1. Furthermore, the distance from the outside edge (E) of the black circle directly enclosing the white center bull's-eye to the inside edge (G) of the same black circle on the other side of the white center, and the distance from the first edge (F) of the white center to the inside edge of the next white ring (H), are both 1.26.

Therefore, if the bull's-eye pattern is scanned from left to right (A to L) through the center as described above, and the ratio of distances from black—black (A–C), white—white (B–D), black—black (C–E), . . . white—white (J–L) is accumulated, the color pattern relationship $$AC:BD:CE:DF:EG:FH:GI:HJ:IK:JL=1:1:1:1:1.26:1.26:1:1:1:1$$

will be true where AC, for example, indicates the distance from point A to point C.

This equation defining the relationship of the color pattern of a normal finder pattern is stored to the decoding data memory 220 of ROM 107 as a finder pattern template.

Furthermore, if the center is scanned from right to left (L to A) and the edge-to-edge distances are again expressed as a ratio in the order black—black (L–J), white—white (K–I), black—black (J–H), . . . white—white (C–A), the ratio will be the same, that is, $$LJ:KI:JH:IG:HF:GE:FD:EC:BD:CA=1:1:1:1:1.26:1.26:1:1:1:1.$$

Figures 27A, 27B:
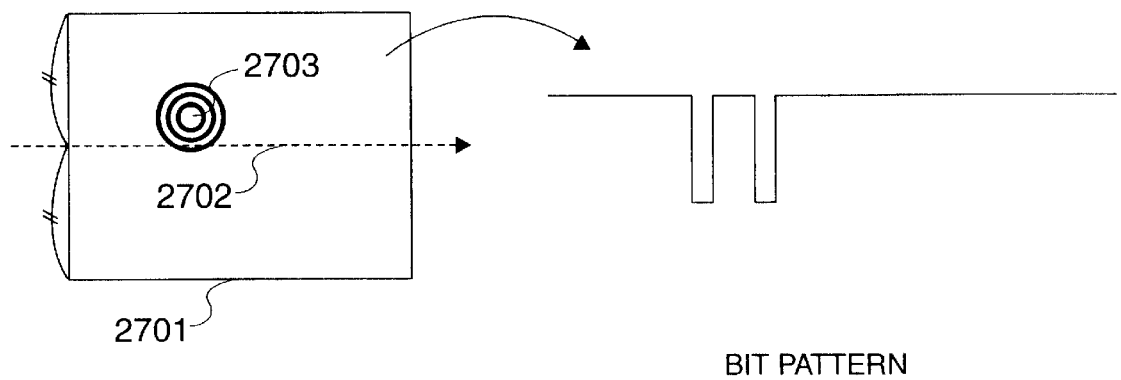
FIG. 27(a) shows the finder pattern scanning direction and scan line, and (b) is a waveform diagram of the detection pattern.

As shown in FIG. 27(a), the first step is therefore to horizontally scan (in a first scanning direction) the middle of the entire scanned image 2701 of the MaxiCode symbol to generate a pulse wave (see FIG. 27(b)) based on the color pattern of the scan line 2702 and calculate the color pattern relationship equation (color pattern ratio) along that scan line. The detected ratio is then compared by pattern matching with the MaxiCode finder pattern template (FIG. 26(b)) stored to decoding data memory 220 in ROM 107. If the detected ratio matches the template, that scan line is defined as a candidate center line in the first scanning direction. Note that this scan line is here defined as a candidate center line because there can be other black and white data that happen to be arranged in the same intervals as the template.

Figure 28:
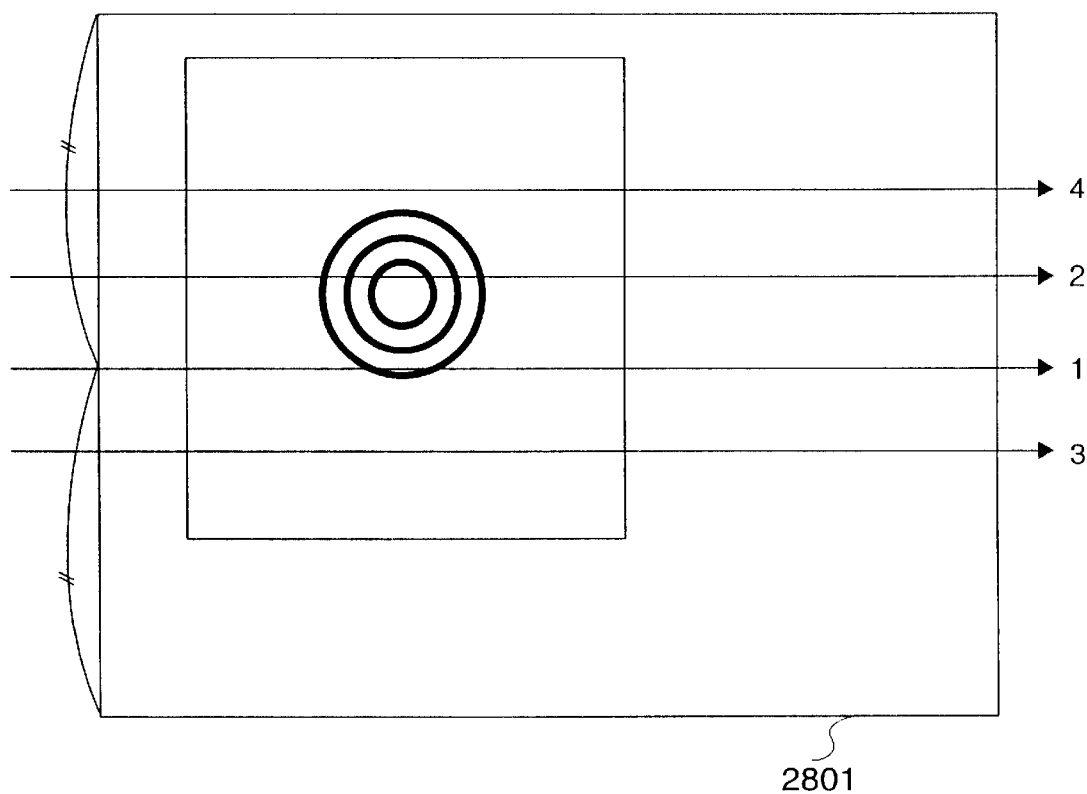
FIG. 28 shows the sequence in which the scan lines are adjusted up and down after the center line is determined.

If as shown in FIG. 27(b) the number of comparison points in the color pattern ratio and the number of comparison points in the finder pattern template are not the same, it is clear that the line does not pass through the center point 2703 of the finder pattern bullseye. In this case, as shown in FIG. 28, the image is scanned again, bracketing the center line 1 of the entire image 2801 above and below with scan lines 2, 3, and so forth in successive scans. Pattern matching using the detected color pattern ratio and the finder pattern template is repeated after each scan to find the scan line matching a specific pattern as described above, and the scan line determined to match the template most closely is defined as the center line in the horizontal direction. The midpoint between the intersection of this center line and the inside of the outermost black circle (i.e., the point corresponding to B in FIG. 26(b)), and the intersection of this center line and the inside of the outermost black circle on the opposite side (i.e., the point corresponding to K in FIG.

26(b)), that is, two points on the outside edge of the outermost white circle of the finder pattern, is then found and defined as a candidate center point (candidate center point in the first scanning direction).

It should be noted that the midpoint between two outside edge points of the outermost white circle is used to obtain the center coordinates instead of using the midpoint between two outside edge points of the outermost black circle of the finder pattern because black pixel data may touch the outside edge of the outermost black circle of the finder pattern, and the location of this outermost black circle could therefore be misinterpreted.

There are also cases in which a precise match between a scan line and the template cannot be determined, and there are plural candidate center lines in the horizontal direction. In this case the x coordinates of the candidate center coordinates are rounded, and only those coordinates rounding to the same integer value are stored to RAM as the candidate x coordinates of the plural candidate center points (candidate center point group in the first scanning direction). It can further be assumed that the location having the highest distribution of candidate center coordinates in the direction perpendicular to the horizontal scan line is most likely where the candidate center coordinates in this perpendicular direction are located.

Scanning is then repeated in the horizontal direction above and below the candidate center line with the scan lines gradually increasing in distance from the center line, and the scanned data is stored to finder pattern information register 211 of VRAM 106.

Scanning is then accomplished in a second scanning direction different from the first scanning direction, and the same pattern matching operation is performed using the color pattern ratio detected on the scan lines in this second scanning direction to find the scan lines near the center point of the finder pattern and calculate the center point from the identified scan lines. This operation is repeated plural times to find plural scan lines and calculate the plural center points from the scan lines (S402). It should be noted here that a scan lines near the center of the finder pattern scanned in this second scanning direction are referred to below as a candidate center line in the second scanning direction, a center point as a candidate center point in the second scanning direction, and a set of plural center points as a candidate center point group in the second scanning direction. Therefore, plural candidate center lines in the second scanning direction are found and a candidate center point group in the second scanning direction comprising plural candidate center points in the second scanning direction is calculated.

Scanning is accomplished in a second scanning direction (vertical direction) shifted 90 degrees to the horizontal scanning direction, and the same pattern matching operation applied in the horizontal direction is performed.

The first scan line in the vertical direction is a line perpendicular to the candidate center line previously obtained in the first scanning direction and passing through the calculated center point of this horizontal candidate center line. The speed with which the center coordinate can be obtained can be improved by taking the first scan in the vertical direction through the candidate center coordinates obtained by the above horizontal scanning process, rather than starting by scanning through the middle of the entire image, because the probability is highest that the true center coordinates of the finder pattern are on this horizontal center line candidate.

As during horizontal scanning, the vertical scan line with a color pattern ratio most closely matching the template as shown in FIG. 26(b) is defined as the center in the vertical direction. Where the center point coordinates in the horizontal and vertical directions intersect is the center of the finder pattern. As during horizontal scanning, the midpoint between points on the outside edge of the outermost white circle of the finder pattern is used for the center coordinates in the vertical direction. Next, the place in the horizontal direction having the highest population of candidate center coordinates (candidate center point group in the second scanning direction) obtained in vertical line scanning is obtained.

Scanning in the vertical direction is then repeated with each scan line gradually increasing in distance alternately to the right and left of the vertical center line, and the resulting data values are stored to finder pattern information register 211 of VRAM 106 (see FIG. 28).

It will be obvious that the horizontal and vertical scanning operations can be accomplished with either one occurring first.

Finally, the center point of the finder pattern is calculated based on the previously calculated candidate center point groups in the first and scanning directions (S403).

Figure 29:
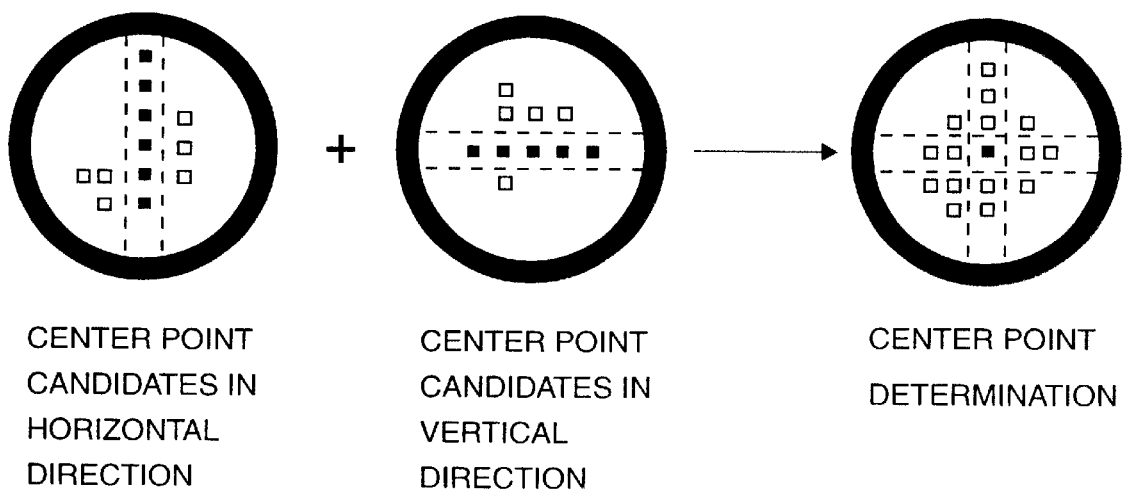
FIG. 29 illustrates calculating the finder pattern center point.

FIG. 29 illustrates calculating the center point of the finder pattern.

As shown in FIG. 29, the intersection of the line perpendicular to first scanning direction calculated from the candidate center point group in the first scanning direction, and the line perpendicular to the second scanning direction calculated from the candidate center point group in the second scanning direction is the center point of the finder pattern. That is, finder pattern center point is obtained from the intersection of the vertical line where the center point obtained by scanning in the horizontal direction is most likely present, and the vertical line where the center point obtained by scanning in the vertical direction is most likely present.

It should also be noted that after scanning and pattern matching in a first scanning direction (horizontal direction in this embodiment), the scanning direction is rotated 90 degrees for scanning and pattern matching in the second scanning direction (vertical direction in this embodiment). The invention is not limited to first and second scanning directions that are perpendicular to each other; the angle between the first and second scanning directions can be any angle as long as the two scanning directions intersect. However, the first direction and second direction are preferably orthogonal to each other if, after scanning in the horizontal direction, a vertical line is taken through the point where the probability of the center coordinates existing in the vertical direction is greatest as described above. In addition, when the scanned data values are stored in VRAM as two-dimensional data in an x-y coordinate system, having the first and second directions mutually perpendicular makes data reading and processing easier.

Figure 5:
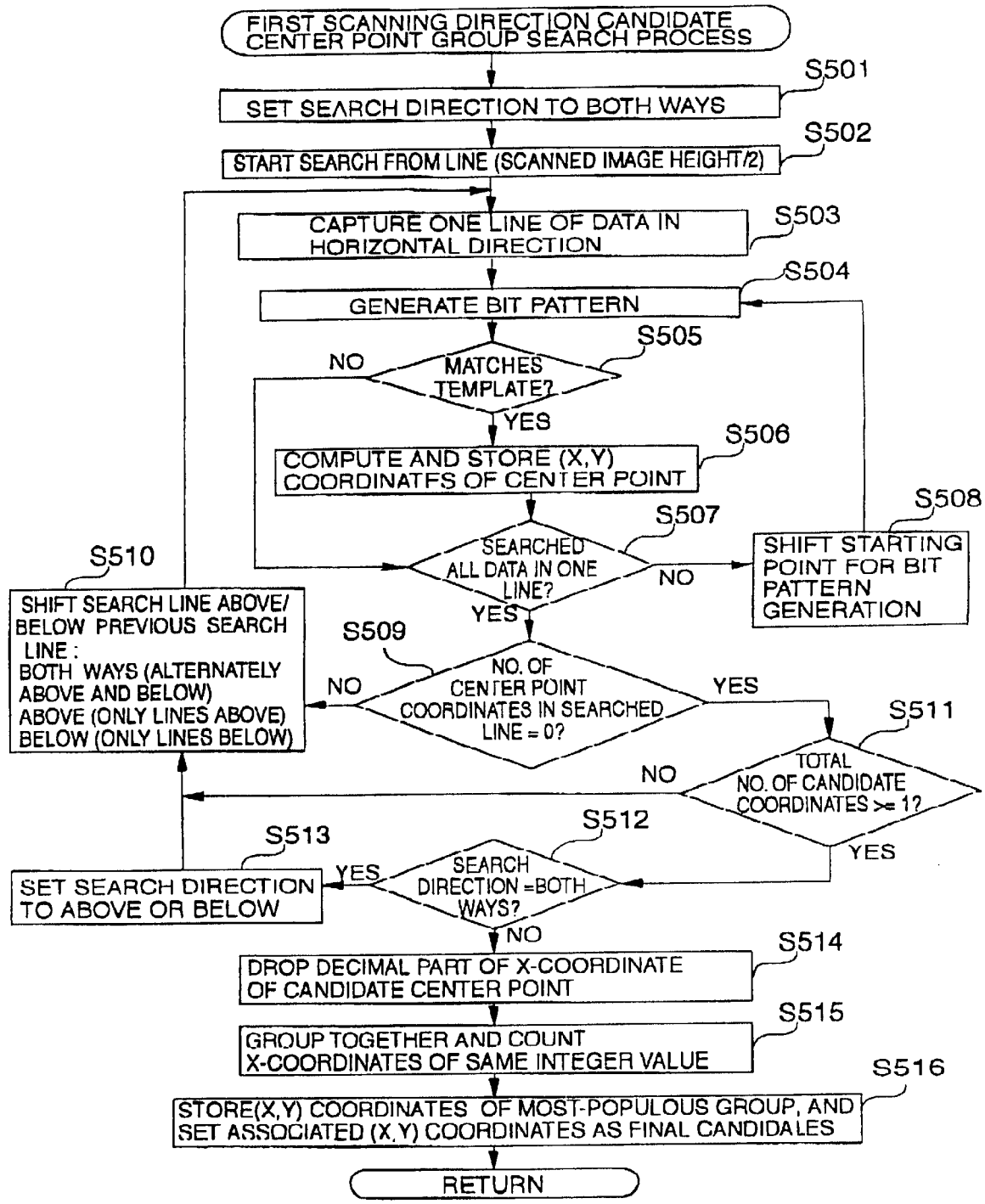
FIG. 5 is a flow chart of the horizontal search part of a finder pattern center point location method in the present invention.

FIG. 5 is a flow chart of the process for finding the candidate center point group in the first scanning direction in the finder pattern search process.

First, a search is conducted in the horizontal direction for the finder pattern, and the search direction is set to both ways (directions) (S501). Note that "both ways" as used here means above and below the current scan line in the horizontal direction. Next, searching starts with a line in the middle of the captured image (captured image height/2) (S502). This is because the symbol is in substantially the middle of an image containing the symbol, and the finder pattern of a MaxiCode or Aztec Code symbol is in the middle of the symbol.

One line of data is then captured in the horizontal direction (S503), and a color pattern ratio (see FIG. 27(b)) of the black and white pattern is generated (S504). The color pattern ratio and above-described finder pattern template are then compared to detect a match therebetween (S505).

If the color pattern ratio and template do not match (S505 returns No) and scanning that horizontal line has not been completed (S507 returns No), it is known that the color pattern ratio was generated for image data other than the finder pattern. The color pattern ratio is therefore regenerated (by steps S508 and S504), and compared again with the finder pattern template (S505).

If the color pattern ratio and template match (S505 returns Yes), the x-y coordinates are obtained and stored for the midpoint between the inside edges of the outermost black circle (the midpoint between B and K in FIG. 26(a)) as the coordinates for the center point of the center circle of the finder pattern (S506).

If scanning one line of data is completed (S507 returns Yes), the number of candidate midpoint coordinates for that line is determined. If there is a match with the template, the number of coordinate points is one (S509 returns No), and the procedure advances to S510.

At step S510, the search line is shifted one line (corresponding to one CCD sensor line) up (to line 2 in FIG. 28), and steps S503 to S509 repeat. If as a result of shifting one line up there is one pair of midpoint coordinates (S509 returns No) and the procedure advances to step S510, the search line is shifted two lines (corresponding to two CCD sensor lines) down (to line 3 in FIG. 28) because the search direction is set to "both ways" in S501, and steps S503 to S509 repeat.

If midpoint coordinates are not found as a result of shifting two lines down (S509 returns Yes), the procedure advances to S511, which determines whether the total number of candidate points obtained from scanning lines 1 to 3 is one or more. If there are one or more candidate points (S511 returns Yes), the procedure advances from S512 to S513, and the search direction is set to "above." Note that the search direction is set to "above" here to prevent unnecessary searches because the finder pattern cannot be found by scanning further below. Because a midpoint was not found for the first time when searching the line below (line 3 in FIG. 28), searching can be set to a line above by setting a flag indicating that there are no midpoints below, thereby changing the scan line of the next scanning operation to the line above line 2 in FIG. 28, that is, to line 4 in FIG. 28. In other words, only lines above the highest line for which scanning has been completed are scanned.

In this case, after setting the search direction to "above" in step S513, S503 to S509 are again repeated. Because a midpoint is not found on line 4 in FIG. 28, S509 returns Yes, S511 returns Yes, and S512 returns No. Scanning in the horizontal direction is therefore completed, and the procedure advances to S514.

If a template match is not found when scanning one line is finished (S505 returns No, S507 Yes, and S509 No), the procedure advances to S510, the scan line is shifted one line above or below, and the procedure loops back to S503.

Furthermore, a flag indicating that there is no midpoint above is set the first time a midpoint is not found after scanning a line located in the "above" direction while scanning is set to both ways. As a result, subsequent scanning operations proceed only on lines below the lowest line for which scanning has been completed.

In steps S514 and S515 the integer parts of the x-coordinates of the candidate points are extracted, and the candidate points are grouped such that in each group all x-coordinates have the same integer value. The number of candidate points in each group is counted, and the candidate points of the group with the highest count value (the most populous group) is selected as the final candidate center point group in the first scanning direction (using the respective x-coordinate values to the second decimal place) and the y-coordinate associated with each selected candidate point (also to the second decimal place) (S516).

Operation then proceeds to searching in the second scanning direction. This is described next below with reference to FIG. 6, a flow chart of the process for finding the candidate center point group in the second scanning direction in the finder pattern search process.

A process substantially the same as that for horizontal searches shown in FIG. 5 is then performed following S516 in FIG. 5. This process is identical to the horizontal searching process except that one line in the horizontal process shown in FIG. 5 is one column; "above" and "below" the search direction in FIG. 5 are left and right, respectively, in FIG. 6; and the x-coordinate in FIG. 5 is the y-coordinate in FIG. 6. The processes are otherwise the same, and further description thereof is thus omitted here.

Figure 6:
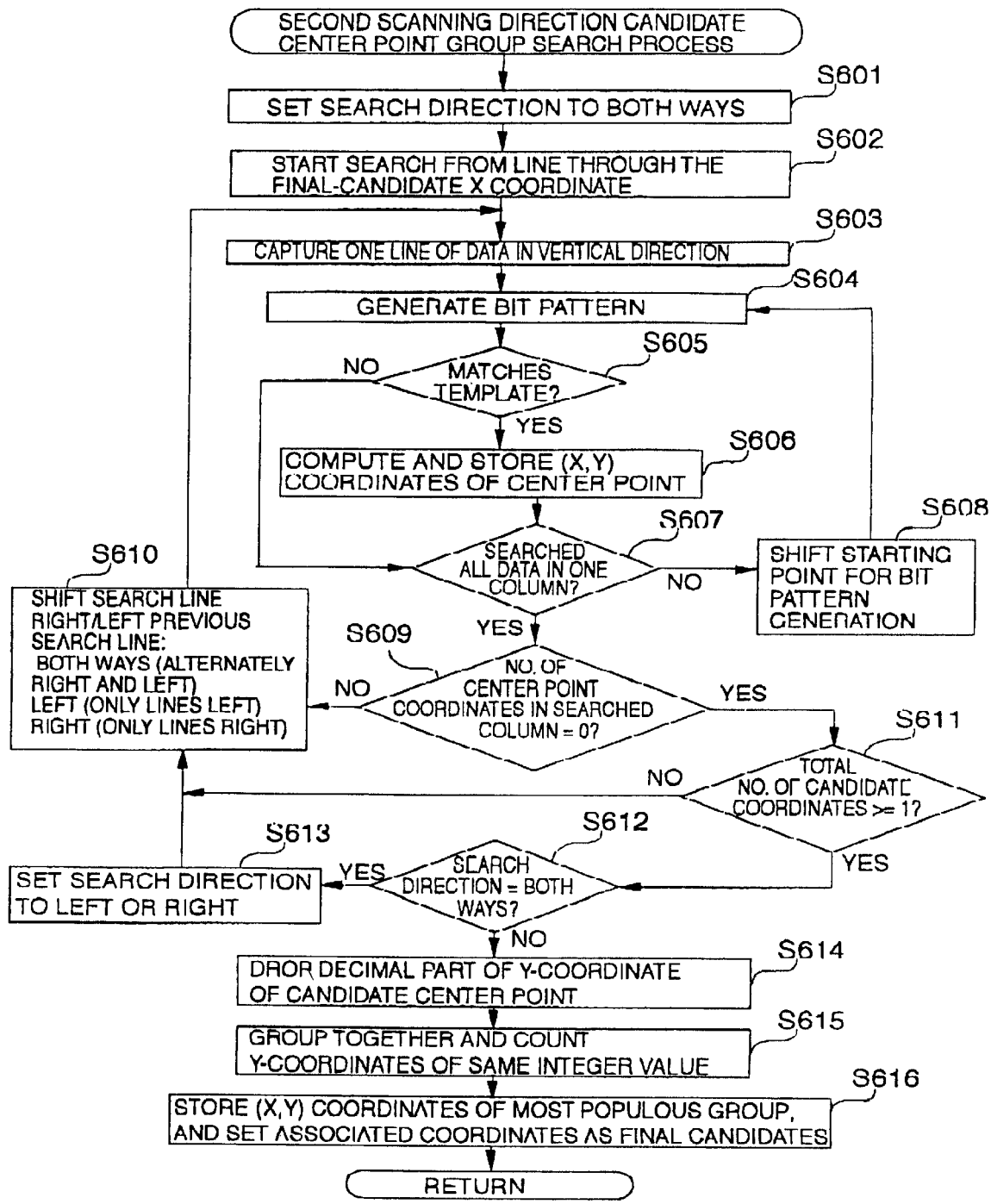
FIG. 6 is a flow chart of the vertical search part of a finder pattern center point location method in the present invention.

On the other hand, while S502 in FIG. 5 refers to (image height/2), S602 in FIG. 6 differs in that it uses the value of the x-coordinate of the final candidate obtained in the horizontal search. The value of the x-coordinate of the final candidate obtained in the horizontal search (scan) is used here because with this value the value of the x-coordinate of the center point is already substantially known, and processing can be completed more quickly by searching in the vertical direction from there.

In steps S614 to S616 in FIG. 6, the most populous group of candidate points of the same integer y-coordinate is selected from the candidate points in a manner analogous to that explained in the context of FIG. 5. The y-coordinate values (to the second decimal place) of the selected group and the corresponding x-coordinate values (to the second decimal place) are stored as the coordinates of the final candidate center point group in the second scanning direction.

Figure 7:
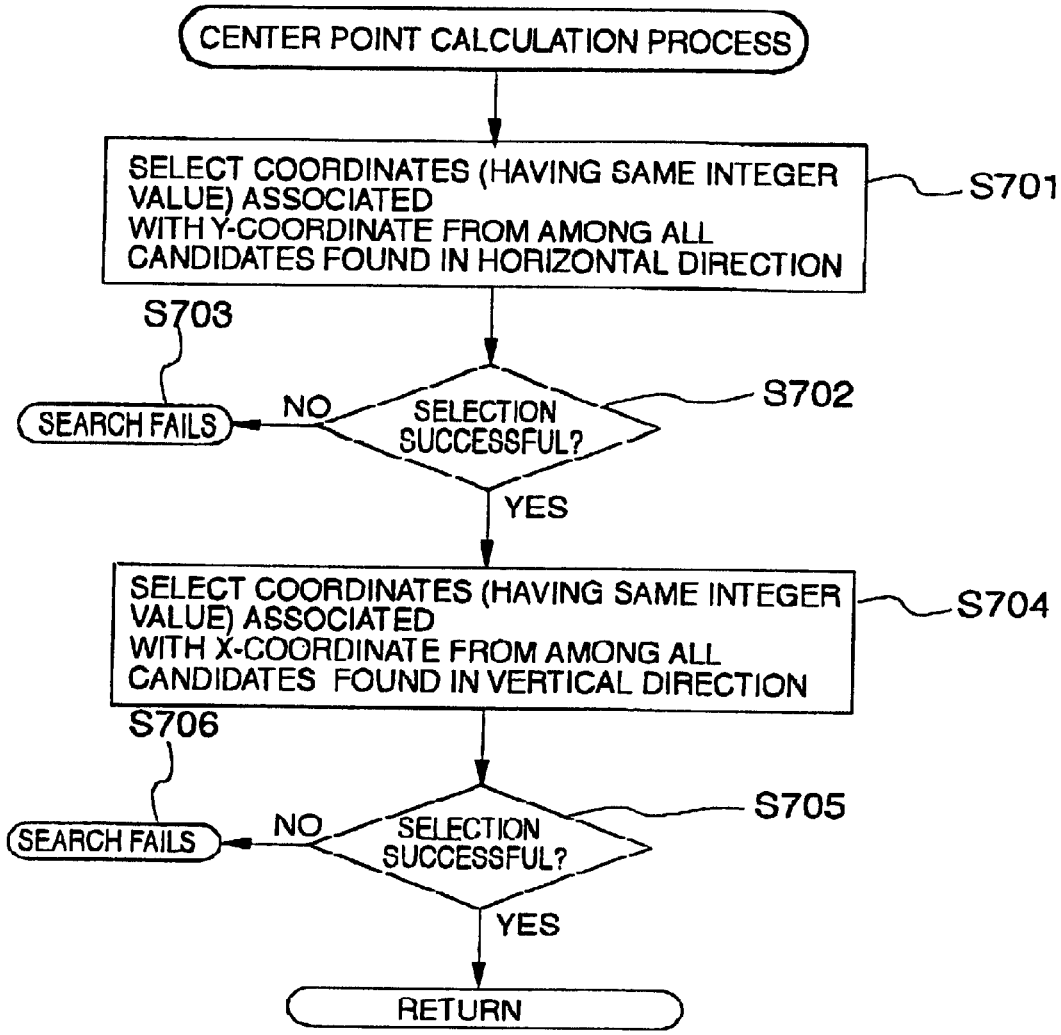
FIG. 7 is a flow chart of the center point determination part of a finder pattern center point location method in the present invention.

FIG. 7 is a flow chart of the finder pattern center point calculating process in the finder pattern search process.

Advancing to S701 in FIG. 7, a y-coordinate of the ones stored in the horizontal search shown in FIG. 5 whose integer part matches that of the most populous group obtained in the vertical direction search shown in FIG. 6 is obtained, and the x-coordinate (to the second decimal place) for that y-coordinate is used as the x-coordinate (to the second decimal place) of the center point.

Furthermore, in S704, an x-coordinate of the ones stored in the vertical search shown in FIG. 6 whose integer part matches that of the most populous group obtained in the horizontal direction search shown in FIG. 5 is obtained, and the y-coordinate (to the second decimal place) for that x-coordinate is used as the y-coordinate (to the second decimal place) of the center point.

If these coordinate values cannot be selected in S702 and S705, it is decided that the so center coordinates could not be found.

An alternative embodiment of the finder pattern search step is described next below.

Whether the black and white pattern obtained by scanning the finder pattern in the horizontal direction and the template pattern are in the order black-white-black-white-black-white-black-white-black-white-black is determined by simply comparing the sequence in which black and white are detected (it is not necessary to compare ratios). As a result, if the scanned black and white pattern matches the template, that scan line can be assumed to cross substantially the middle of the finder pattern (FIG. 26(*a*)). The intersections (points B and K in FIG. 26(*a*)) between that scan line and the member constituting the outermost part of the finder pattern (the outermost circle of the three black circles in the Maxi-Code symbol) are then obtained, and the midpoint therebetween is used as a candidate center point.

As noted above, the inside edge of the outermost black circle is referenced in order to avoid interpretation errors resulting from the presence of a black pixel touching the finder pattern. Scanning is then shifted parallel to the previous scan line, and the midpoint between points B and K is made the center point. This is repeated plural times.

A line passing through the plural midpoints obtained by scanning in the horizontal direction is then scanned as the second direction (vertical direction). As with scanning horizontally, the midpoint between points B and K is made the center point, and this is repeated plural times.

The coordinates of the intersection of a line joining the plural center points obtained in the horizontal direction (first scanning direction), and a line joining the plural center points obtained in the vertical direction (second scanning direction), can then be obtained as the center coordinates (the intersection of the dot-dash lines in the enlarged inset in FIG. 33).

Figure 34:
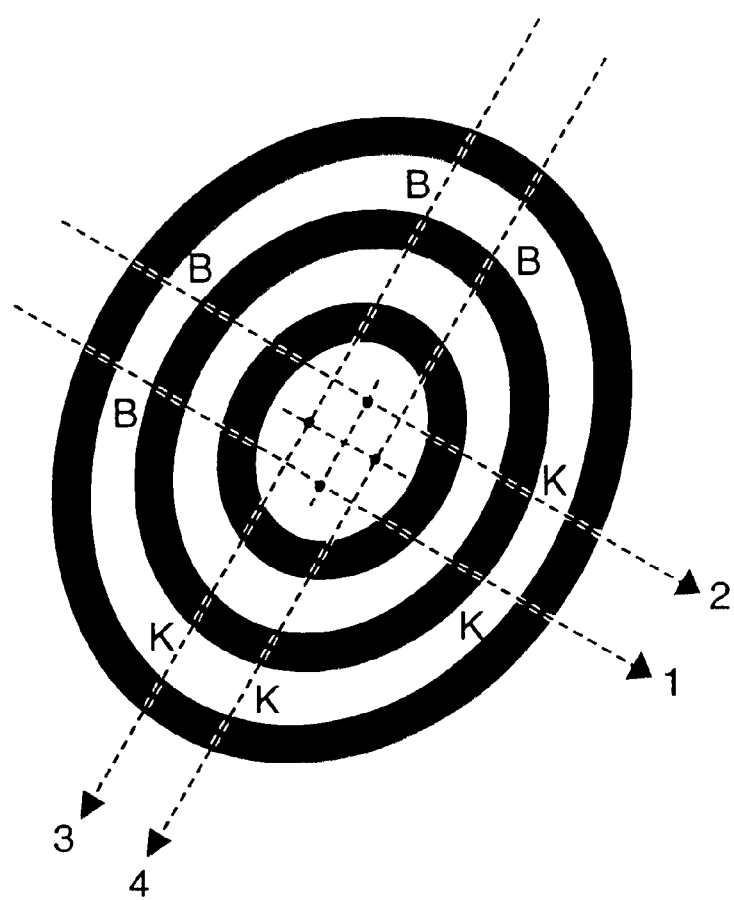
FIG. 34 shows an elliptical finder pattern used to describe another preferred embodiment of the present invention.

It is possible by means of this embodiment to accurately obtain the center coordinates of the finder pattern bullseye even when the finder pattern image is captured from an angle, or the finder pattern is not a circle but an ellipse. In this case, at least one of the first and second directions is preferably set to the long or short axis direction of the oval. (See FIG. 34.)

A further alternative embodiment of the above described finder pattern search steps is described next below with reference to FIG. 8, FIG. 26, FIG. 27, FIG. 28, FIG. 30, and FIG. 31.

Figure 8:
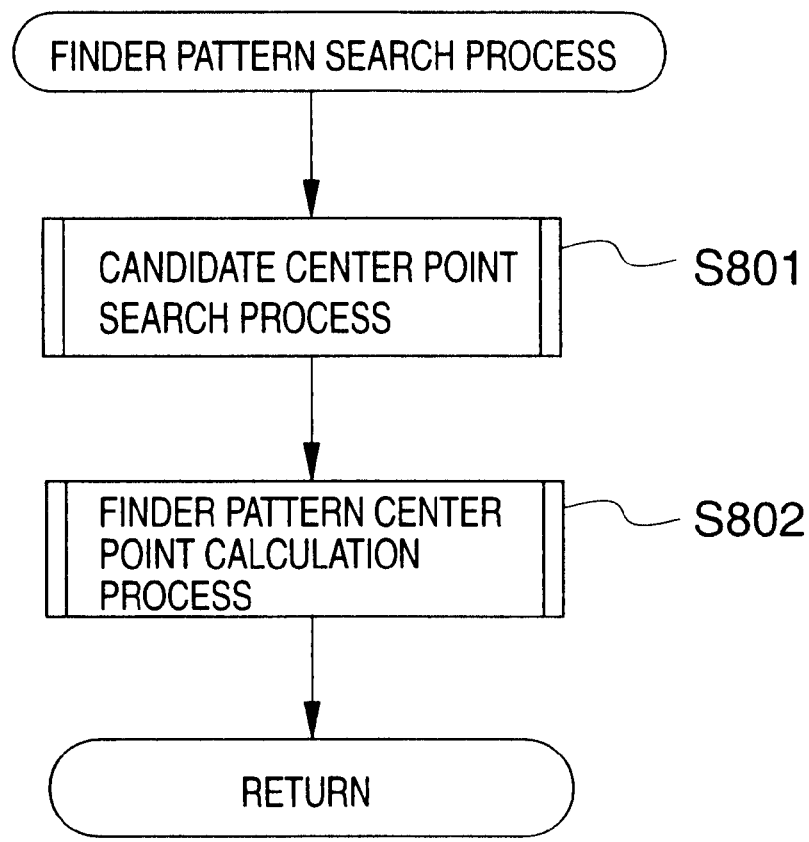
FIG. 8 is a flow chart of a finder pattern search process in the decoding process of the present invention.

FIG. 8 is a flow chart of a finder pattern search process in the MaxiCode symbol decoding process according to the present invention shown in FIG. 3.

The MaxiCode symbol image is scanned in a first scanning direction to find a scan line passing near the center point of the finder pattern by comparing the pattern (the "color pattern relationship equation" below) detected along a particular scan line with a reference pattern (the "finder pattern template" below). The center point is then calculated from the found scan line.

The image is then scanned from this center point in a second scanning direction, which is different from the first scanning direction. Pattern matching between the finder pattern template and the color pattern ratio detected in this second (perpendicular) scanning direction is used to calculate a candidate center point for the finder pattern from the scan lines (S801). It should be noted that the scan line near the center of the finder pattern found when scanning in the first scanning direction is referred to below as the first scanning direction center line, the center point thereof is referred to as the first scanning direction center point, and the scan line near the center of the finder pattern found when scanning in the second scanning direction is referred to below as the second scanning direction center line. The first scanning direction is further assumed below to be horizontally through the scanned image, and the second scanning direction is assumed to be vertically through the scanned image.

FIG. 26 is used to describe a finder pattern template. FIG. 26(*a*) shows a color pattern on a line passing through the center point of the finder pattern, and FIG. 26(*b*) shows the finder pattern template.

As shown in FIG. 26(*a*), the result of searching line 2601 passing through the finder pattern center point in the direction indicated by the arrow is a pulse wave diagram in which a high pulse indicates a white data module and a low pulse indicates a black data module. As shown in FIG. 26(*b*), if the distance from the outside edge of the first black circle (indicated by A) to the outside edge of the next black circle (at C) is 1, then the distance from the outside edge of the first white circle (B) to the same edge of the next white circle (D) is also 1. Furthermore, the distance from the outside edge (E) of the black circle directly enclosing the white center bull's-eye to the inside edge (G) of the same black circle on the other side of the white center, and the distance from the first edge (F) of the white center to the inside edge of the next white ring (H), are both 1.26.

Therefore, if the bull's-eye pattern is scanned from left to right (A to L) through the center as described above, and the ratio of distances from black—black (A–C), white—white (B–D), black—black (C–E), . . . white—white (J–L) is accumulated, the color pattern relationship $$AC:BD:CE:DF:EG:FH:GI:HJ:IK:JL=1:1:1:1:1.26:1.26:1:1:1:1$$

will be true where AC, for example, indicates the distance from point A to point C.

This equation defining the relationship of the color pattern of a normal finder pattern is stored to the decoding data memory 220 of ROM 107 as a finder pattern template.

Furthermore, if the center is scanned from right to left (L to A) and the edge-to-edge distances are again expressed as a ratio in the order black—black (L–J), white—white (K–I), black—black (J–H), . . . white—white (C–A), the ratio will be the same, that is, $$LJ:KI:JH:IG:HF:GE:FD:EC:BD:CA=1:1:1:1:1.26:1.26:1:1:1:1$$

As shown in FIG. 27(*a*), the first step is therefore to horizontally scan (in a first scanning direction) the middle of the entire image 2701 of the scanned image containing the MaxiCode symbol to generate a pulse wave (see FIG. 27(*b*)) based on the color pattern of the scan line 2702 and calculate the color pattern relationship equation (color pattern ratio) along that scan line. The detected ratio is then compared by pattern matching with the MaxiCode finder pattern template (FIG. 26(*b*)) stored to decoding data memory 220 in ROM 107. If the detected ratio matches the template, that scan line is defined as a candidate center line in the first scanning direction (first scanning direction center line). Note that this scan line is here defined as a candidate center line because there can be other black and white data that happen to be arranged in the same intervals as the template.

If as shown in FIG. 27(*b*) the number of comparison points in the color pattern ratio and the number of comparison points in the finder pattern template are not the same, it is clear that the line does not pass through the center point 2703 of the finder pattern bullseye. In this case, as shown in FIG. 28, the image is scanned again, bracketing the center line 1 of the entire image 2801 above and below with scan lines 2, 3, and so forth in successive scans. Pattern matching using the detected color pattern ratio and the finder pattern template is repeated after each scan to find the scan line matching a specific pattern as described above, and the scan line determined to match the template most closely is defined as the center line in the horizontal direction.

The midpoint between the intersection of this center line and the inside of the outermost black circle (i.e., the point corresponding to B in FIG. 26(b)), and the intersection of this center line and the inside of the outermost black circle on the opposite side (i.e., the point corresponding to K in FIG. 26(b)), that is, two points on the outside edge of the outermost white circle of the finder pattern, is then found and defined as a candidate center point (first scanning direction center point).

It should be noted that the midpoint between two outside edge points of the outermost white circle is used to obtain the center coordinates instead of using the midpoint is between two outside edge points of the outermost black circle of the finder pattern because black pixel data may touch the outside edge of the outermost black circle of the finder pattern, and the location of this outermost black circle could therefore be misinterpreted.

Figure 30:
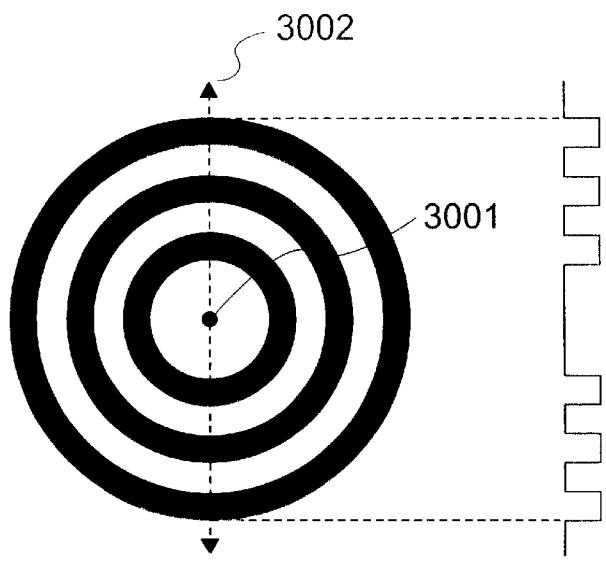
FIG. 30 shows a scan line when the finder pattern is scanned vertically, and the waveform of the resulting detection pattern.

FIG. 30 shows a finder pattern scanned in a second scanning direction. A scan line near the center point of the finder pattern is found, and a candidate center point of the finder pattern is calculated from the found scan line, by scanning from the first scanning direction center point 3001 in a second scanning direction that differs from the first scanning direction, and comparing the color pattern ratio along this second scan line with the finder pattern template.

Scanning is accomplished in a second scanning direction (vertical direction) shifted 90 degrees to the horizontal scanning direction, and the same pattern matching operation applied in the horizontal direction is performed. To scan in the vertical direction, a line (the previously obtained vertical line) orthogonal to the horizontal center line and passing through the previously calculated center point of the center line is scanned. It should be noted that instead of scanning the entire length in the vertical direction of the line passing the center point obtained by scanning horizontally, a color pattern ratio for only one finder pattern template is calculated so that the center point in the first scanning direction is at the center thereof, and this color pattern ratio is then compared with the finder pattern template.

The speed with which the true center coordinates of the finder pattern can be obtained can thus be improved because the above-calculated center point of the horizontal scan line has the highest probability of being the true center point of the finder pattern.

As during horizontal scanning, if the color pattern ratio matches the finder pattern template shown in FIG. 26(b), the midpoint between points on the outside edge of the outermost white circle scanned in the vertical direction is defined as the candidate center point of the finder pattern. If the color pattern ratio does not match the finder pattern template in FIG. 26(b), horizontal scanning is repeated along a scan line vertically separated from the horizontal center line, and the captured data is stored to finder pattern information register 211 of VRAM 106 (see FIG. 28).

It will be obvious to one with ordinary skill in the related art that the order of the vertical and horizontal scanning operations is not important, and either direction can be scanned first.

Finally, the center point of the finder pattern is calculated based on the calculated candidate center point of the finder pattern (S802).

Figure 31:
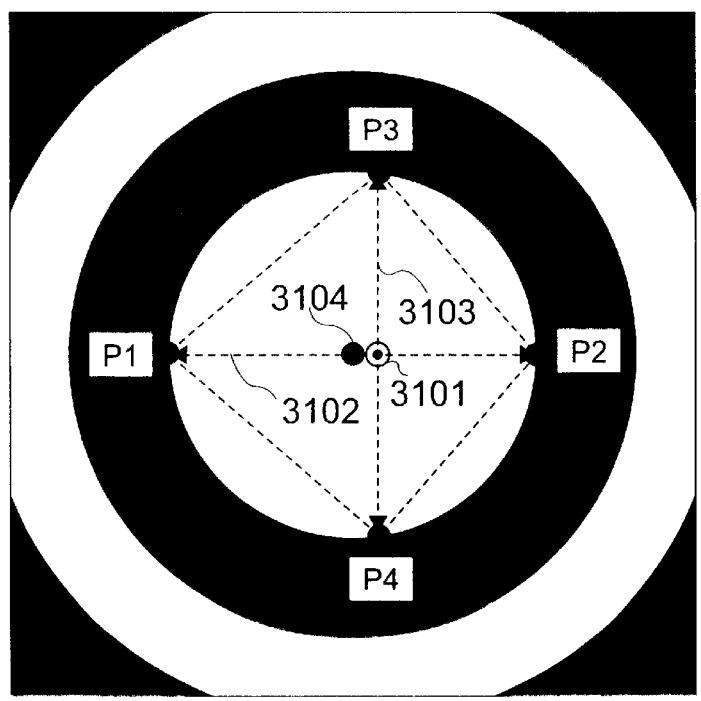
FIG. 31 illustrates calculating the finder pattern center point.

FIG. 31 illustrates calculating the finder pattern center point.

As shown in FIG. 31, the finder pattern is scanned anew in a first scanning direction 3102 to the right and left from finder pattern candidate center point 3101, and the points where the color pattern changes from white to black are labelled P1 and P2. The finder pattern is then scanned anew in a second scanning direction 3103 above and below from the finder pattern candidate center point 3101, and the points where the color pattern changes from white to black are labelled P3 and P4. The barycenter 3104 of the quadrilateral of vertices P1, P2, P3, and P4 is then calculated to obtain the center of the finder pattern. While the candidate center point of the finder pattern can be used as the true center point of the finder pattern, distortion often causes the center point to shift. It is therefore preferable to recalculate the true center point of the finder pattern.

It should also be noted that after scanning and pattern matching in a first scanning direction (horizontal direction in this embodiment), the scanning direction is rotated 90 degrees for scanning and pattern matching in the second scanning direction (vertical direction in this embodiment). The invention is not limited to perpendicular directions, however, as the angle between the first and second scanning directions can be any angle as long as the two scanning directions intersect. In addition, when the scanned data values are stored in VRAM as two-dimensional data in an x-y coordinate system, having the first and second directions mutually perpendicular makes data reading and processing easier.

Figure 9:
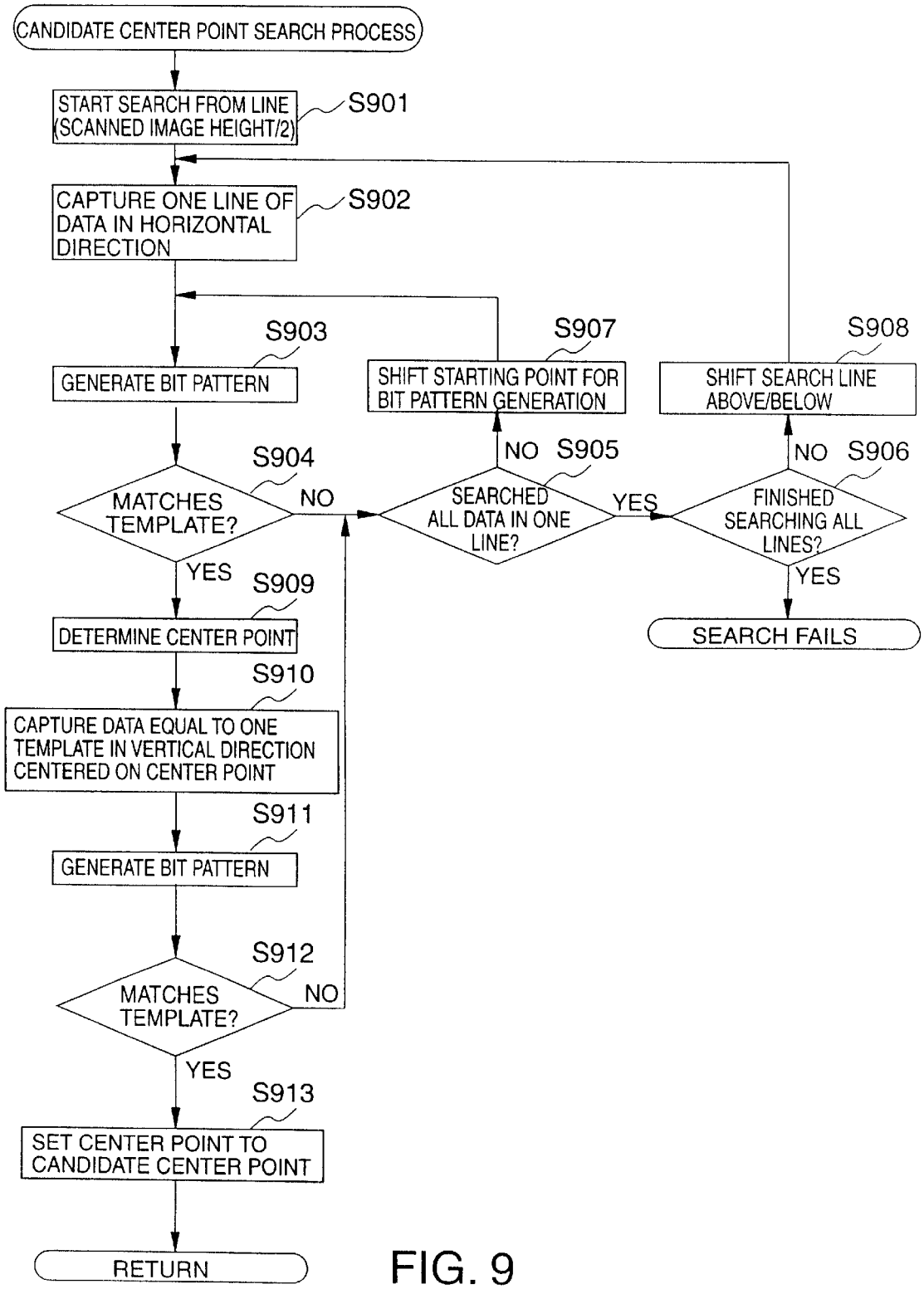
FIG. 9 is a flow chart of a candidate finder pattern center point searching method according to the present invention.

FIG. 9 is a flow chart of the process for finding the candidate center point group in the finder pattern search process.

Searching starts with a line in the middle of the image (captured image height/2) (S901). This is because the symbol is in substantially the middle of an image containing the symbol, and the finder pattern of a MaxiCode or Aztec Code symbol is in the middle of the symbol.

One line of data is then captured in the horizontal direction (S902), and a color pattern ratio (see FIG. 27(b)) of the black and white pattern is generated (S903). The color pattern ratio and above-described finder pattern template are then compared to detect a match therebetween (S904).

If the color pattern ratio and template do not match (S904 returns No) and scanning that horizontal line has not been completed (S905 returns No), it is known that the color pattern ratio was generated for image data other than the finder pattern. The color pattern ratio is therefore regenerated (by steps S907 and S903), and compared again with the finder pattern template (S904).

If the color pattern ratio and template match (S904 returns Yes), the x-y coordinates are obtained and stored for the midpoint between the inside edges of the outermost black circle (the midpoint between B and K in FIG. 26(a)) as the coordinates for the center point of the finder pattern bullseye (S909).

Data corresponding to one template (line) is then captured on a scan line that is perpendicular to the first scanning direction and passes through the center point obtained in step S909 as shown in FIG. 30 (S910). The color pattern ratio is then calculated and compiled (S911), and compared with the finder pattern template (S912).

If the color pattern ratio and finder pattern template do not match (S912 returns No), it is known that the center point obtained in step S909 is not the center point of the finder pattern. The process therefore loops back to scan another line in the horizontal direction (S912 to S905).

If the color pattern ratio and finder pattern template match (S912 returns Yes), the x-y coordinates are obtained and stored for the midpoint between the inside edges of the outermost black circle (the midpoint between B and K in FIG. 26(a)) as the coordinates for a candidate center point of the finder pattern (S913).

If a template match is not found when scanning one line is finished (S904 returns No, S912 No, and S905 Yes), the procedure advances to S906. If scanning all lines is not finished (S906 returns No), the scan line is shifted one line above or below the previous scan line (S908), and the procedure loops back to S902. If scanning all lines is completed (S906 returns Yes), it known that the finder pattern center point could not be found, and the process ends in a failed search.

Figure 10:
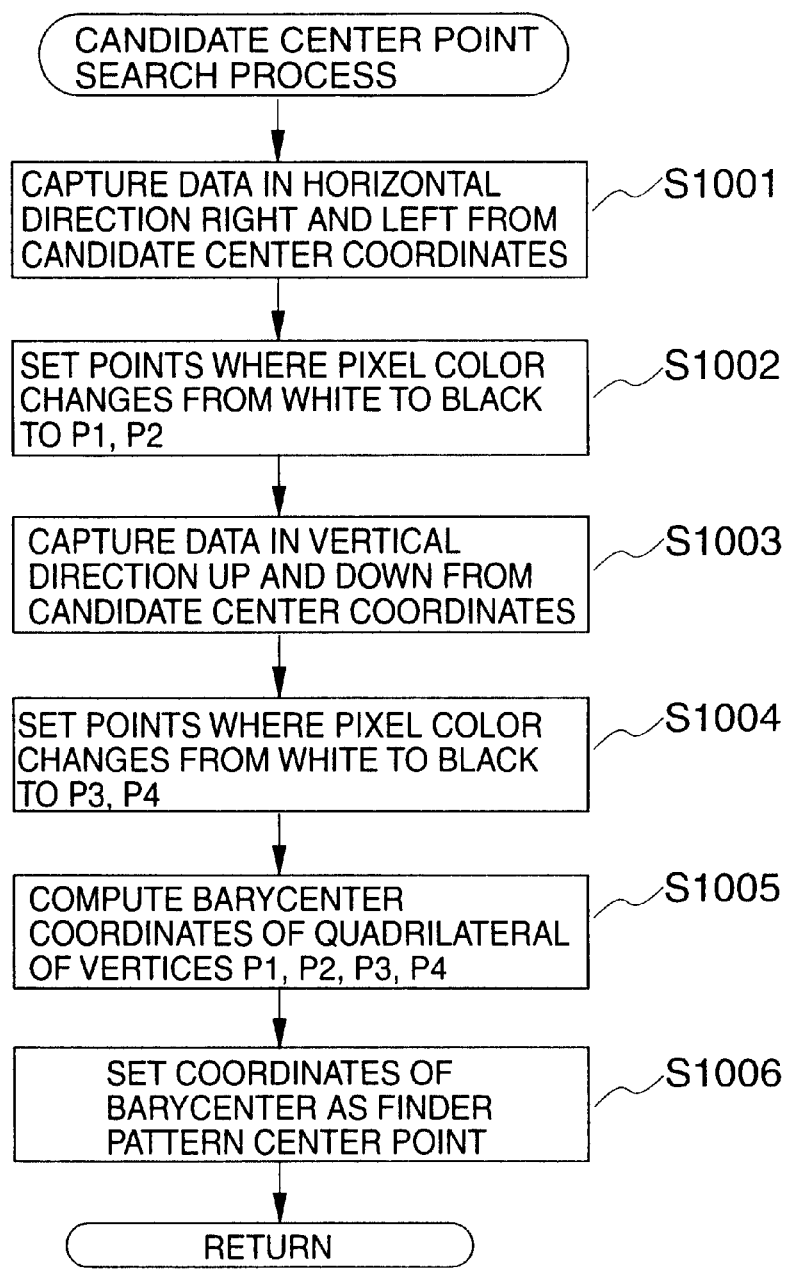
FIG. 10 is a flow chart of a finder pattern center point calculation method for determining the center point in the present invention.

FIG. 10 is a flow chart of a finder pattern center point search process in the finder pattern search process of the present invention.

Data is first captured in a horizontal scanning direction to the right and left of the finder pattern candidate center point obtained as shown in FIG. 9 (S1001), and the points where the pixel color changes from white to black are labelled P1 and P2 (S1002) (see FIG. 31). Data is then captured by scanning the finder pattern from the finder pattern center point obtained as shown in FIG. 9 in a vertical scanning direction (S1003), and the points where the color pattern changes from white to black are labelled P3 and P4 (S1004) (see FIG. 31).

A virtual quadrilateral of vertices P1, P2, P3, and P4 is then calculated, and the x,y coordinates of the barycenter of this quadrilateral are calculated (S1005). The barycenter obtained by this calculation is used as the finder pattern center point (S1006).

Figure 32A:
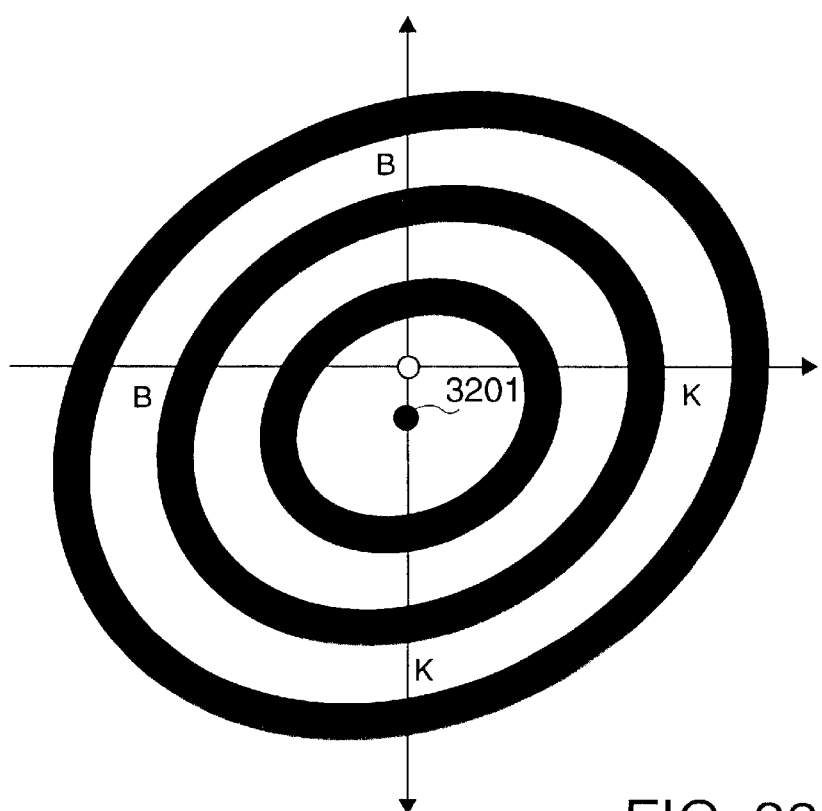
FIG. 32 shows an elliptical finder pattern used to describe a preferred embodiment of the present invention.
Figure 32B:
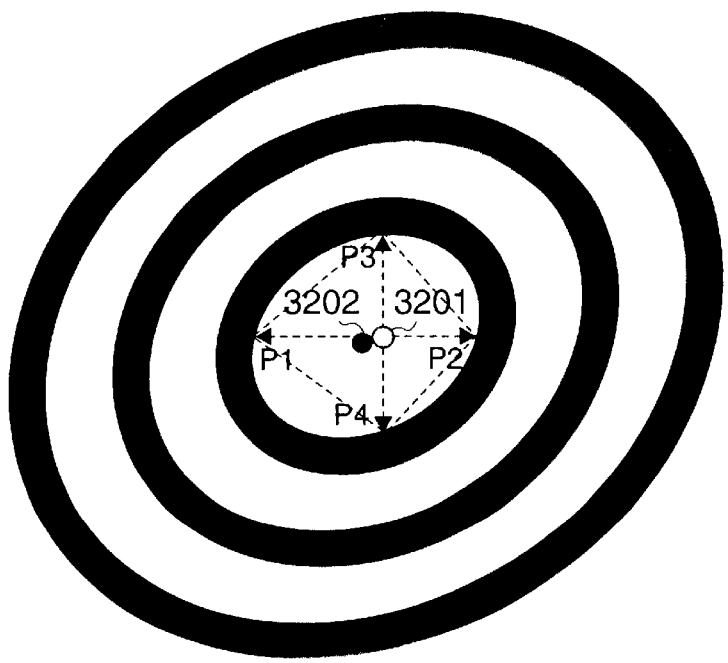

This embodiment of the present invention can thus accurately obtain the center point of the finder pattern even when the finder pattern image is captured from an angle and the finder pattern in the scanned image is no longer circular but elliptical. When the image of the finder pattern is elliptical, the candidate center point 3201 obtained in the process shown in FIG. 9 is often offset from the true finder pattern center point (see FIG. 32($a$)). However, by obtaining the barycenter 3202 as shown in FIG. 10, the finder pattern center point can be accurately located (see FIG. 32($b$)).

A preferred embodiment of the above-noted image correction step is described next below with reference to FIG. 11, FIG. 36, FIG. 37, and FIG. 61.

Figure 11:
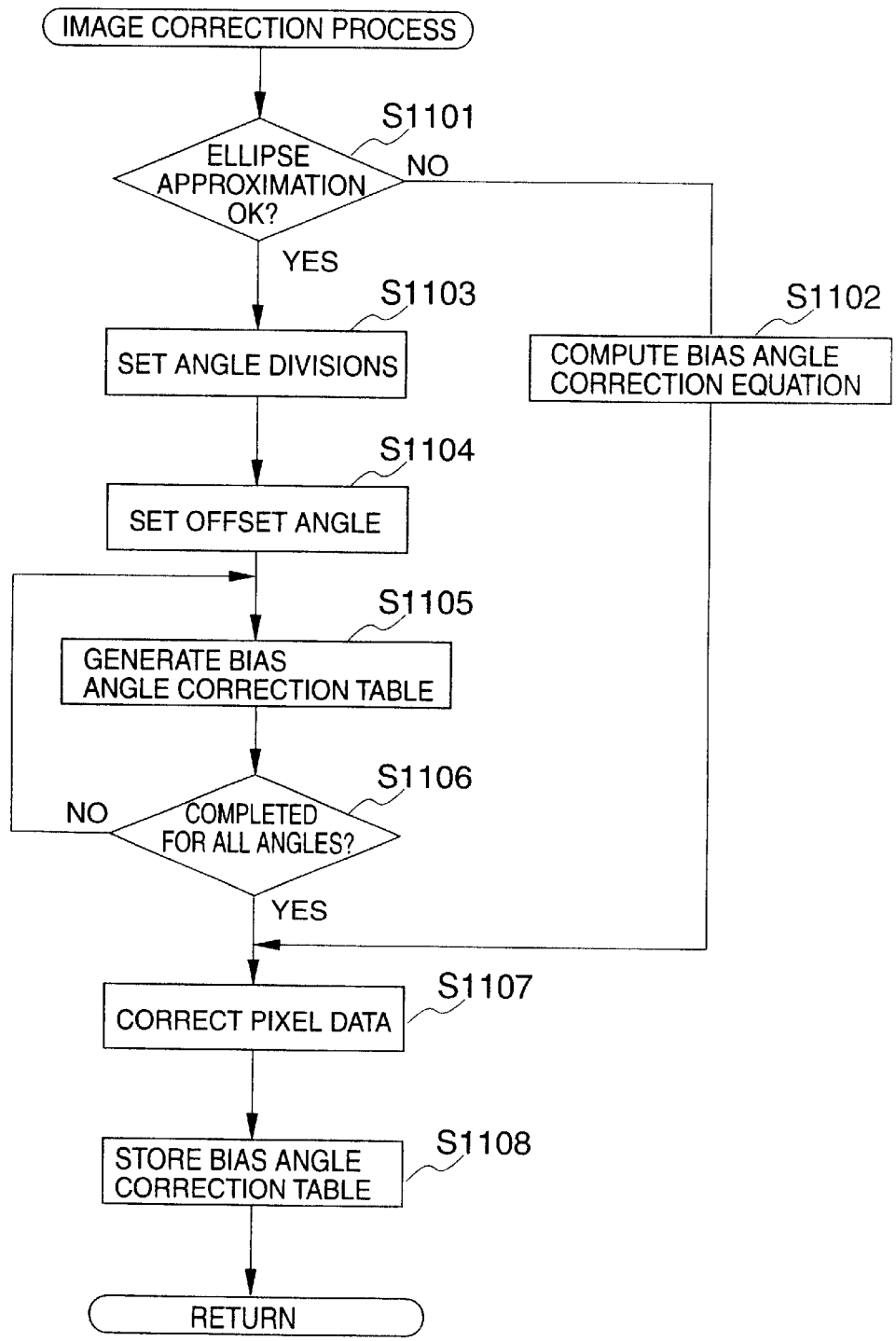
FIG. 11 is a flow chart of an image correction process in a decoding process according to the present invention.

FIG. 11 is a flow chart of the image correction process in the MaxiCode symbol decoding process shown as step S303 in FIG. 3.

As described above, step S302 of the MaxiCode symbol decoding process shown in FIG. 3 searches for the finder pattern and calculates the coordinates for the center point of the finder pattern, and position coordinates for the color boundaries between the white and black circles of the finder pattern as the finder pattern shape information. Furthermore, because all data modules can be found by locating the MaxiCode symbol orientation modules, it is sufficient to apply image correction to the pixel data in the area where the orientation modules are present. It is therefore only necessary for the bias angle correction equation to be true in the image area where the MaxiCode symbol orientation modules are present.

It should be further noted that the orientation modules are adjacent to the finder pattern in a MaxiCode symbol. The bias angle correction equation for the finder pattern can therefore also be applied to the orientation modules.

The image correction process therefore determines whether rings of the finder pattern can be approximated by respective ellipses based on the coordinates of the finder pattern center point and the coordinate groups for the transition points between the black and white rings of the finder pattern (S1011). It should be noted that the finder pattern rings in this case are the circles of the normal MaxiCode symbol finder pattern deformed in the scanned image.

If the finder pattern rings can be approximated by ellipses (S1101 returns Yes), the procedure advances to the next operation (S1103). In this preferred embodiment of the invention the finder pattern rings can be approximated by ellipses if, for example, the distance between the center point C of the scanned image and the center point O of the finder pattern is within a defined range (see FIG. 35) (that is, finder pattern center point 0 is near center point C of the scanned image), and the ratio between the distance between focal point P and center point C, and the length of line segment AB, which is the finder pattern diameter (=length of line PC/length of line segment AB) is greater than or equal to a defined threshold value (that is, the radius of the finder pattern is sufficiently smaller than the distance between focal point P and center point C).

If the finder pattern rings cannot be approximated by ellipses (S1101 returns No), a bias angle correction equation is calculated based on the center point coordinates of the MaxiCode symbol finder pattern and the coordinates of the black and white boundaries in the finder pattern (S1102), and the procedure advances to step S1107.

Note, further, that a bias angle correction table can be directly generated based on the relationship between the shape of the finder pattern in an actual MaxiCode symbol and the shape of the finder pattern in the scanned image, rather than calculating a bias angle correction equation, and then perform step S1107.

The relationship between the circles in a normal finder pattern and the ellipses of the finder pattern in a scanned image when the finder pattern rings can be approximated by ellipses is considered next.

Figure 36:
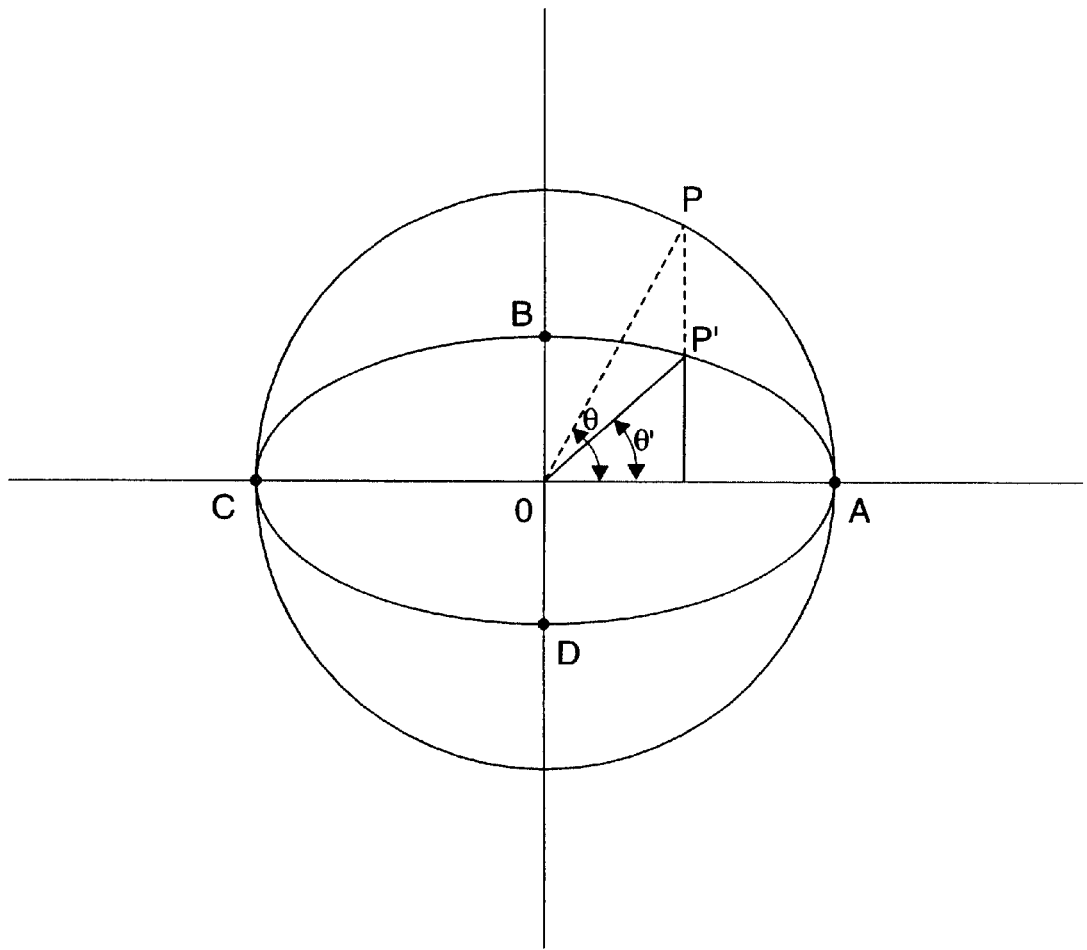
FIG. 36 shows the relationship between a circle and an ellipse.

FIG. 36 shows the relationship between a circle and an ellipse. As shown in FIG. 36, if a circle is distorted into an ellipse in the scanned image captured at an angle, point P on the circle is displaced to point P' on the ellipse. Let us assume, as shown in FIG. 36, that the long axis of the ellipse is on the horizontal axis, the center point is point 0, the long axis is line segment AC, and the short axis is line segment BD. If angle AOP is T and angle AOP' is T', the relationship between angle T and angle T' is as shown in the following bias angle correction equation $$T' = \arctan(\Theta * \tan T)$$

where $\Theta$ is the ratio of the ellipse (=length of line segment B0/length of line segment A0) and "*" is the multiplication operator.

Point P located at angle T on a circle is thus offset to point P' at angle T' on the ellipse.

A bias angle correction table is then generated based on this bias angle correction equation. That is, a table is compiled containing T—T' conversion values, that is, values for conversions between angle T and angle T', generated for each incremental correction angle $\Delta$, which determines correction precision.

This is accomplished by first setting the angle divisions based on the incremental correction angle $\Delta$, which determines the correction precision of the bias angle correction table (S1103). That is, the number of divisions used to correct all angles (360 degrees) is calculated based on incremental correction angle $\Delta$ to set the angle divisions. Note that $\Delta$ is an integer submultiple of 60. It will be noted that the orientation modules indicating the orientation of actual MaxiCode symbol are disposed at 60 degree intervals around the center point of the MaxiCode symbol. Angle division thus segments the full angle every 60 degrees, and then divides 60 degrees every incremental correction angle $\Delta$. That is, angle division expresses angle T using a two-dimensional array or matrix (i,j) resulting in the following equation where i is an integer from 0 to 5, and j is an integer from 0 to n.

$$n=60/\Delta-1$$

$$T(i,j)=60*i+\Delta*j$$

For example, if $\Delta=1$, that is, if the precision of the T—T conversion table is 1 degree, angle T(i,j) is expressed by a 6×60 matrix where i=0–5 and j=0–59.

An offset angle is then set (S1104) for generating a conversion table of values offset by an offset angle from angle T.

As noted above, the three orientation modules, an inside orientation module, outside orientation module, and center orientation module, of each orientation module group have nearly the same orientation in a MaxiCode symbol. The offset angle is therefore set to an angle between the orientation of the inside orientation module and outside orientation module, and the orientation of the center orientation module.

Figure 37:
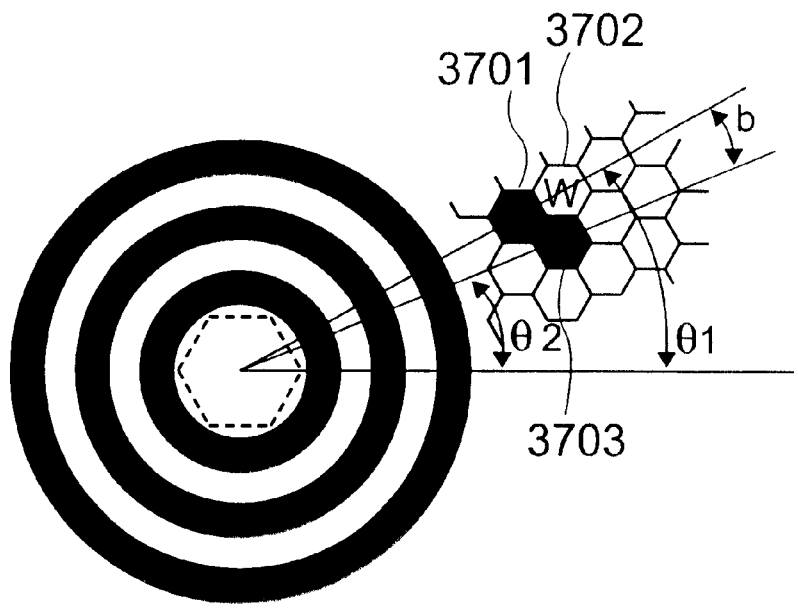
FIG. 37(a) shows the orientation module in an actual MaxiCode symbol, and (b) shows the orientation module in a scanned image.
Figure 37:
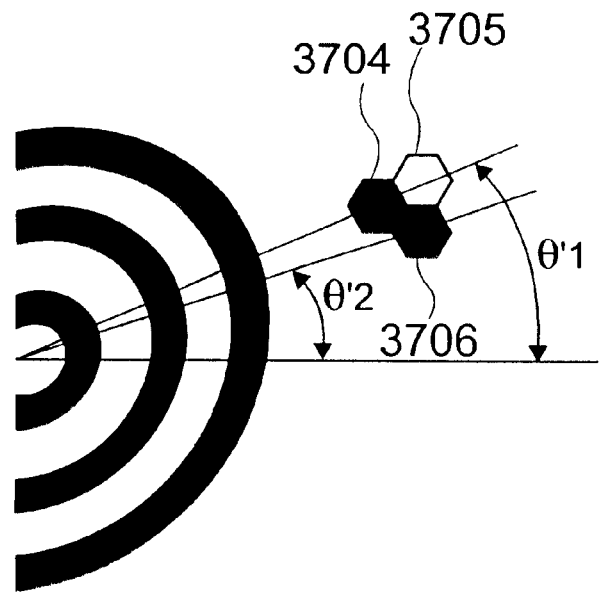

FIG. 37 shows the relationship between the angle of the inside orientation module and outside orientation module and the angle of the center orientation module. FIG. 37(a) shows the orientation modules in an actual MaxiCode symbol, and FIG. 37(b) shows the orientation modules in a scanned image.

As shown in FIG. 37(a), offset angle E is defined by the following equation $$E\ 1-T2$$

where angle T1 is the angle between the horizontal axis and the orientation of inside orientation module 3701 and outside orientation module 3702, and angle T2 is the angle between the horizontal axis and center orientation module 3703.

Figure 61:
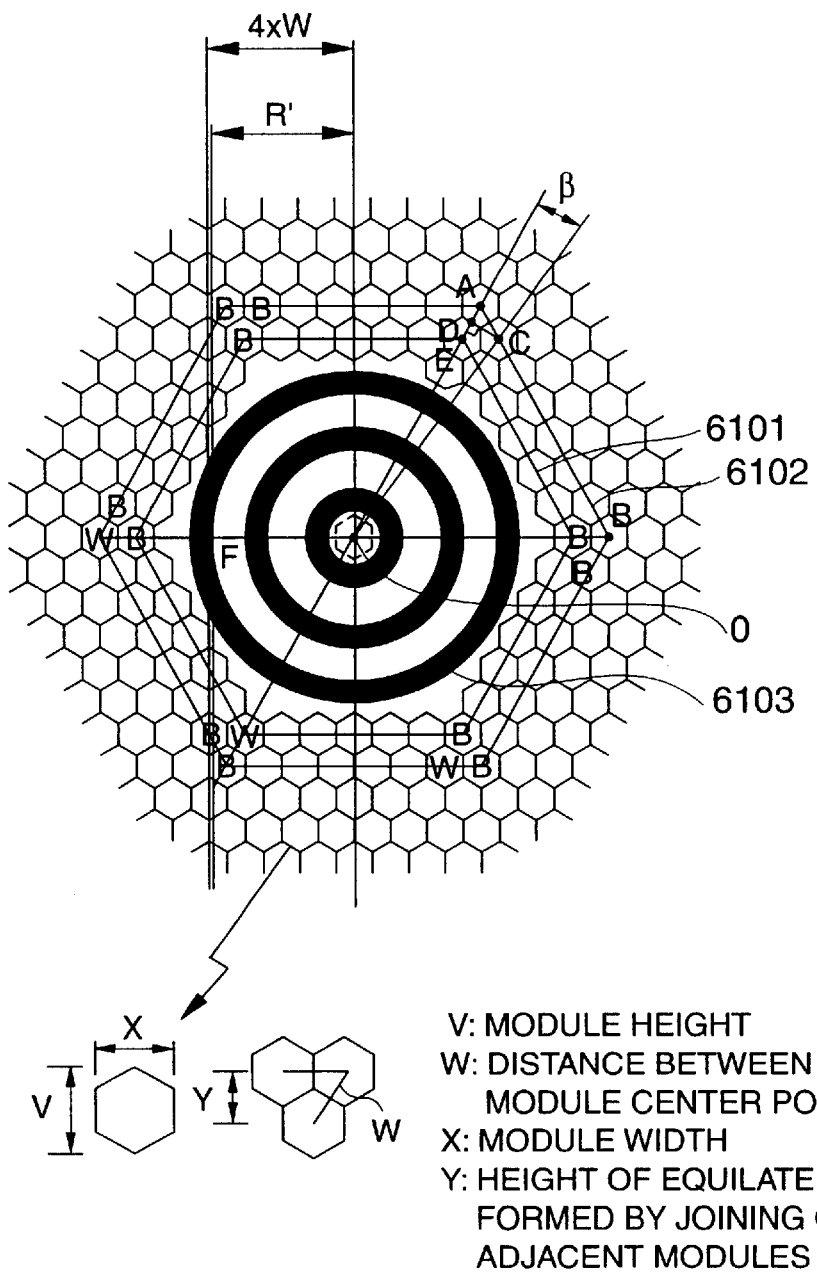
FIG. 61 shows the finder pattern and orientation modules in an actual MaxiCode symbol.
Figure 62A:
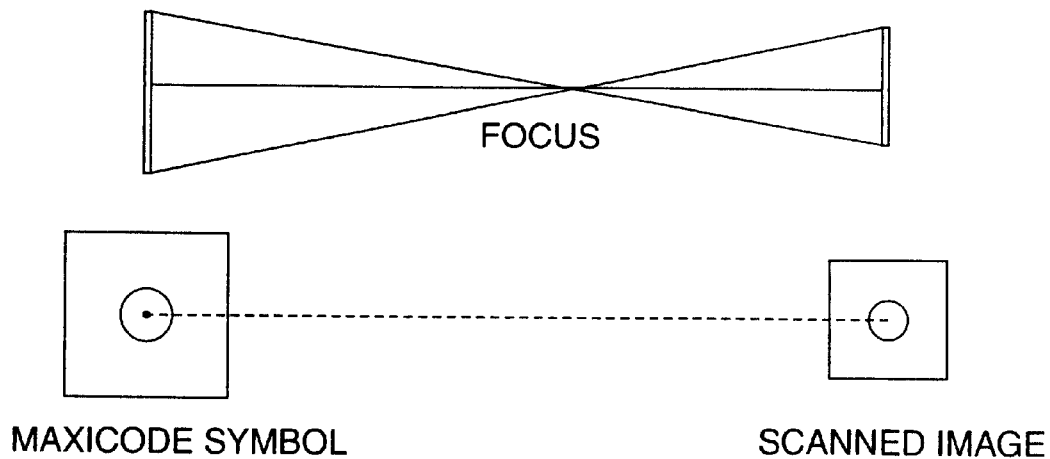
FIG. 62(a) shows the relationship between a MaxiCode symbol and a scanned image of a MaxiCode symbol captured from the front, and (b) shows the relationship between a MaxiCode symbol and a scanned image of a MaxiCode symbol captured from an angle.
Figure 62B:
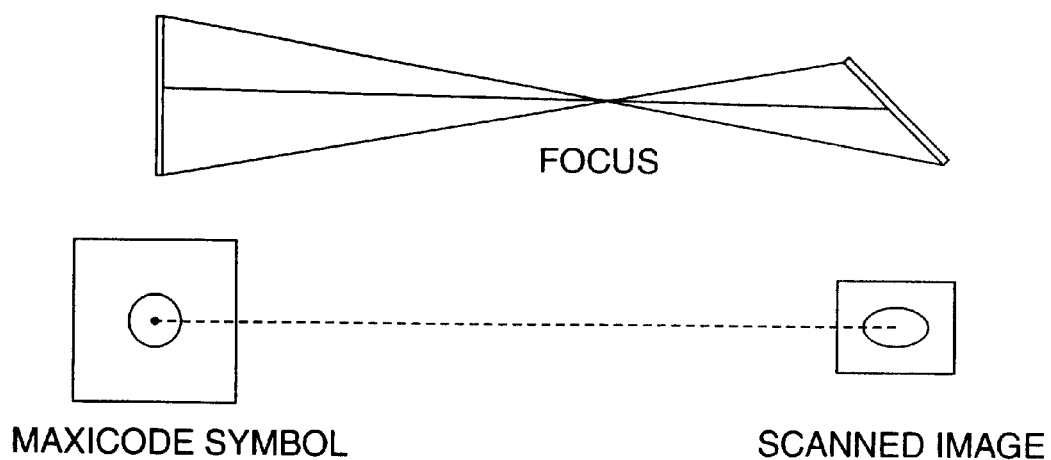
Figure 63A:
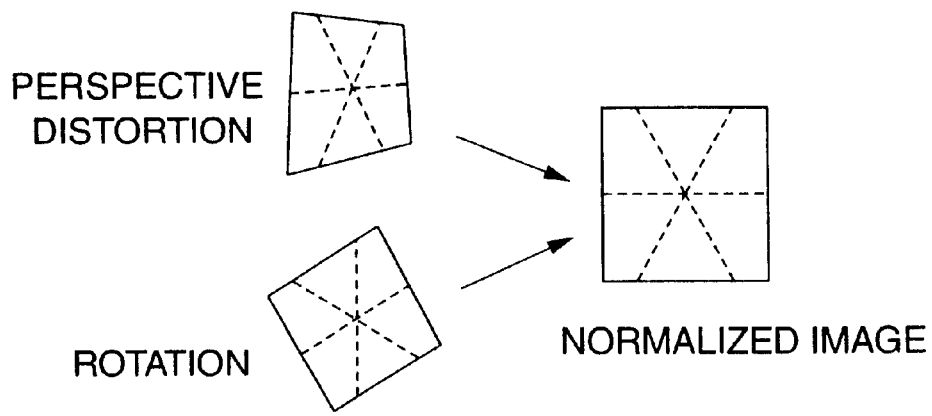
FIG. 63(a) shows some types of image distortion, and (b) shows a decoding processing using image data corrected by normalization.
Figure 63B:
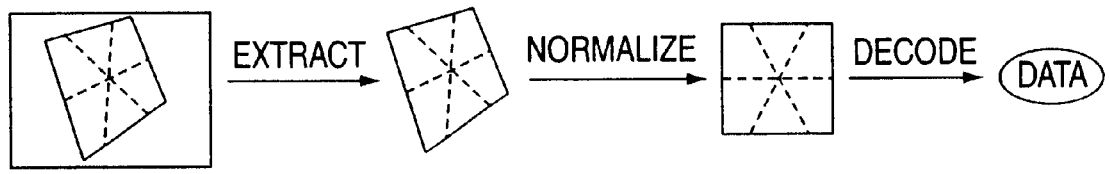

As shown in FIG. 61, the following equations are true where point 0 is the center point of the MaxiCode symbol, point D is the midpoint between the center point of the inside orientation module and the center point of the outside orientation module, points A is the center point of the outside orientation module, point C is the center point of the center orientation module, and W is the module width (distance between adjacent module center points).

length of line segment $0D 6.5*W$ length of line segment $DC$=sqr $3/2*W$ tan $E$ sqr $3/(2*6)$ As noted above, offset angle E can then be expressed as $$E=\text{arctan (sqr } 3/(2*6))\ |7.59$$

Referring to FIG. 37(a), the relationship between angle T1(i,j) and angle T2(i,j) is defined by the equation $$T2\ (i,j)=T1\ (i,j)-E.$$

Next, a bias angle correction table using ellipse approximation is then generated based on the angle divisions (S1105).

As shown in FIG. 36, if a circle is distorted to an ellipse in the scanned image captured from an angle, point P on the circle is displaced to point P' on the ellipse. Therefore, as shown in FIG. 37(b), if point P' is the center point of inside orientation module 3704 or outside orientation module 3705, angle T1'(i,j) between the horizontal axis and inside orientation module 3704 and outside orientation module 3705 is determined by the bias angle correction equation $$T1'(i,j)=\text{arctan }(\Theta*\tan T1\ (i,j))$$

when i=0, 1, or 2.

$$T1'(i,j)=T1'(i-3,j)+180$$

when i=3,4, or 5.

Furthermore, if the offset angle is E, angle T2' (i,j) between the horizontal axis and center orientation module 3706 is determined by the bias angle correction equation $$T2'(i,j)=\text{arc tan }(\theta*\tan T2\ (i,j))$$

$$T2\ (i,j)=T1\ (i,j)-E$$

when i=0, 1, or 2.

$$T2\ (i,j)=T2'(i-3,j)+180$$

when i=3,4, or 5.

Therefore, angle T2, angle T1', and angle T2' for angle-divided angle T1 are calculated using the above bias angle correction equations, and the results are stored as elements of the bias angle correction table.

Whether the elements of the bias angle correction table have been calculated for all angle divisions is then determined (S1106). If they have (S1106 returns Yes), the procedure advances to step S1107. If not (S1106 returns No), step S1105 is repeated until the bias angle correction table elements have been calculated at all angles.

The pixel data of the scanned image is then corrected based on the resulting bias angle correction table (S1107).

Finally, the resulting bias angle correction table is stored to the image correction data register 212 of VRAM 106 (S1108). It will be obvious to one with ordinary skill in the related art that the bias angle correction equations and division information could be stored instead of the bias angle correction table. In addition, the bias angle correction table can store the bias angle correction equations and division information.

The above-noted orientation module search step is described next below with reference to FIG. 12, FIG. 38, FIG. 39, and FIG. 61.

Figure 12:
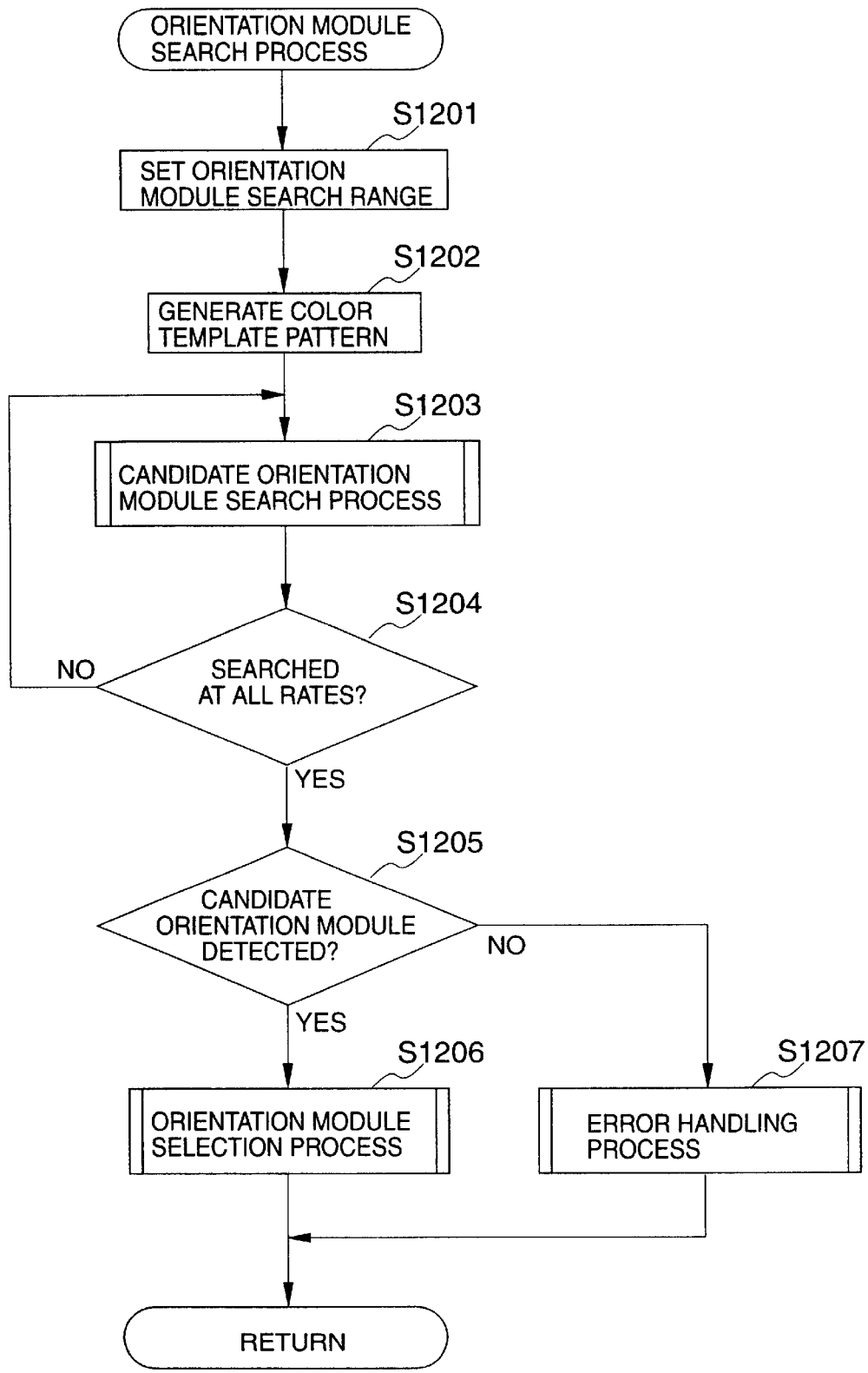
FIG. 12 is a flow chart of an orientation module search process in the decoding process of the present invention.

FIG. 12 is a flow chart of the orientation module search process in the MaxiCode symbol decoding process of the present invention.

The first step is to set the orientation module search range (S1201).

FIG. 61 shows the relationship between the finder pattern and orientation modules in an actual MaxiCode symbol. As shown in FIG. 61, virtual polygon 6101 connecting the center points of the inside orientation modules of the MaxiCode symbol is a regular hexagon of which the length of one side is six times the module width W, and virtual polygon 6101 connecting the center points of the outside orientation modules is a regular hexagon of which the length of one side is seven times the module width W Note that the module width W is the distance between the center points of two adjacent modules. In addition, point 0 is the center point of the MaxiCode symbol, point E is the center point of an inside orientation module, point D is the midpoint between the center point of an inside orientation module and the center point of an outside orientation module, point A is the center point of an outside orientation module, and point C is the center point of a center orientation module.

The center point of an inside orientation module is therefore found on a circle of which the radius is line segment 0E, the center point of an outside orientation module is found on a circle of which the radius is line segment 0A, the center point of a center orientation module is found on a circle of which the radius is line segment 0C, and each is dependent upon module width W The lengths of line segments 0E, 0A, and 0C are shown below.

length of line segment 0E=6.000*W length of line segment 0A=7.000*W length of line segment 0C=sqr ((length of line segment 0D) 2+(length of line segment DC) 2)

$$|6.543*W$$

Figure 38A:
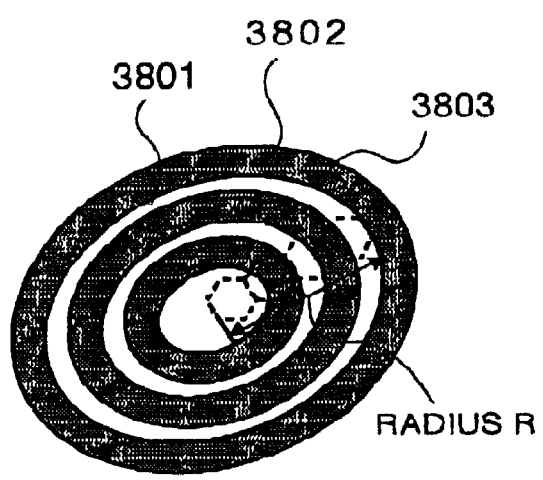
FIG. 38(a) shows the module width, and (b) shows the relationship between module width and the center point of the inside orientation module.
Figure 38B:
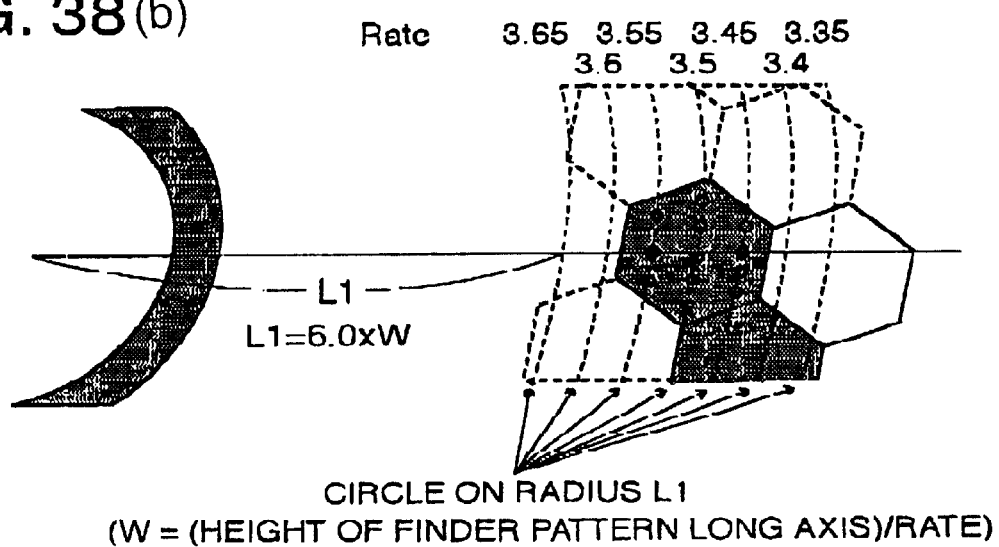

The search range for orientation modules in the scanned image of a MaxiCode symbol is described below with reference to FIG. 38. FIG. 38(a) shows the module width W. and FIG. 38(b) shows the relationship between module width W and the center point of an inside orientation module.

As shown in FIG. 38(a), module width W is calculated from the radius of color boundary 3803 between the white 3801 and black 3802 parts of the finder pattern. As shown in FIG. 61, color boundary 6103 is a circle in the scanned image of a MaxiCode symbol captured from the front (that is, not at an angle), but when the scanned image is captured at an angle the color boundary 3803 is a shape resembling an ellipse as shown in FIG. 38(a).

As also shown in FIG. 61, the following equation is true where point F (FIG. 61) is a point on circular color boundary 6103 and R' is the radius of the circle.

$$R'<4.0*W$$

Therefore, if the radius of color boundary 3803 in FIG. 38(a) is R, module width W can be calculated as $$W=R/n$$

where n is the rate, that is, a variable correlating radius R and module width W In this case rate n is a value from 4.00 to 3.00 in increments of 0.05.

As shown in FIG. 38(b), rate n is varied while searching for the center point of the inside orientation module because the center point of the inside orientation module is located on a circle of radius L1. In this preferred embodiment is radius L1=6.000*W.

The center points of the outside orientation module and center orientation module are likewise on circles of radii L2 and L3 (not shown), respectively. Therefore, the center points of the outside and center orientation modules are therefore also searched for while varying rate n. In this preferred embodiment is radius L2=7.000 *W and radius L3=6.543*W.

Furthermore, as shown in FIG. 61, the line connecting center point 0 and center point C of a center orientation module forms an angle E to the line joining center point 0 and center point A of the outside orientation module. Angle E is referred to here as the offset angle of the center orientation module. This center orientation module offset angle is defined as:

$$\tan E=(\text{length of segment } DC)/(\text{length of segment } 0D) E|7.59.$$

The orientation module search range is thus set.

Next, a color template pattern is generated for the inside orientation module group, outside orientation module group, and center orientation module group using the bit values black=1 and white=0 (S1202). Note that the inside orientation module group consists of the set of six inside orientation modules (one in each of the six orientation module groups), the outside orientation module consists of the set of six outside orientation modules, and the center orientation module group consists of the set of six center orientation modules.

Figure 39:
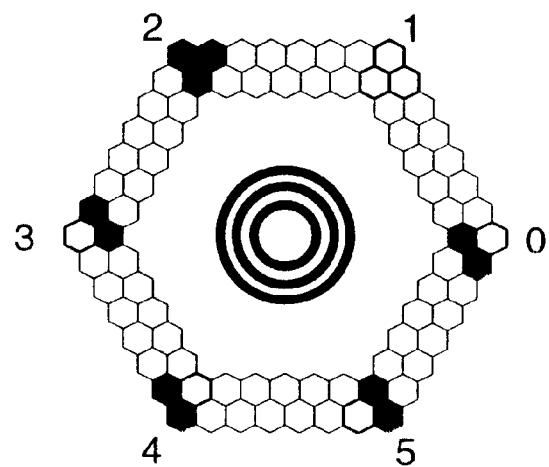
FIG. 39 shows a color template pattern.

FIG. 39 shows an exemplary color template pattern. As shown in FIG. 39 the six orientations are shown as orientation 0 to orientation 5. The color template pattern is generated by compiling a bit pattern where black=1 and white=0 twice for each orientation 0 to orientation 5.

The color template patterns for the inside orientation module group, outside orientation module group, and center orientation module group thus compiled are shown below.

color template pattern of the inside orientation module group=101101101101 color template pattern of the outside orientation module group=001011001011 color template pattern of the center orientation module group=101110101110.

Next, candidate orientation modules in the inside orientation module group, outside orientation module group, and center orientation module group matching the color template pattern are searched based on rate n (S1203). If there are no orientation modules matching the color template pattern, it is concluded that there is no candidate orientation module data.

Whether there is any candidate orientation module data that was found based on all defined rates n is then determined (S1204). If there is (S1204 returns Yes)), the procedure advances to step S1205. If no such candidate orientation module data was found (S1204 returns No), step S1203 is repeated until candidate orientation module data based on all defined rates n is found.

Whether any candidate orientation module data is present is then determined (S1205). If there is (S1205 returns Yes), the orientation modules are determined from the candidate orientation module data (S1206), and the orientation module search process ends.

If there is no candidate orientation module data (S1205 returns No), an error is generated indicating that an orientation module could not be found (S1207), and the decoding process ends.

The above process for finding candidate orientation module data is described in further detail next.

Figure 13:
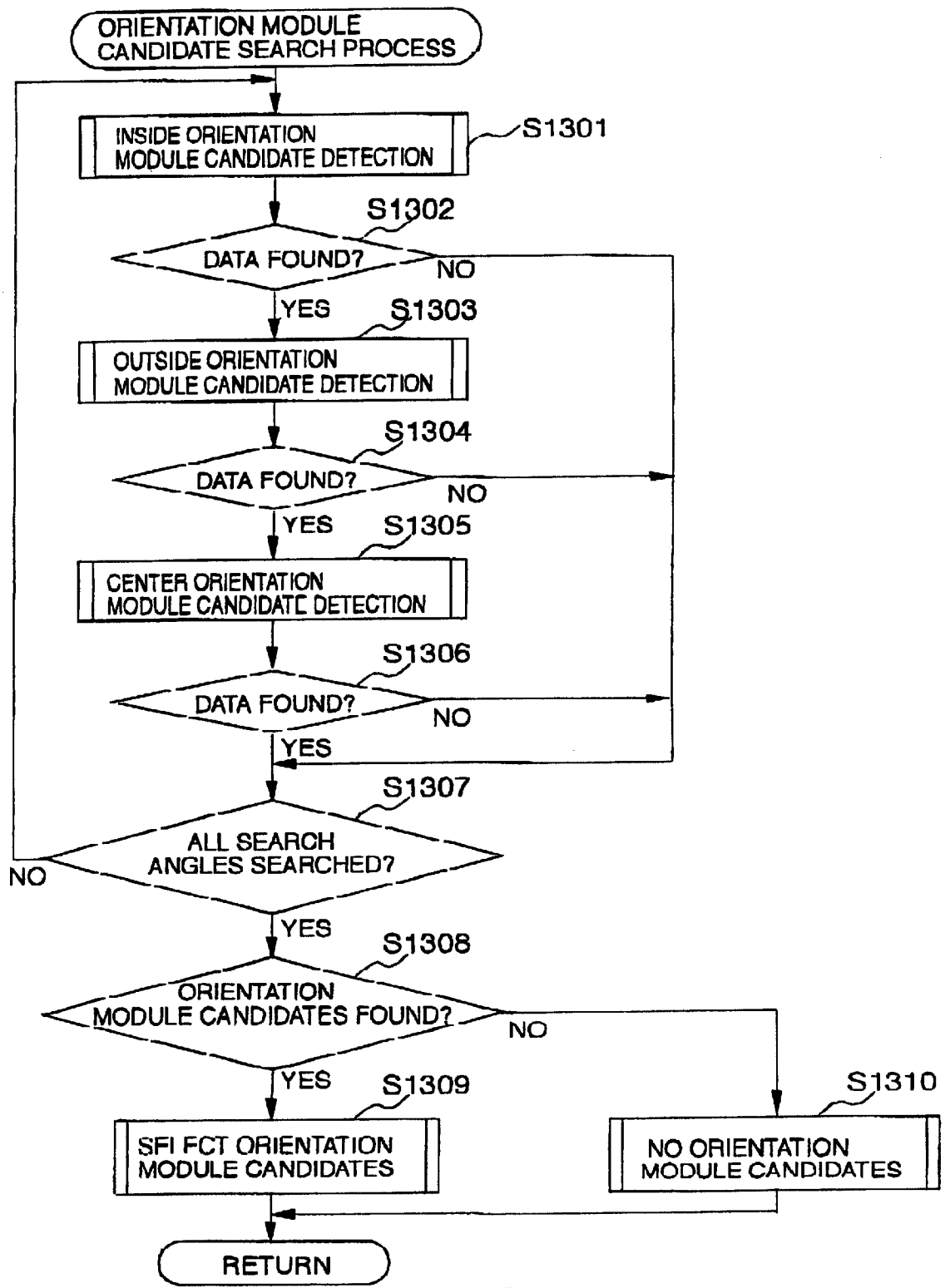
FIG. 13 is a flow chart of an orientation module candidate search process in the orientation module search process shown in FIG. 12.

FIG. 13 is a flow chart of the candidate orientation module data search process in the orientation module search process.

As described in step S1201 in FIG. 12, the members of the inside orientation module group are found on a circle of radius L1, the members of the outside orientation module group are found on a circle of L2, and the members of the center orientation module group are found on a circle of radius L3 based on rate n. The offset angle of the center orientation modules is angle E. In addition, the six inside orientation modules constituting the inside orientation module group are located at 60 degree intervals around the finder pattern center point. The same is true for the six orientation modules of the outside orientation module group and the six orientation modules of the center orientation module group.

The orientation module search angle T is expressed by dividing the full angle every 60 degrees and then dividing these 60 degree divisions every search increment angle Δ using a two-dimensional matrix (i,j), and the orientation modules are then found. Note that i is an integer from 0 to 5, and j is an integer from 0 to n.

$n=60/\Delta-1$ $T(i,j)=60*i+\Delta*j$

For example, if search increment angle $\Delta=1$, angle $T(i,j)$ is expressed by a 6×60 matrix where i is an integer from 0 to 5 and j is an integer from 0 to 59. The angle area represented by i is area i. For example, the area where i=0, that is, 0<=T<60, is area 0.

An inside orientation module group matching the color template pattern of the inside orientation module group is first detected at search angle T to detect inside orientation module candidates (S1301).

Whether inside orientation module candidates were found is then determined (S1302). If they were (S1302 returns Yes), the procedure advances to step S1303. If not (S1302 returns No), the procedure advances to step S1307 to shift to the next search angle.

Next, an outside orientation module group matching the color template pattern of the outside orientation module group is detected to detect outside orientation module candidates (S1303).

Whether outside orientation module candidates were found is then determined (S1304). If they were (S1304 returns Yes), the procedure advances to step S1305. If not (S1304 returns No), the procedure advances to step S1307 to shift to the next search angle.

Next, a center orientation module group matching the color template pattern of the center orientation module group is detected to detect center orientation module candidates (S1305).

Whether center orientation module candidates were found is then determined (S1306). If they were (S1306 returns Yes), the procedure advances to step S1307. If not (S1306 returns No), the procedure advances to step S1307 to shift to the next search angle.

Whether every search angle was used to locate the candidates is then determined (S1307). If all search angles were searched (S1307 returns Yes), the procedure advances to step S1308. If not (S1307 returns No), steps S1301 to S1306 are repeated until all search angles have been searched.

It should be noted that because the orientation modules are placed at regular 60 degree intervals around the center point of the finder pattern, the search range of search angle T is a search angle division between 0 degrees and less than 60 degrees. Search angle T can therefore be thought of as area 0.

Next, whether candidates for the inside orientation modules, outside orientation modules, and center orientation modules were found is determined (S1308). If it was (S1308 returns Yes), orientation module candidates consisting of the inside orientation module candidates, outside orientation module candidates, and center orientation module candidates found at rate n is fixed (S1309), and the orientation module candidate search process ends.

However, if there is no inside orientation module candidate, outside orientation module candidate, or center orientation module candidate (S1308 returns No), an error handling process is run because no orientation module candidate was found at rate n (S1310), and the orientation module candidate search process ends.

It should be noted that step S1301 for detecting inside orientation module candidates, step S1303 for detecting outside orientation module candidates, and step S1305 for detecting center orientation module candidates in the above orientation module candidate search process do not depend on any particular order. These steps can be performed in any order insofar as the inside orientation module candidates, outside orientation module candidates, and center orientation module candidates can be detected.

A process for detecting the inside orientation module candidates in the above orientation module candidate search process is described in further detail below.

Figure 14:
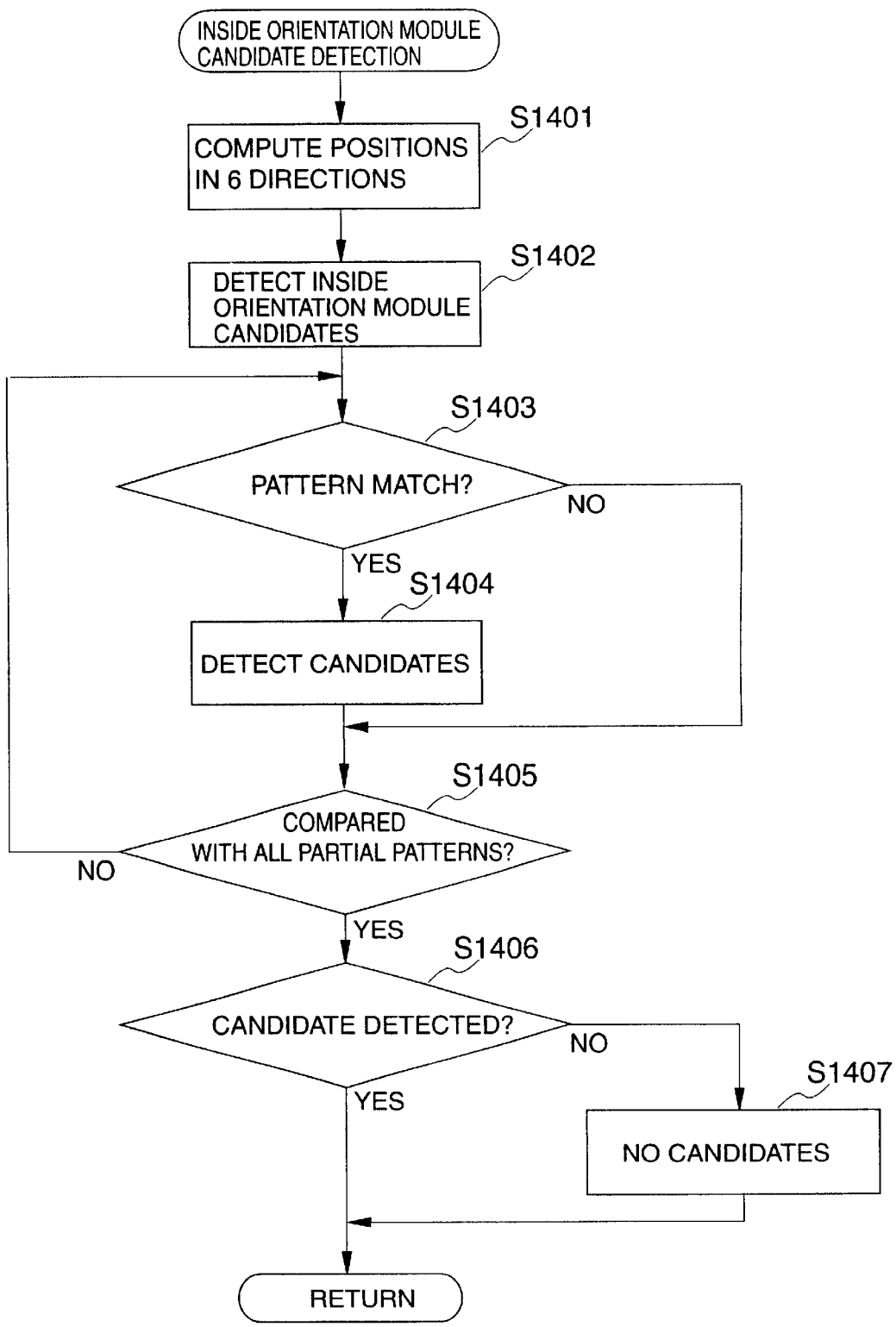
FIG. 14 is a flow chart of an inside orientation module candidate search process in the orientation module candidate search process shown in FIG. 13.

FIG. 14 is a flow chart of the inside orientation module candidate search process in the above orientation module candidate search process.

Because an inside orientation module is present in six directions, it is assumed that one inside orientation module is present at search angle T, and the positions of the candidate inside orientation modules in the six directions are calculated (S1401).

Figure 40:
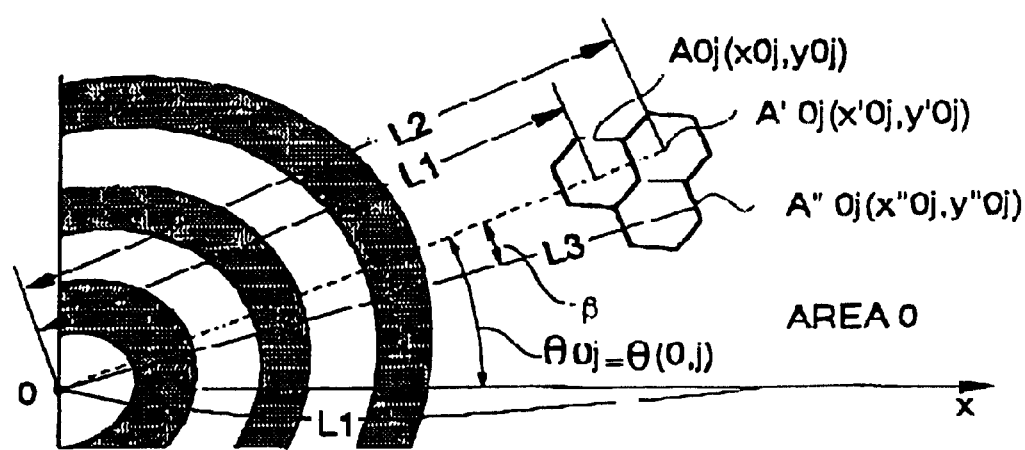
FIG. 40 shows the location of a candidate orientation module at search angle T.

FIG. 40 shows the position of a candidate orientation module at search angle T where the finder pattern center point is point 0, the center point of the candidate inside orientation module present on a circle of radius L1 in area i is point A'ij, and the angle between line segment 0Aij and the x-axis is angle Tij; the center point of the candidate outside orientation module present on a circle of radius L2 is point A'ij; the center point of the candidate center orientation module present on a circle of radius L3 is point A"ij; and the offset angle of the center orientation module is E. In addition, the coordinates of point Aij are (xij, yij), the coordinates of point A'ij are (x'ij, y'ij), the coordinates of point A"ij are (x"ij, y"ij), and the coordinates of point Tij is T(i,j).

As shown in FIG. 40, the location of point A0j in area i=0 is defined by the following equations.

$x0j=L1* \sin(T0j)$ $y0j=L1* \cos(T0j)$ $T0j=T(0,j)$

The center points Aij of the candidate inside orientation modules in the six directions can therefore be expressed by the following equations.

$xij=L1* \sin(Tij)$ $yij=L1* \cos(Tij)$ $Tij=T(i,j)=T0j+60*i$

The color of the pixel data corresponding to the candidate inside orientation modules present in the six calculated directions is then extracted and converted to a bit pattern where black=1 and white=0 as noted above (S1402). The bit pattern of the candidate inside orientation module group comprising the bit patterns of the candidate inside orientation modules present in the converted six directions is then set as the candidate inside orientation module pattern.

The candidate inside orientation module pattern is then compared with part of the color template pattern of the inside orientation module group to detect a match therebetween (S1403). The pattern from the k-th value from the left side of the pattern to the (k+6) value in the color template pattern of the inside orientation module group is then used as the inside color template partial pattern. This partial pattern and the candidate inside orientation module pattern are then compared to detect a match therebetween. Note that k is referred to herein as the starting number, and only needs to vary from 1 to 6.

If the inside color template partial pattern and candidate inside orientation module pattern match (S1403 returns Yes), the candidate inside orientation modules located in the six directions are used as the candidate data for the inside orientation modules (S1404), and the procedure advances to step S1405 for comparison with the next inside color template partial pattern.

If the inside color template partial pattern and candidate inside orientation module pattern do not match (S1403 returns No), the procedure advances to step S1405 for comparison with the next inside color template partial pattern.

For example, if the candidate inside orientation module pattern is 110110, the color template pattern of the inside orientation module group is 101101101101, and there is a match with the inside orientation module pattern 110110 when k=3 and when k=6. The candidate inside orientation module is therefore detected as the inside orientation module candidate. However, if the candidate inside orientation module pattern is 100110, there is no inside color template partial pattern that matches.

Whether all inside color template partial patterns and candidate inside orientation module patterns have been compared is then determined (S1405). More specifically, it is determined whether comparisons have been made for all starting numbers k from 1 to 6. If not all inside color template partial patterns and candidate inside orientation module patterns have been compared (S1405 returns No), steps S1403 to S1404 are repeated until all patterns have been compared and S1405 returns Yes.

If all inside color template partial patterns and candidate inside orientation module patterns have been compared (S1405 returns Yes), whether the inside orientation module candidate has been detected is determined (S1406). If it has and S1406 returns Yes, the inside orientation module candidate detection process ends. If not (S1406 returns No), S1407 determines that there is no candidate data and the inside orientation module candidate detection process ends.

A process for detecting the outside orientation module candidate in the above orientation module candidate search process is described in further detail below.

Figure 15:
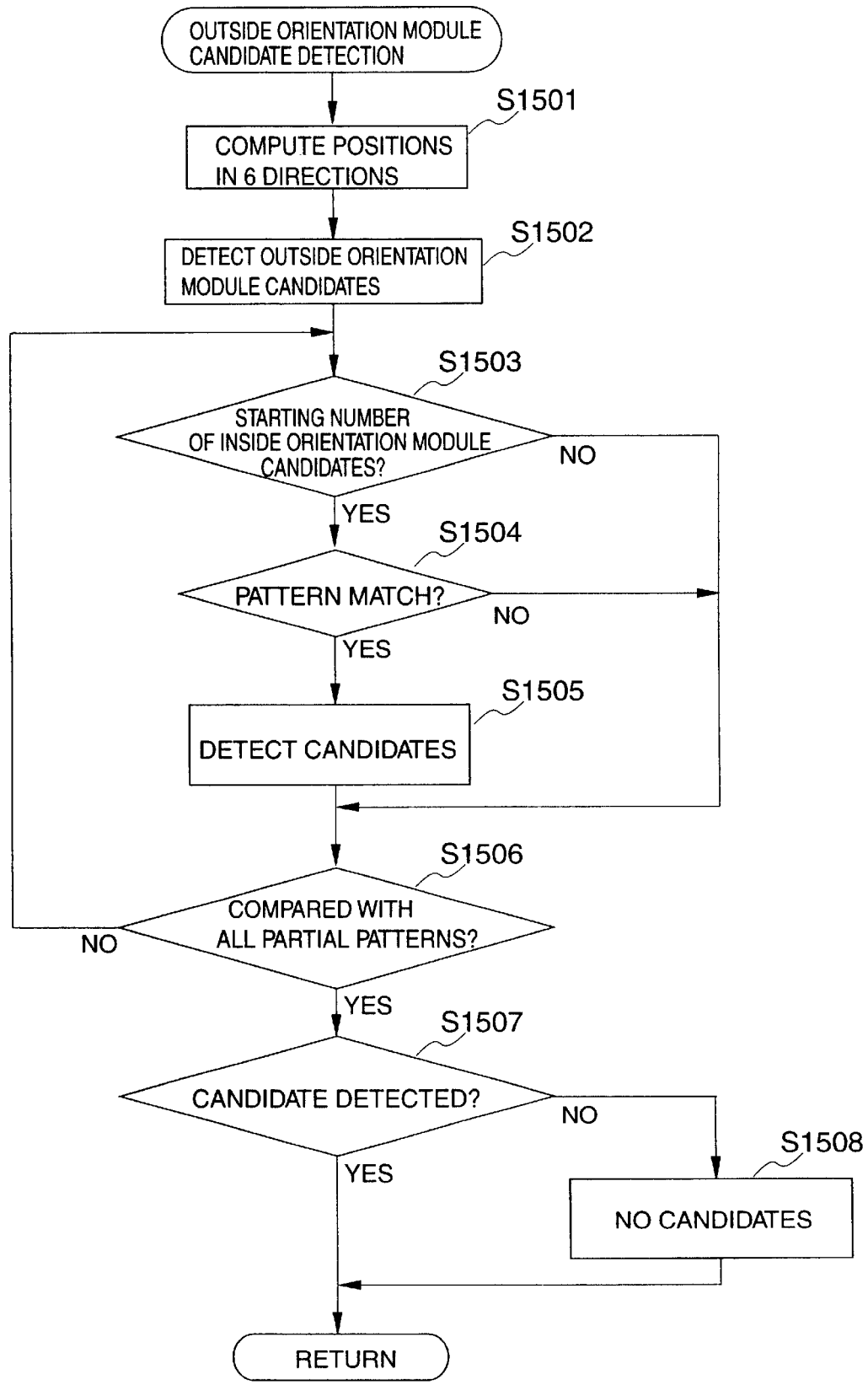
FIG. 15 is a flow chart of is a flow chart of an outside orientation module candidate search process in the orientation module candidate search process shown in FIG. 13.

FIG. 15 is a flow chart of the outside orientation module candidate search process in the above orientation module candidate search process.

Because an outside orientation module is present in six directions, it is assumed that one outside orientation module is present at search angle T, and the positions of the candidate outside orientation modules in the six directions are calculated (S1501).

As shown in FIG. 40, the location of point A'0j in area i=0 is defined by the following equations.

$$x'0j = L2 * \sin(T0j)$$

$$y'0j = L2 * \cos(T0j)$$

$$T0j = T(0,j)$$

The center points A'ij of the candidate outside orientation modules in the six directions can therefore be expressed by the following equations.

$$x'ij = L2 * \sin(Tij)$$

$$y'ij = L2 * \cos(Tij)$$

$$Tij = T(i,j) = T0j + 60 * i$$

The color of the pixel data corresponding to the candidate outside orientation modules present in the six calculated directions is then extracted and converted to a bit pattern where black=1 and white=0 as noted above (S1502). The bit pattern of the candidate outside orientation module group comprising the bit patterns of the candidate outside orientation modules present in the converted six directions is then set as the candidate outside orientation module pattern.

Whether starting number k matches that of the inside orientation module candidates is determined next (S1503). An outside color template partial pattern is generated from the color template pattern of the outside orientation module group based on starting number k in the same way as the inside color template partial pattern.

If starting number k matches that of the inside orientation module candidates (S1503 returns Yes), the candidate outside orientation module pattern and outside color template partial pattern are compared to detect a match therebetween (S1504).

If starting number k does not match that of the inside orientation module candidates (S1503 returns No), the procedure advances to step S1506 for comparison with the next outside color template partial pattern.

If the outside color template partial pattern and candidate outside orientation module pattern match (S1504 returns Yes), the candidate outside orientation modules located in the six directions are used as the candidates for the outside orientation modules (S1505), and the procedure advances to step S1506 for comparison with the next outside color template partial pattern.

If the outside color template partial pattern and candidate outside orientation module pattern do not match (S1504 returns No), the procedure advances to step S1506 for comparison with the next outside color template partial pattern.

Whether all outside color template partial patterns and candidate outside orientation module patterns have been compared is then determined (S1506). If not all outside color template partial patterns and candidate outside orientation module patterns have been compared (S1506 returns No), steps S1503 to S1505 are repeated until all patterns have been compared (S1506 returns Yes).

If all outside color template partial patterns and candidate outside orientation module patterns have been compared (S1506 returns Yes), whether the outside orientation module candidate has been detected is determined (S1507). If it has (S1507 returns Yes), the outside orientation module candidate detection process ends. If not (S1507 returns No), S1508 determines that there is no candidate data and the outside orientation module candidate detection process ends.

A process for detecting the center orientation module candidates in the above orientation module candidate search process is described in further detail below.

Figure 16:
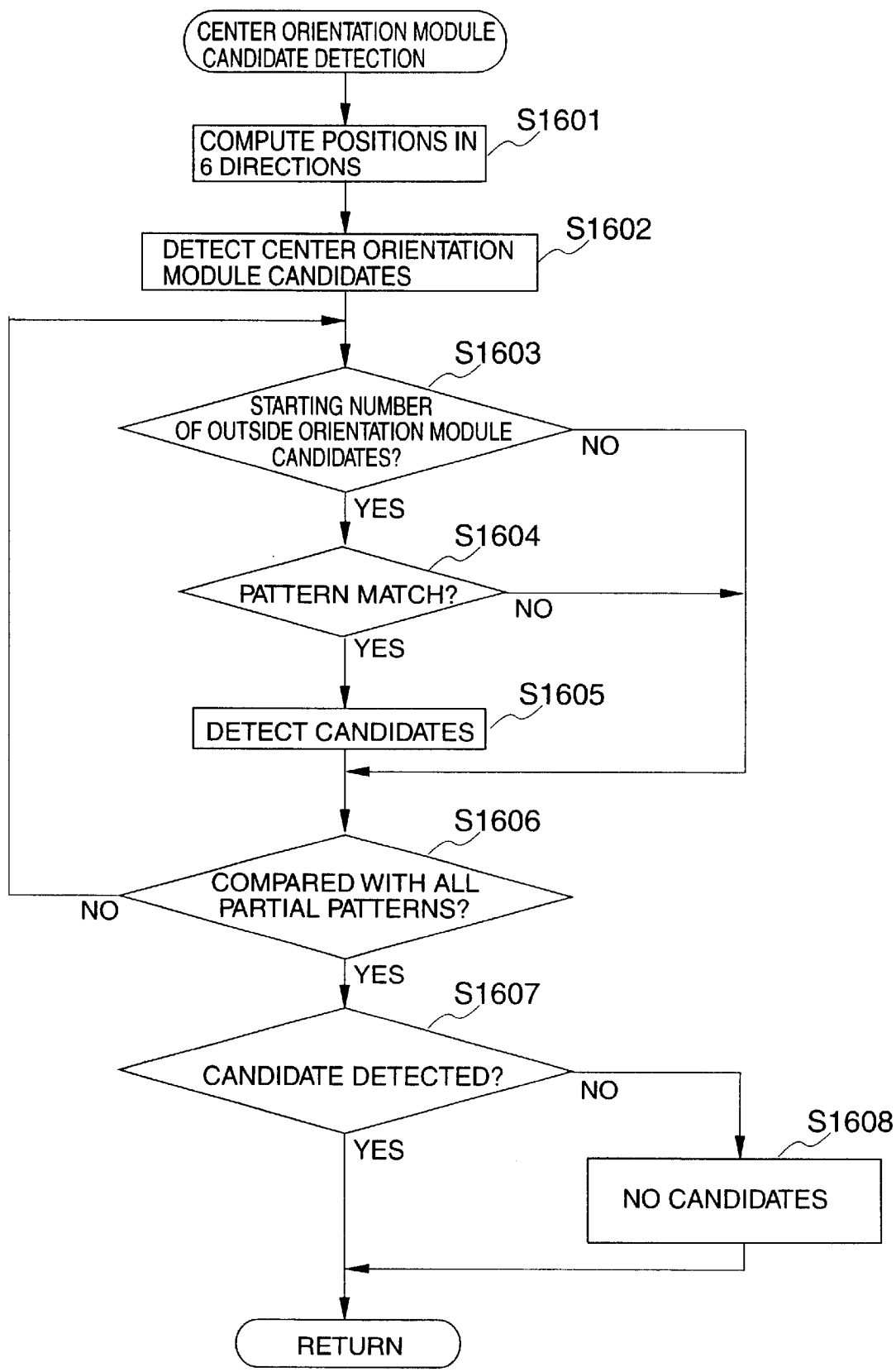
FIG. 16 is a flow chart of is a flow chart of a center orientation module candidate search process in the orientation module candidate search process shown in FIG. 13.

FIG. 16 is a flow chart of the center orientation module candidate search process in the above orientation module candidate search process.

Because a center orientation module is present in six directions, it is assumed that one center orientation module is present at search angle T, that is, search angle T minus the offset angle E, and the positions of the candidate center orientation modules in the six directions are calculated (S1601).

As shown in FIG. 40, the location of point A"0j in area i=0 is defined by the following equations.

$$x"0j = L3 * \sin(T0j - E)$$

$$y"0j = L3 * \cos(T0j - E)$$

$$T0j = T(0,j)$$

The center points A"ij of the candidate center orientation modules in the six directions can therefore be expressed by the following equations.

$x''_{ij}=L3* \sin(T_{ij}-E)$ $y''_{ij}=L3* \cos(T_{ij}-E)$ $T_{ij}=T(i,j)=T0_j+60*i$ The color of the pixel data corresponding to the candidate center orientation modules present in the six calculated directions is then extracted and converted to a bit pattern where black=1 and white=0 as noted above (S1602). The bit pattern of the candidate center orientation module group comprising the bit patterns of the candidate center orientation modules present in the calculated six directions is then set as the candidate center orientation module pattern.

Whether there is a starting number k that matches that of the center orientation module candidate is determined next (S1603). Note that here the outside orientation module candidates are inside orientation module candidates as well as outside orientation module candidates. A center color template partial pattern is then generated from the color template pattern of the center orientation module group based on starting number k in the same way as the inside color template partial pattern.

If starting number k matches that of the outside orientation module candidate (S1603 returns Yes), the candidate center orientation module pattern and center color template partial pattern are compared to detect a match therebetween (S1604).

If starting number k does not match that of the outside orientation module candidate (S1603 returns No), the procedure advances to step S1606 for comparison with the next center color template partial pattern.

If the center color template partial pattern and candidate outside orientation module pattern match (S1604 returns Yes), the candidate center orientation modules located in the six directions are used as the candidates for the center orientation modules (S1605), and the procedure advances to step S1606 for comparison with the next center color template partial pattern.

If the center color template partial pattern and candidate center orientation module is pattern do not match (S1604 returns No), the procedure advances to step S1606 for comparison with the next center color template partial pattern, Whether all center color template partial patterns and candidate center orientation module patterns have been compared is then determined (S1606). If not all center color template partial patterns and candidate center orientation module patterns have been compared (S1606 returns No), steps S1603 to S1605 are repeated until all patterns have been compared (S1606 returns Yes).

If all center color template partial patterns and candidate center orientation module patterns have been compared (S1606 returns Yes), whether the center orientation module candidate has been detected is determined (S1607). If it has (S1607 returns Yes), the outside orientation module candidate detection process ends. If not (S1607 returns No), S1608 determines that there is no candidate data and the center orientation module candidate detection process ends.

A process for determining the orientation module candidates in the above described orientation module candidate search processes is described in further detail below.

Figure 17:
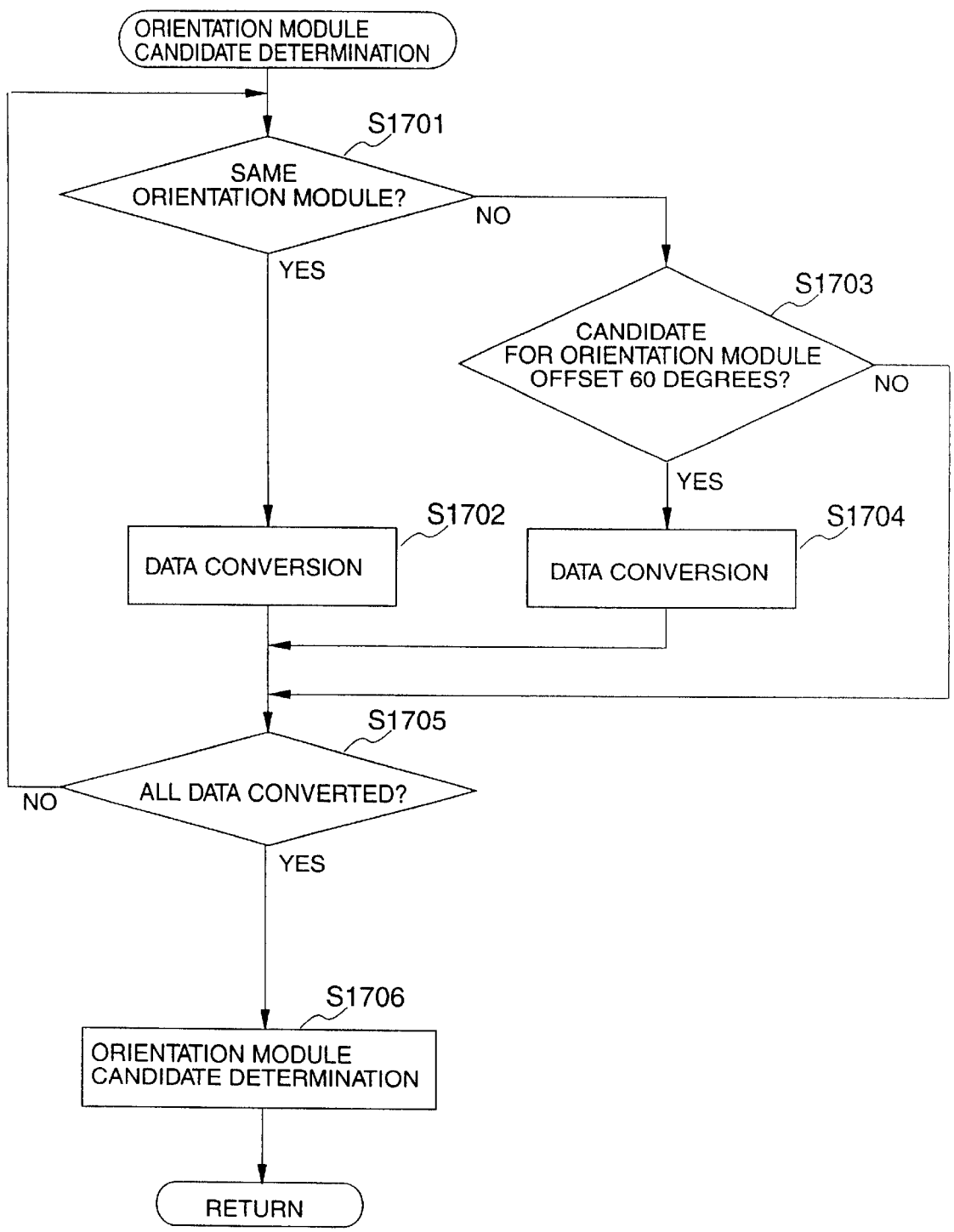
FIG. 17 is a flow chart of an orientation module candidate determination process in the orientation module candidate search process shown in FIG. 13.

FIG. 17 is a flow chart of an orientation module candidate determination process in the orientation module candidate search process.

Candidate data for one inside orientation module at rate n is determined based on the detected candidate data for plural inside orientation modules.

The orientation modules are determined by identifying orientation module candidates having the same orientation based on the detected orientation module candidates, and obtaining the average of the identified candidate data.

Figure 41A:
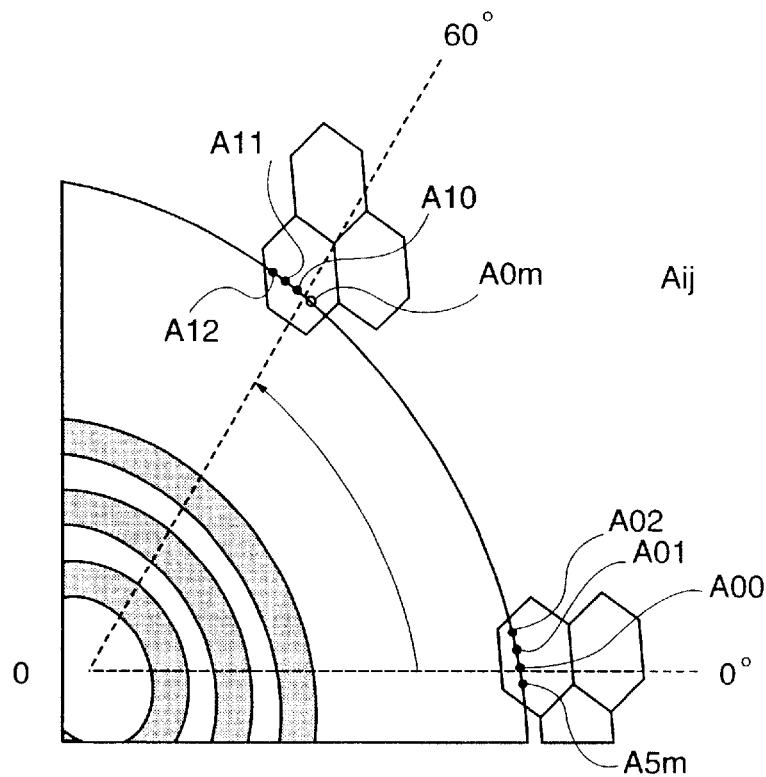
FIG. 41(a) shows candidate data corresponding to a same orientation module before data conversion, and (b) shows the candidate data corresponding to the same orientation module after data conversion.
Figure 41B:
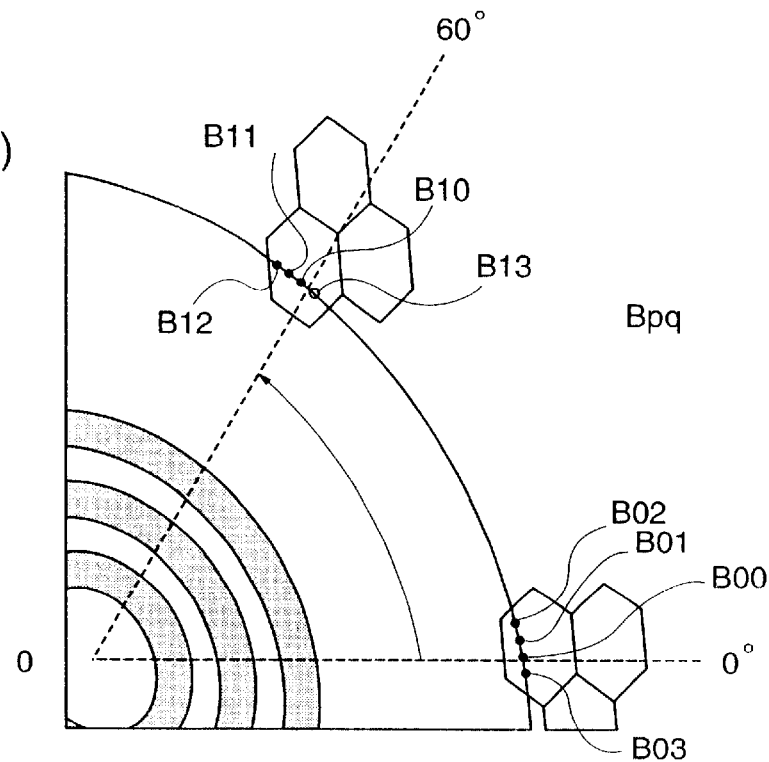

FIG. 41 shows the conversion of candidate data for orientation modules having the same orientation. FIG. 41(a) shows candidate data for orientation modules on the same orientation before data conversion, and FIG. 41(b) shows the candidate data for orientation modules on the same orientation after data conversion.

As shown in FIG. 41(a), candidate data for orientation modules detected on the same orientation can be present in both area i and area (i+1). In FIG. 41(a) points A10, A11, A12, and A0m are candidate data for orientation modules present in areas i=0 and i=1 and having the same orientation. Point Aij, detected as orientation module candidate, is located in area i, and was detected at the j-th search angle division. It is therefore not possible using the expression Aij to indicate candidate data for orientation modules on the same orientation. Data expressed in the form Aij is therefore converted to data points of the form Bpq, which labels candidate data in orientation modules on the same orientation, where p is the orientation module number and q is the candidate number. The position coordinates of point Aij and point Bpq are the same.

This conversion process starts by detecting whether candidate data point Aij is candidate data for the same orientation module as point Bpq (S1701). If it is (S1701 returns Yes), point Aij is converted to point Bpq (S1702), and the procedure advances to step S1705.

As shown in FIG. 41, for example, point A00, candidate data for the same orientation module, is converted to B00, A01 to B01, and A02 to B02. Point A10, which is candidate data for an orientation module offset 60 degrees, is converted to B10, A11 to B11, and A12 to B12.

If the candidate data is not for the same orientation module (S1701 returns No), it is detected whether candidate data point Aij is candidate data for the same orientation module as point B(p+1)q offset 60 degrees from point Bpq (S1703).

If it is candidate data for an orientation module shifted 60 degrees (S1703 returns Yes), point Aij is converted to point B(p+1)q (S1704), and the procedure advances to step S1705. If it is not candidate data for an orientation module shifted 60 degrees (S1703 returns No), the data is not converted and the procedure advances to step S1705.

For example, as shown in FIG. 41, point A0m is candidate data for an orientation module different from point B02, but is candidate data for the same orientation module as point B12. Orientation module candidate point A0m is therefore converted to point B13.

It should be noted that whether a data point is candidate data for an orientation module offset 60 degrees is determined, for example, follows. If the following equation is true for the distance between point A0m and point A12 the data points are for different orientation modules:

distance between points A0m and A12<module height V where module height V is determined by the following equation using the module width W.

$V=(2/\text{sqr}3)*W$

Whether the candidate data for all detected orientation modules has been converted is determined next (S1705). If it has (S1705 returns Yes), the procedure advances to step S1706. If not (S1705 returns No), steps S1701 to S1704 are repeated until all candidate data has been converted.

Finally, the average coordinates are calculated for the candidate data converted for the same orientation module, and the calculated coordinates are defined as the coordinates of the orientation module candidate at rate n (S1706). Note that the average coordinates are calculated in this step by obtaining the simple averages of the x and y coordinate values of the candidate data in an x-y coordinate space. The average for the polar coordinates is the average angle when the radius is rate n.

Figure 42:
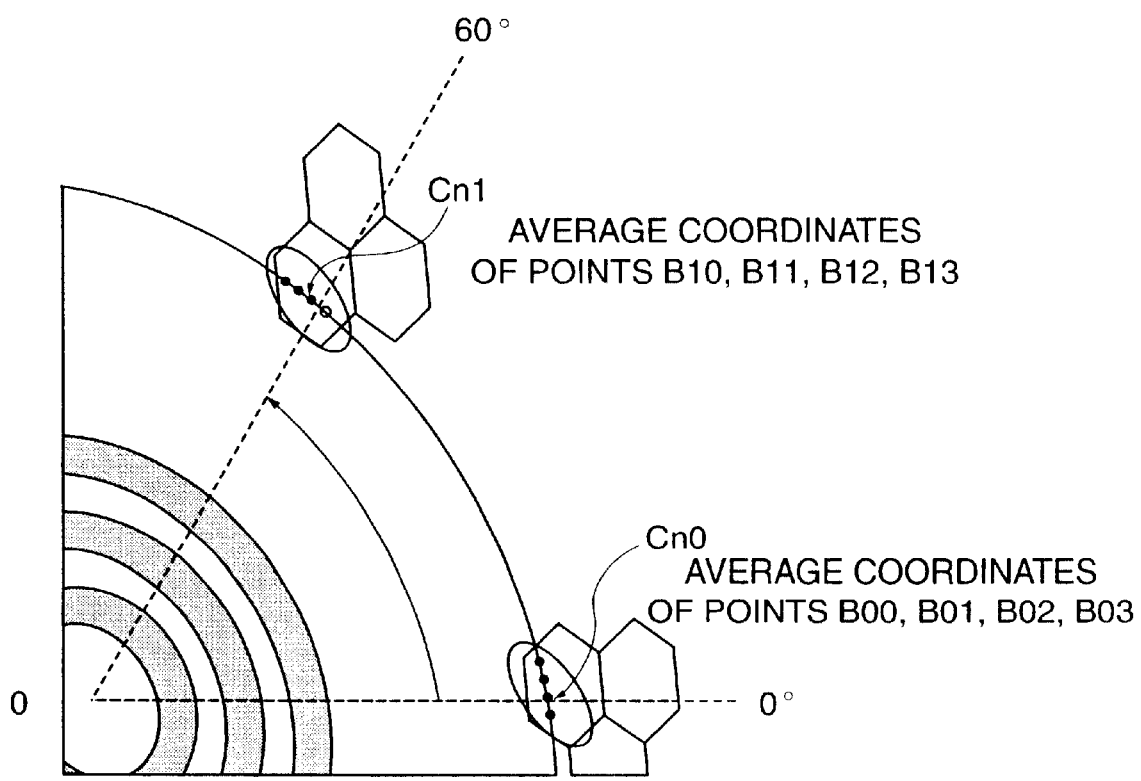
FIG. 42 shows a method for determining orientation module candidates at rate n.

FIG. 42 shows a method for determining orientation module candidates at rate n.

As shown in FIG. 42, if the average coordinates for points B10, B11, B12, and B13, candidate data detected for the same orientation module, are those of point Cn1, then point Cn1 is an orientation module candidate at rate n.

A process for determining the orientation modules in the above-described orientation module search process is described next in further detail below.

Figure 18:
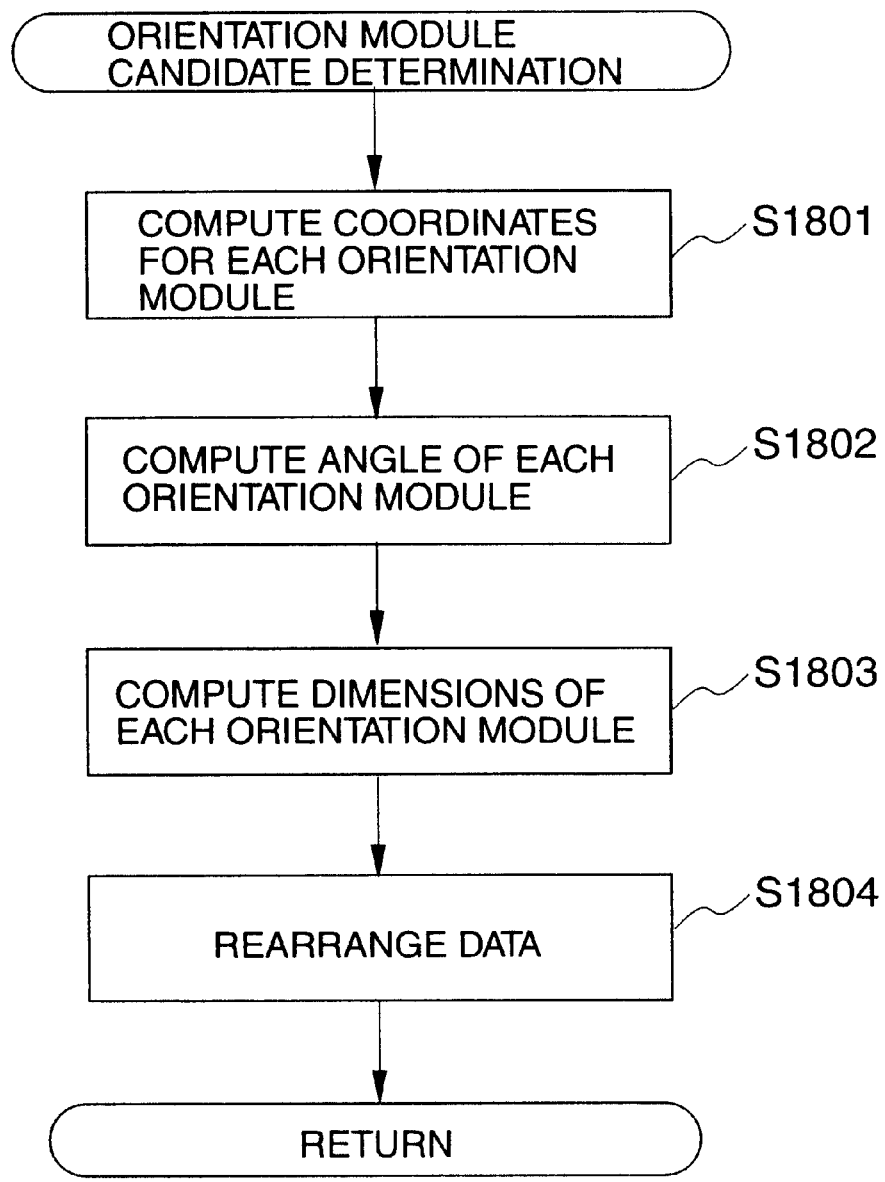
FIG. 18 is a flow chart of an orientation module determination process in the orientation module search process shown in FIG. 12.

FIG. 18 is a flow chart of the orientation module determination process in the orientation module search process.

The first step is to calculate the average coordinates for orientation modules detected at rate n, and determine the location of the orientation module center point (S1801).

Figure 43:
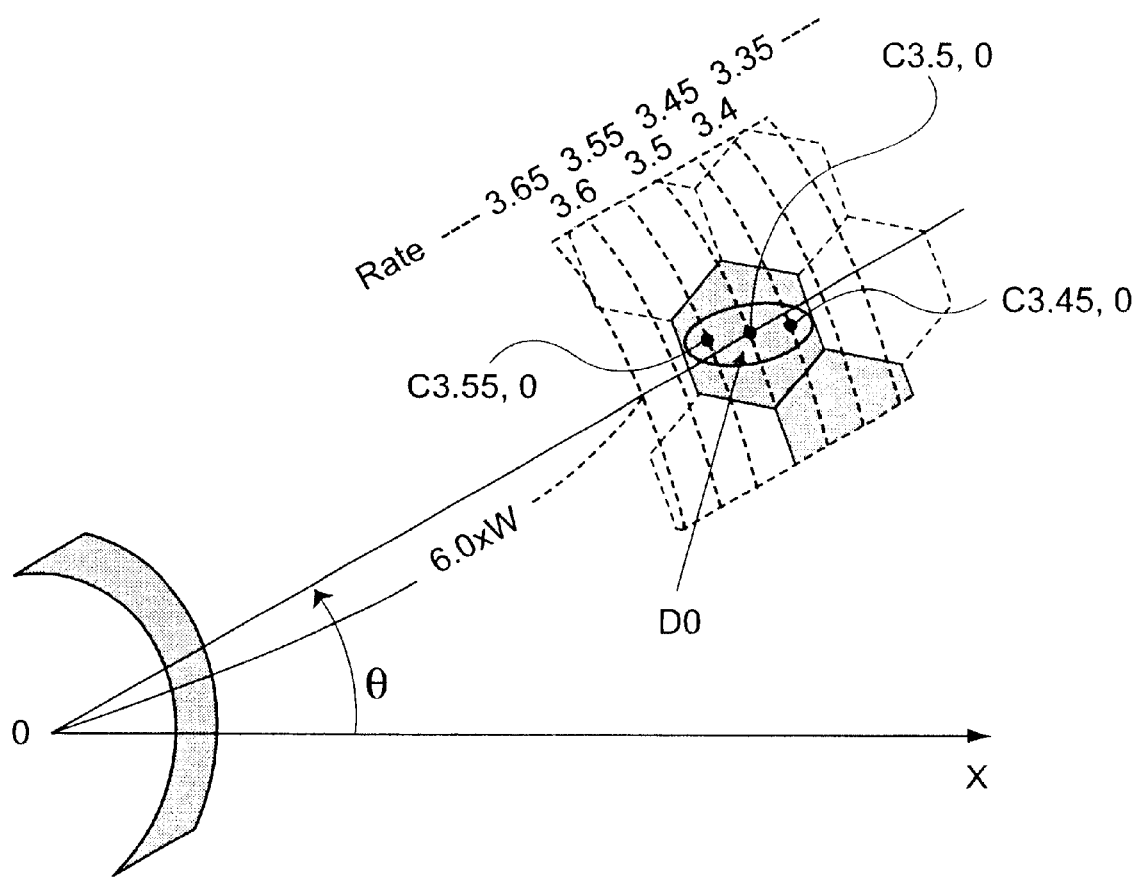
FIG. 43 shows determining the position of the center point of the orientation module.

FIG. 43 illustrates this preferred method for determining the position of the center point of an orientation module.

As shown in FIG. 43, point D0 is the location of the center point of the orientation module if point D0 is the point at the average coordinates of points C(3.55,0), C(3.5,0), and C(3.45,0), points C being candidate data for an orientation module detected at rate n.

Next, the angle T formed by the horizontal axis and the line joining the finder pattern center point and the orientation module center point is calculated (S1802).

The orientation module width W is then calculated (S1803).

Finally, the image data of the scanned image is converted based on the orientation module positions in order to detect the data module positions in the MaxiCode symbol (S1804).

Figure 44:
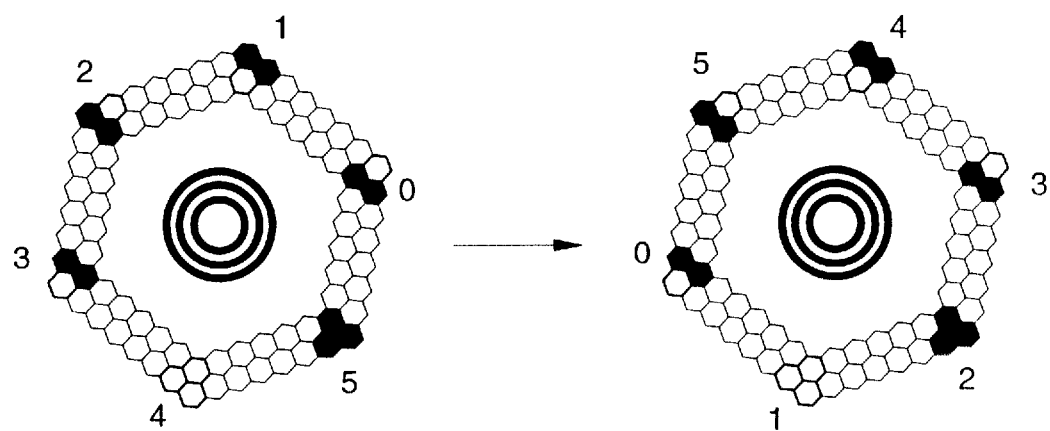
FIG. 44(a) shows a data conversion process, and (b) shows the sequence numbers of the orientation modules.

FIG. 44 is used to describe data conversion by image rotation. FIG. 44(a) shows the data conversion process, and FIG. 44(b) shows a table of orientation module sequence numbers.

Orientation module numbers are converted to sequence numbers as shown in FIG. 44(a). The orientation module numbers indicate the area in which the orientation module is located, and the sequence numbers conform to the table in FIG. 44(b).

An example of the above noted data module search step is described next below with reference to FIG. 19, FIG. 45, and FIG. 46.

Figure 19:
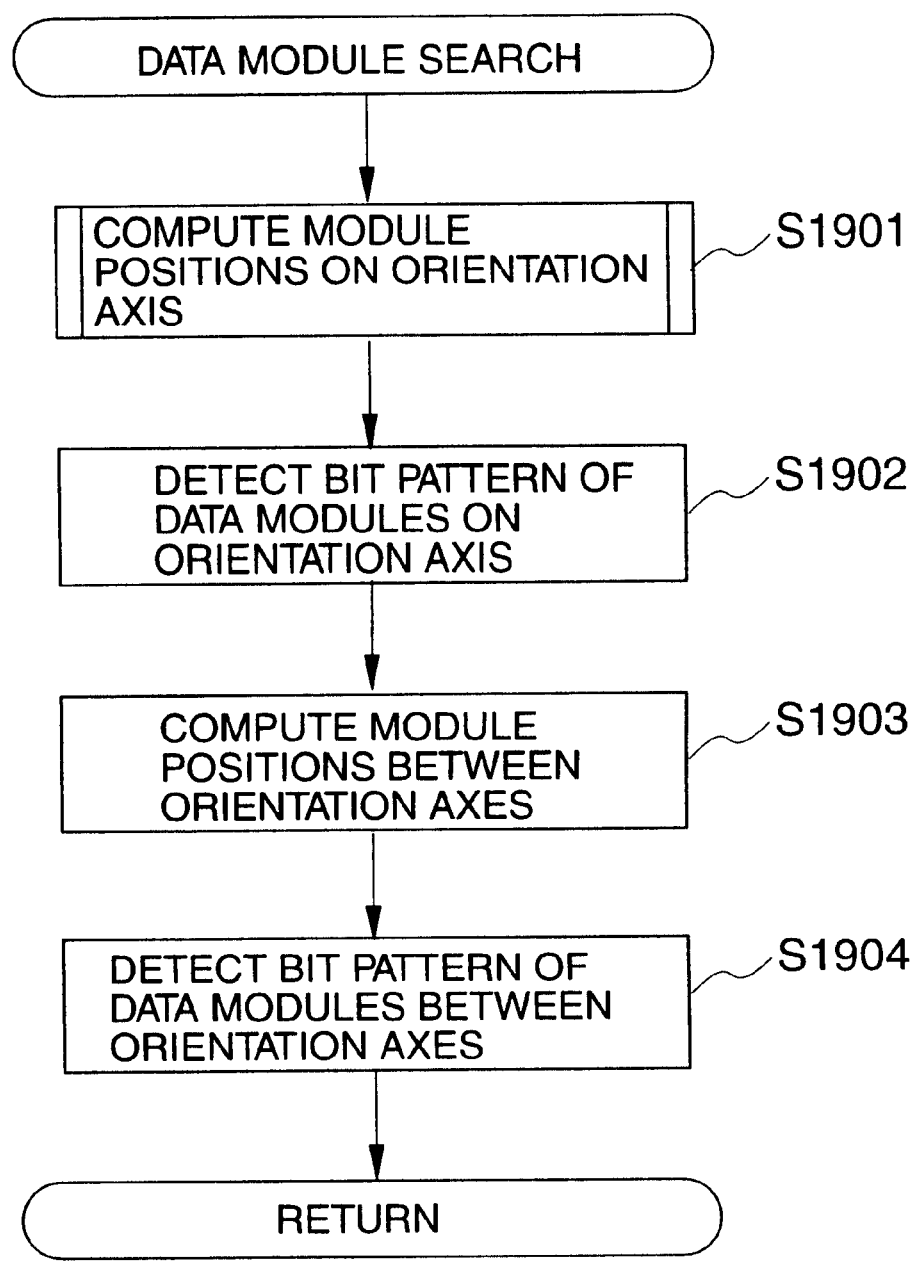
FIG. 19 is a flow chart of the data module search process in the decoding process shown in FIG. 3.

FIG. 19 is a flow chart of the data module search process in the MaxiCode symbol decoding process.

First, an orientation axis passing through the center point of the finder pattern, the e_center point of an inside orientation module, and the center point of an outside orientation module is estimated, and location and shape information for data modules on this orientation axis is calculated (S1901).

Figure 45A:
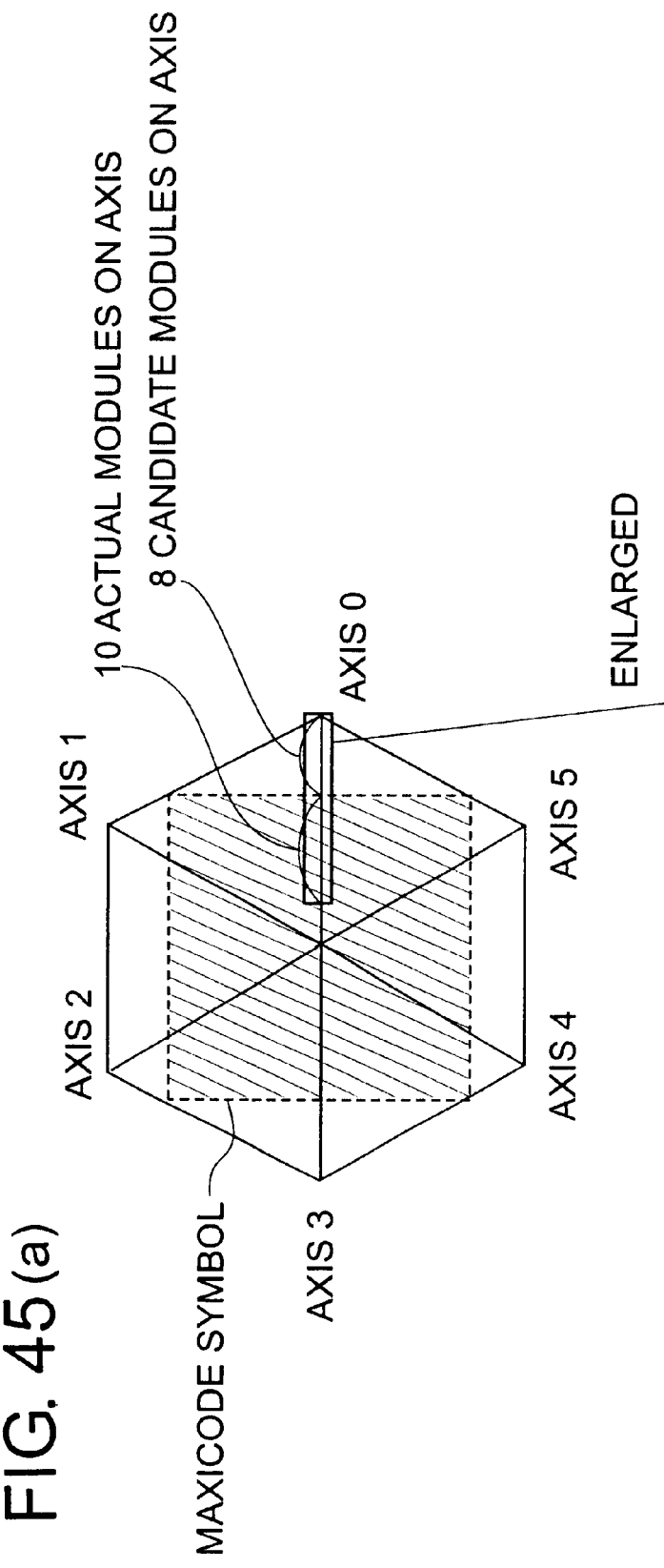
FIG. 45(a) shows an actual module and candidate module on an axis, and (b) shows the location of the data module on the axis.
Figure 45B:
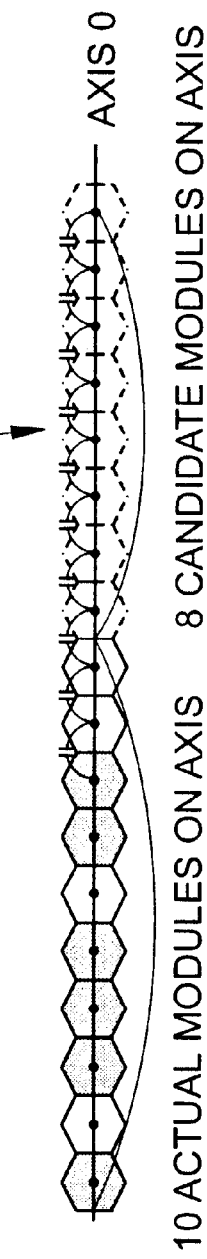

FIG. 45 shows a MaxiCode on an orientation axis. FIG. 45(a) shows an actual module and a candidate module on the orientation axis, and FIG. 45(b) shows the location of data modules on an orientation axis.

As shown in FIG. 45(a), an orientation axis passing through the center point of the finder pattern, the center point of an inside orientation module, and the center point of an outside orientation module is estimated, and a number is assigned to the orientation axis. To describe calculating data module locations, let us consider two modules on the assumed orientation axis, one being a module that is part of the MaxiCode symbol (an "actual module" below) and one a module that is not part of the MaxiCode symbol (a "candidate module" below).

Using the example shown in FIG. 45(b), the location of the center point of each module is calculated for a module group containing 10 actual modules and 8 candidate modules on orientation axis 0. Also considered here are a module group containing 11 actual modules and 7 candidate modules on orientation axis 1; a module group containing 11 actual modules and 6 candidate modules on orientation axis 2; a module group containing 9 actual modules and 8 candidate modules on orientation axis 3; a module group containing 11 actual modules and 6 candidate modules on orientation axis 4; and a module group containing 11 actual modules and 7 candidate modules on orientation axis 5. It should be noted that while there are 12 actual modules on orientation axis 1, an actual module closer to the finder pattern center point than an inside orientation module is bit converted separately after determining the position of the center point of that module. The module group on orientation axis 1 can therefore be thought of as having 11 actual modules and 7 candidate modules.

A bit pattern is then generated from the pixel data for the location of the calculated center point of each module (S1902). As noted above, black pixels are 1 bits, and white pixels are 0 bits. The candidate modules are not converted to a bit pattern here.

Position information is then calculated for the MaxiCode symbol data modules present in the area between orientation axes (S1903).

FIG. 46 shows a module between orientation axes. FIG. 46(a) shows an actual module and candidate module between orientation axes, and FIG. 46(b) shows the position of a data module between orientation axes.

As shown in FIG. 46(a), the triangular area comprising orientation axes 0 and 1 is labelled candidate symbol area 0; the triangular area comprising orientation axes 1 and 2 is labelled candidate symbol area 1; the triangular area comprising orientation axes 2 and 3 is labelled candidate symbol area 2; the triangular area comprising orientation axes 3 and 4 is labelled candidate symbol area 3; the triangular area comprising orientation axes 4 and 5 is labelled candidate symbol area 4; and the triangular area comprising orientation axes 5 and 0 is labelled candidate symbol area 5. The MaxiCode symbol area in candidate symbol area i comprises an actual module (solid line hexagon), and the areas outside the MaxiCode symbol comprise candidate modules (hexagons shown with a dotted line).

As shown in FIG. 46(b), the center points of modules on orientation axis i and the center points of the modules on orientation axis i+1 are connected by straight lines, and points dividing this line into (number of modules between orientation axes+1) intervals are used as the center point of each module. In other words, if 18 lines are formed in candidate symbol area 0 and the center points of the inside orientation modules on the orientation axes are A1 and A'1, the line joining points A1 and A'1 is divided into 6 parts, and the separated points are used as the module center points. In addition, the line joining point Ak and point A'k is divided into (k+5) parts, and the separated points are used as the module center points.

Next, the pixel data detected from the calculated center points of each module is used to generate a bit pattern where black=1 and white=0 as noted above (S1904), and the data module search process ends. Note that the bit pattern conversion step of step S1904 is applied to the actual modules only.

A process for calculating position and shape information for the data modules on the above-noted orientation axes is described next below with reference to FIG. 20 and FIG. 47.

Figure 20:
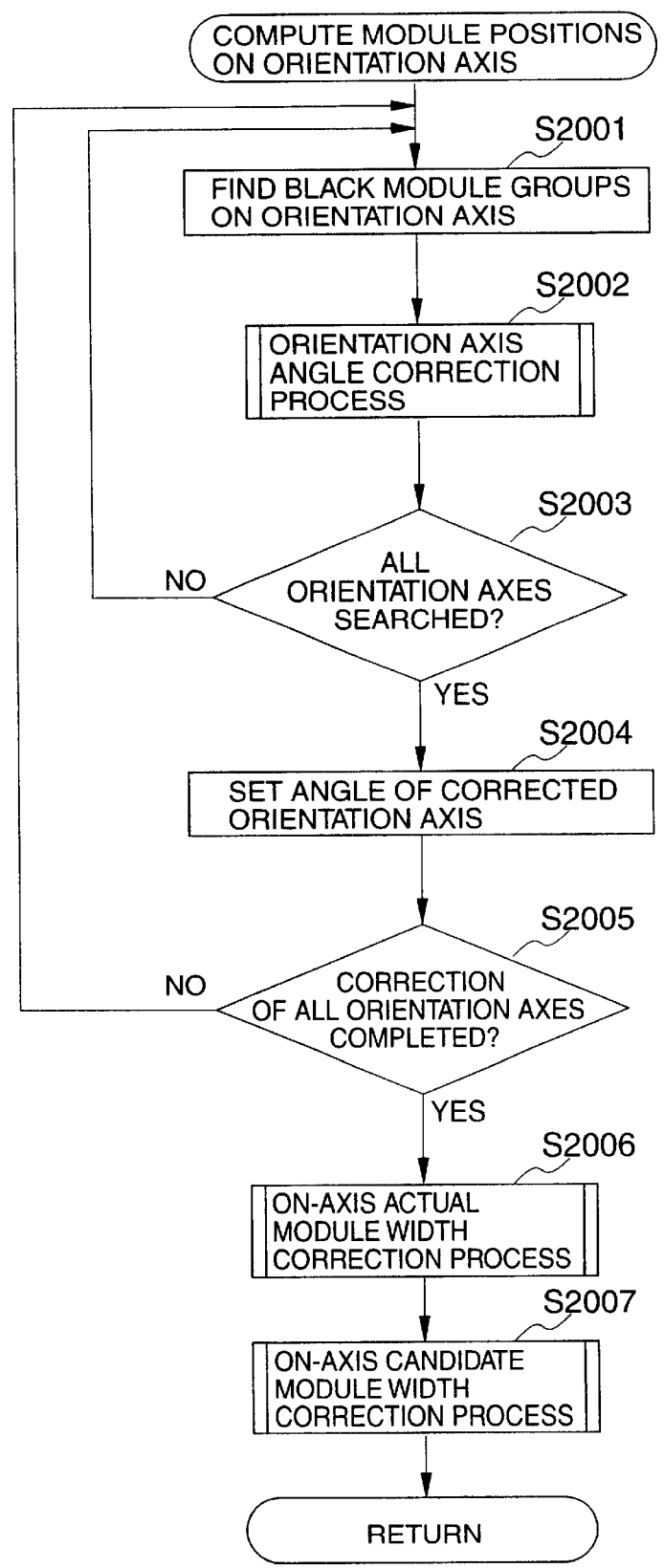
FIG. 20 is a flow chart of the orientation axis module position calculation process in the data module search process shown in FIG. 19.

FIG. 20 is a flow chart of the orientation axis data module position calculation process in the data module search process.

The first step is to find a group of black modules by searching along the orientation axis to the outside of the symbol starting from an inside orientation module used as the search start module (S2001). More specifically, a consecutive group of black modules on the orientation axis is found based on the pixel data stored to pixel data register 210 of VRAM 106, and the search for black pixel data starts from the center point of an inside orientation module. Note that a black module group as used herein is a group of modules including one or plural consecutive black modules.

The orientation axis angle is then corrected based on the located black module group (S2002). Distortion in the scanned image of the symbol means that the position of the orientation module found in step S304 of FIG. 3 is not necessarily the position of a center point of an orientation module. Therefore, the data module center points are not necessarily found on the orientation axis calculated from the position of the finder pattern center point and the position of the orientation module. Furthermore, even if the position of the orientation module is the position of the center point of an orientation module, the data module center points are not necessarily found on the orientation axis in the outer part of a symbol in which image distortion is great. It is therefore necessary to correct the orientation axis angle so that the orientation axis calculated from the orientation module position and the position of the finder pattern center point passes near the center points of the orientation modules and data modules.

Figure 47:
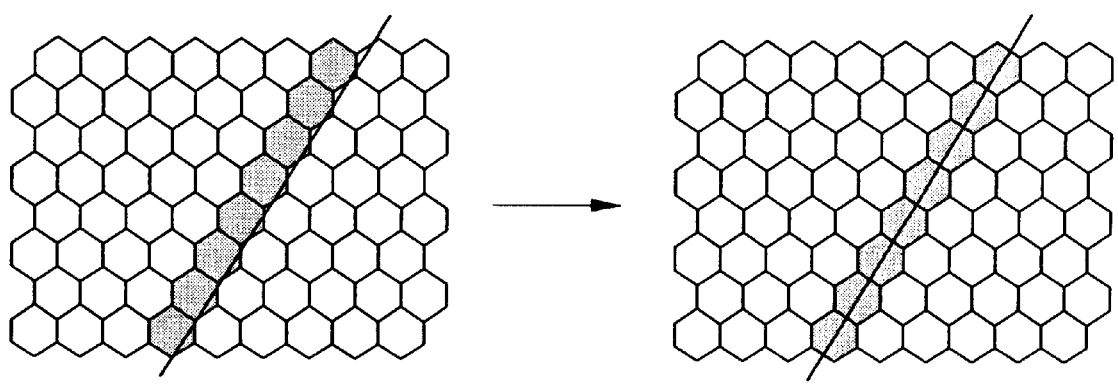
FIG. 47 shows angle correction of the orientation axis.

FIG. 47 shows orientation axis angle correction. As shown in FIG. 47 correcting the angle of the orientation axis in step S2001 moves the orientation axis so that it passes near the center points of the modules.

Whether all black module groups have been found on the orientation axis is then determined (S2003). More specifically, whether the orientation axis angle was corrected based on all black module groups is determined. If not all black module groups on the orientation axis have been searched (S2003 returns No), the procedure loops back to S2001 and steps S2001 to S2002 are repeated until all black module groups on orientation axis i have been found.

If all black module groups on the orientation axis have been found (S2003 returns Yes), the orientation axis i after the orientation axis angle has been corrected based on all black module groups is defined as the corrected orientation axis (S2004). It is thus possible by correcting the orientation axis angle based on all black module groups to correct orientation axis i so that it passes near the center points of the data modules in the outer area of the symbol when image distortion is great.

Whether all six orientation axes have been corrected is then determined (S2005). If not (S2005 returns No), the procedure loops back to S2001 and steps S2001 to S2004 are repeated until all six orientation axes are corrected. However, if all six orientation axes have been corrected (S2005 returns Yes), the width of all actual modules present on the angle-corrected orientation axes is corrected (S2006), the width of the candidate modules on the angle-corrected orientation axes is then corrected (S2007), and the process ends.

A process for correcting the angle of the orientation axes is described in detail next below with reference to FIG. 21, FIG. 24, FIG. 48, FIG. 49, FIG. 50, FIG. 51, and FIG. 52.

Figure 21:
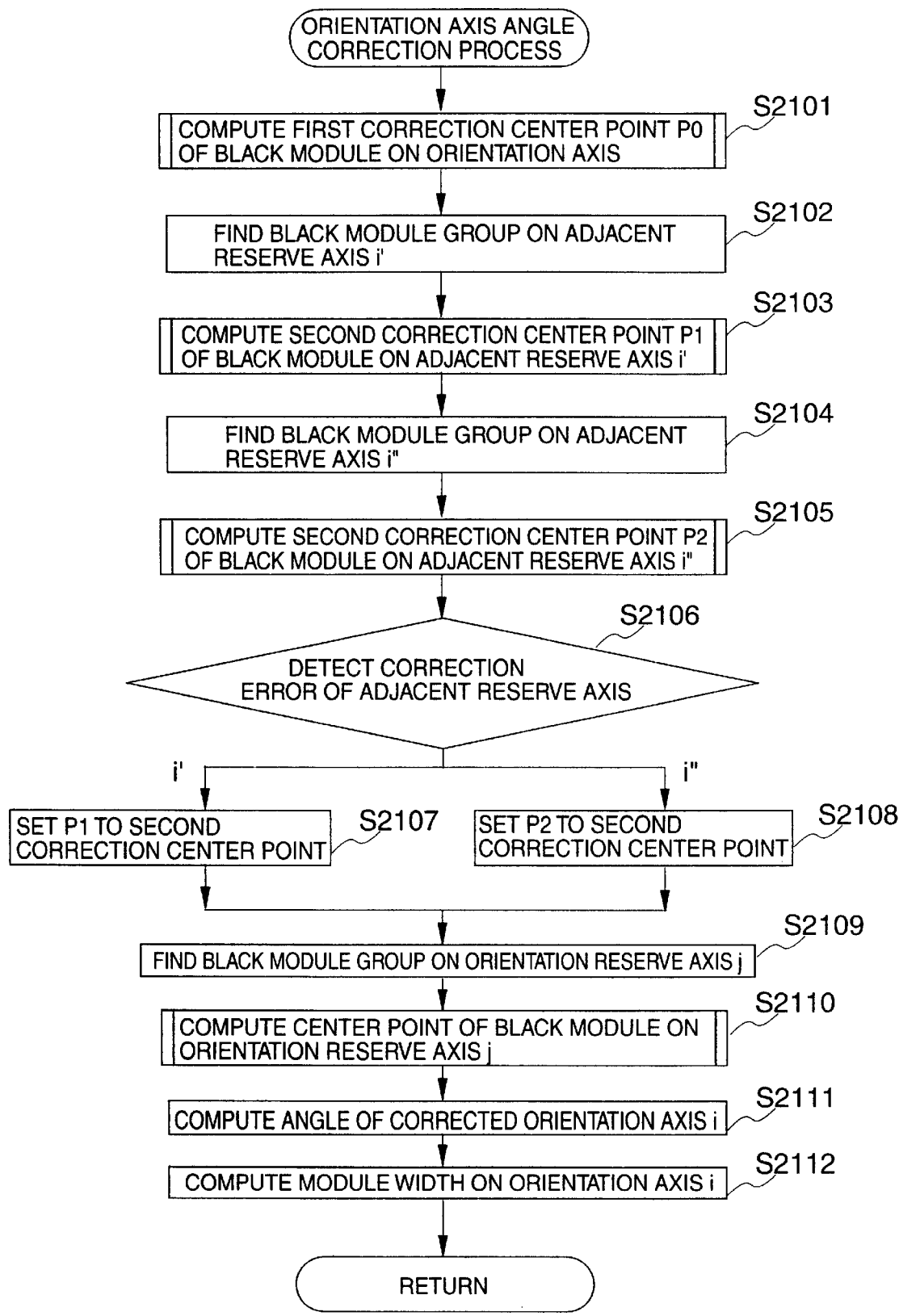
FIG. 21 is a flow chart of the orientation axis angle correction process in the orientation axis module position calculation process shown in FIG. 20.

FIG. 21 is a flow chart of the orientation axis angle correction process of the process for calculating data module positions on the orientation axes.

First, if the first corrected center point of the black module closest to the finder pattern in the module group is designated point P0 of the black module group on orientation axis i, the position of point P0 is calculated (S2101). Note that orientation axis i in this step is any one of the six orientation axes determined around the center point of the finder pattern determined based on the six orientation modules. Note, further, that orientation axis numbers i increase counterclockwise around the finder pattern center point, i ranges from 0 to 5, and when i=5, the next orientation axis at (i+1) is orientation axis 0. The process for calculating module center point position information is further described below with reference to FIG. 24.

Next, orientation axis i is rotated counterclockwise Ti degrees around point P0 to obtain adjacent reserve axis i', and a black module group containing the black module in which point P0 is located on adjacent reserve axis i'is searched for (S2102). Note that angle Ti is an angle between orientation axis i and orientation axis (i+1).

Figure 49:
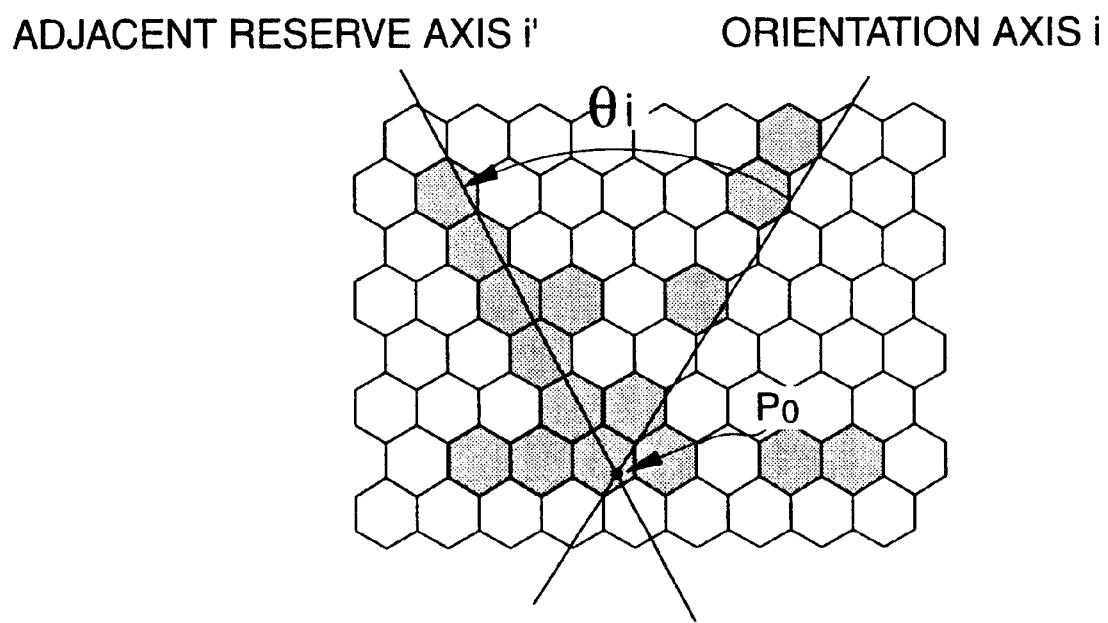
FIG. 49 shows the relationship between orientation axis i and adjacent orientation axis i'.

FIG. 49 shows the relationship between orientation axis i and adjacent reserve axis i'. As shown in FIG. 49, adjacent reserve axis i'is orientation axis i rotated counterclockwise Ti around point P0.

Based on the black module group located on adjacent reserve axis i', a candidate for the second corrected center point of the black module in which point P0 is located is designated point P1, and the location of point P1 is calculated (S2103).

Figure 50:
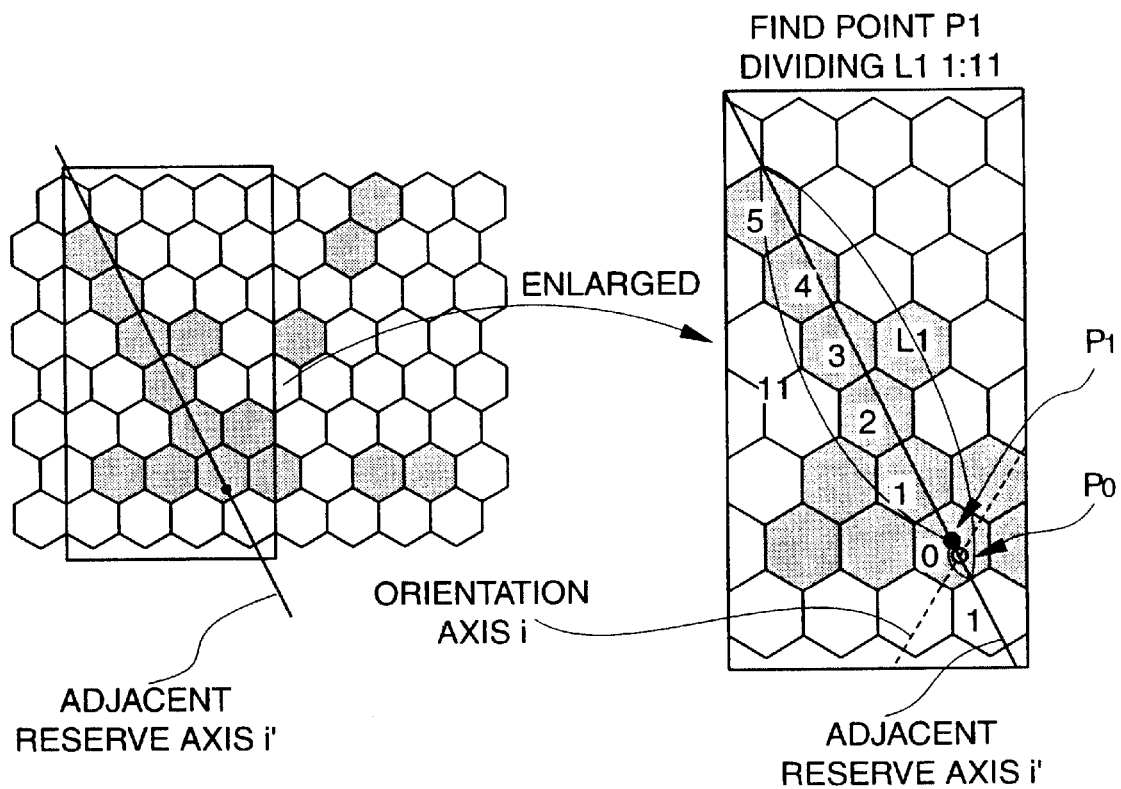
FIG. 50 shows a process for calculating candidate point P1 of a second corrected center point of the module.

FIG. 50 shows the process for calculating the location of point P1, a candidate for the second corrected center point of the module. As shown in FIG. 50, the location of point P1 is calculated assuming that all modules contained in the black module group and located on adjacent reserve axis i' are the same size.

Next, orientation axis i is rotated clockwise Ti-1 degrees around point P0 to obtain adjacent reserve axis i", and a black module group containing the black module in which point P0 is located on adjacent reserve axis i" is searched for (S2104 ). Note that angle Ti-1 is an angle between orientation axis i and orientation axis (i-1). Further, when orientation axis i is orientation axis 0, orientation axis (i-1) is orientation axis 5.

Based on the black module group located on adjacent reserve axis i", a candidate for the second corrected center point of the black module in which point P0 is located is designated point P2, and the location of point P2 is calculated (S2105).

Figure 51:
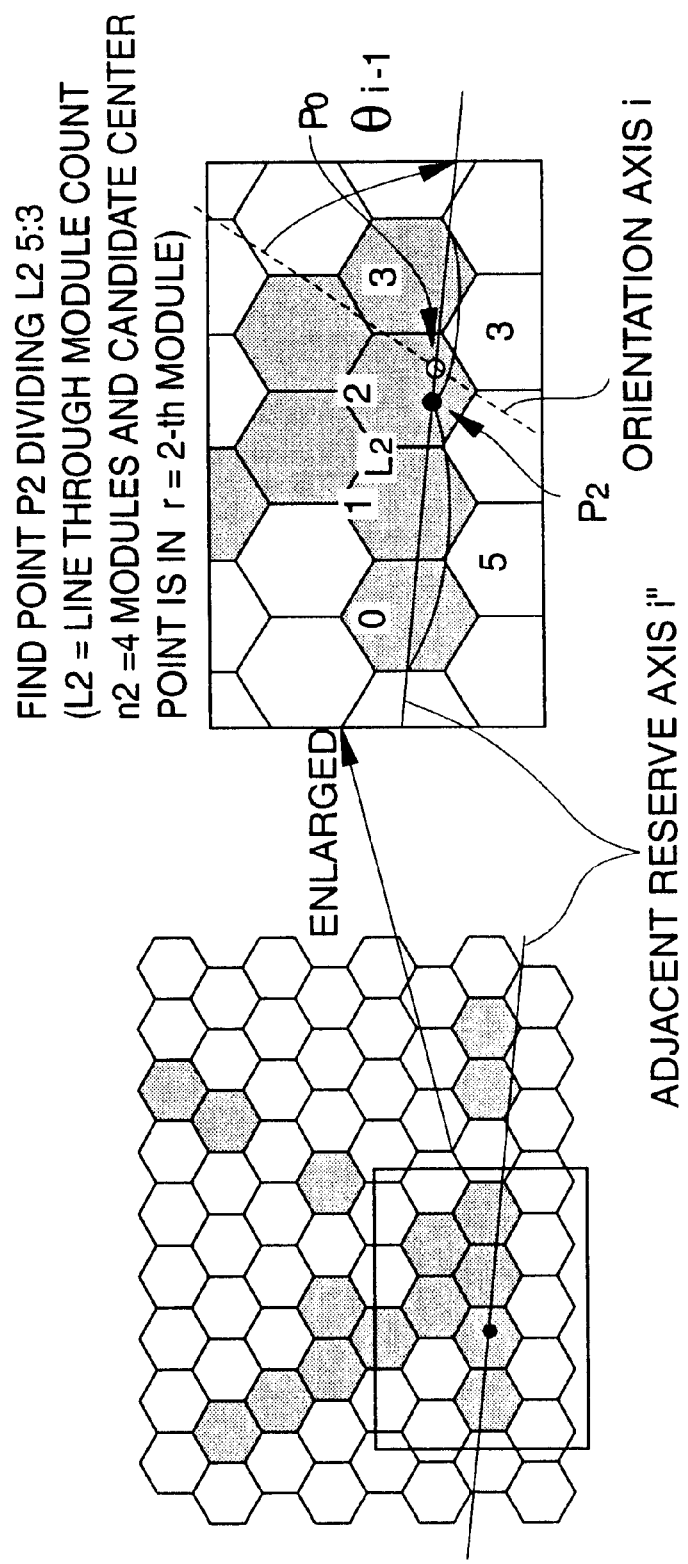
FIG. 51 shows a process for calculating candidate point P2 of a second corrected center point of the module.

FIG. 51 shows the process for calculating the location of point P2, a candidate for the second corrected center point of the module. As shown in FIG. 51, the location of point P2 is calculated assuming that all modules contained in the black module group and located on adjacent reserve axis i" are the same size.

The angle correction of adjacent reserve axis i' and angle correction of adjacent reserve axis i" are then compared to detect the axis with the less correction error (S2106). If the angle correction of adjacent reserve axis i' is less (S2106 returns i'), point P1 is set to point P3 where P3 is the second corrected center point of the black module in which P0 is present (S2107). If the angle correction of adjacent reserve axis i" is less (S2106 returns i"), point P2 is set to point P3 where P3 is the second corrected center point of the black module in which P0 is present (S2108). The magnitude of correction error is evaluated for the total number of modules contained in the black module group on the orientation axis. In other words, because all modules are assumed to have the same size, error decreases as the number of modules decreases. In the cases shown in FIG. 50 and FIG. 51, therefore, P2 is set as the second candidate center point P3 because the number of modules on adjacent reserve axis i'is greater than the number of modules on adjacent reserve axis i".

The black module group containing the black module in which P3 is present on orientation reserve axis j is then found (82109), and the location of point P, that is, the center point of the black module in which P3 is present, is calculated (S2110). Note that orientation reserve axis j here is the axis passing through P3 and the finder pattern center point.

Figure 52:
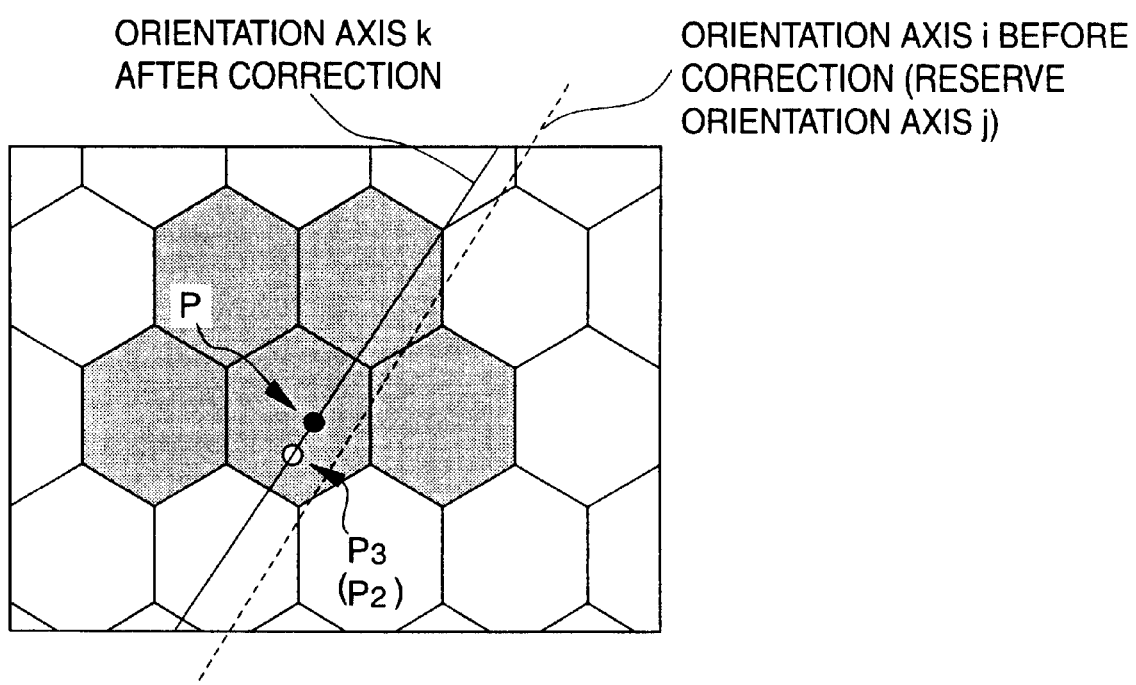
FIG. 52 shows a module center point P calculation process.

FIG. 52 shows the process for calculating the position of point P, the module center point. As shown in FIG. 52, the location of module center point P is calculated assuming that all modules contained in the black module group containing the black module in which P3 is present and located on orientation reserve axis j have the same size.

Orientation axis k passing through module center point P and the finder pattern center point is set to the orientation axis obtained by angle correction of orientation axis i, and the angle Δi between this orientation axis k and the horizontal orientation axis is calculated (S2111). As shown in FIG. 52, the line passing through point P and the finder pattern center point is orientation k obtained by angle correction of orientation axis i. Note that orientation axis k and orientation reserve axis j are the same line.

The width of the black modules on orientation axis k constituting the black module group is then calculated (S2112), and the process ends.

Figure 24:
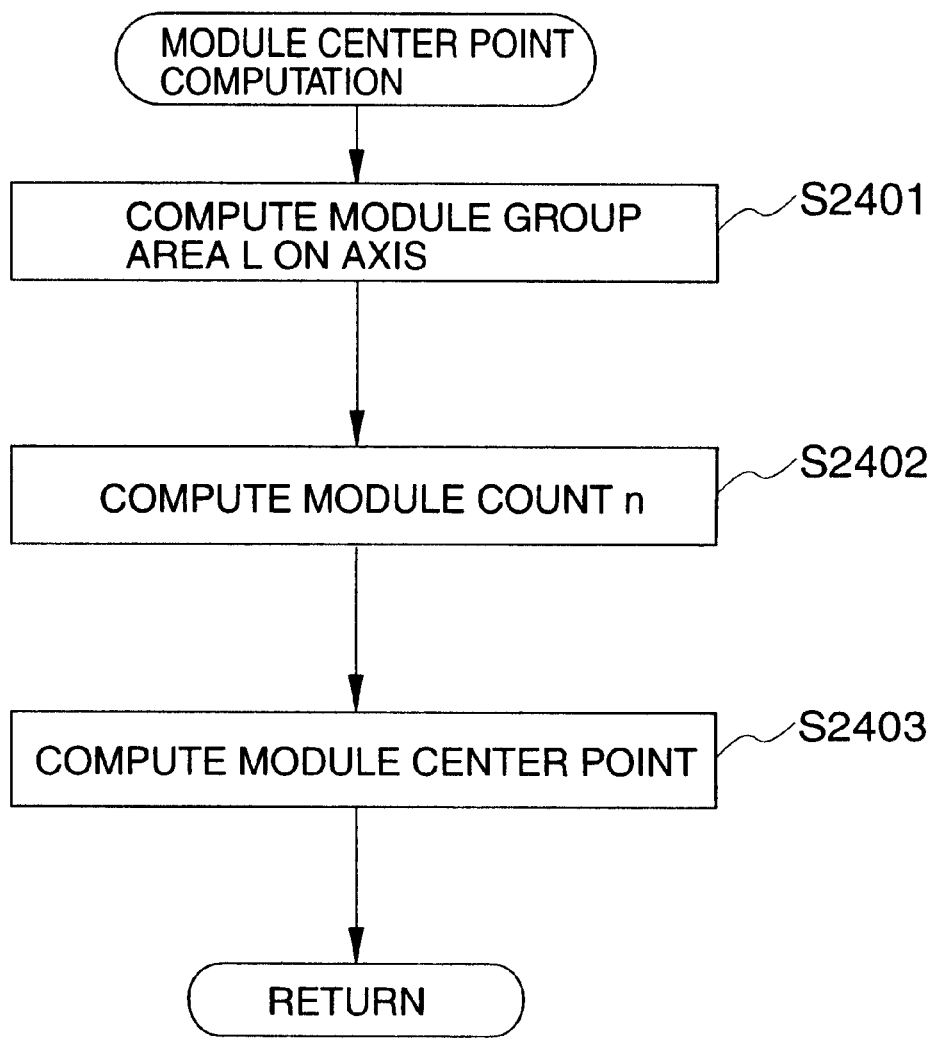
FIG. 24 is a flow chart of a module center point calculation process according to the present invention.

FIG. 24 is a flow chart of a process for calculating the location of the center point of modules on a particular orientation axis.

Length L of orientation axis i crossing a module group comprising one or a plurality of contiguous modules is calculated based on the pixel data stored to pixel data register 210 of VRAM 106 (S2401).

Figure 48:
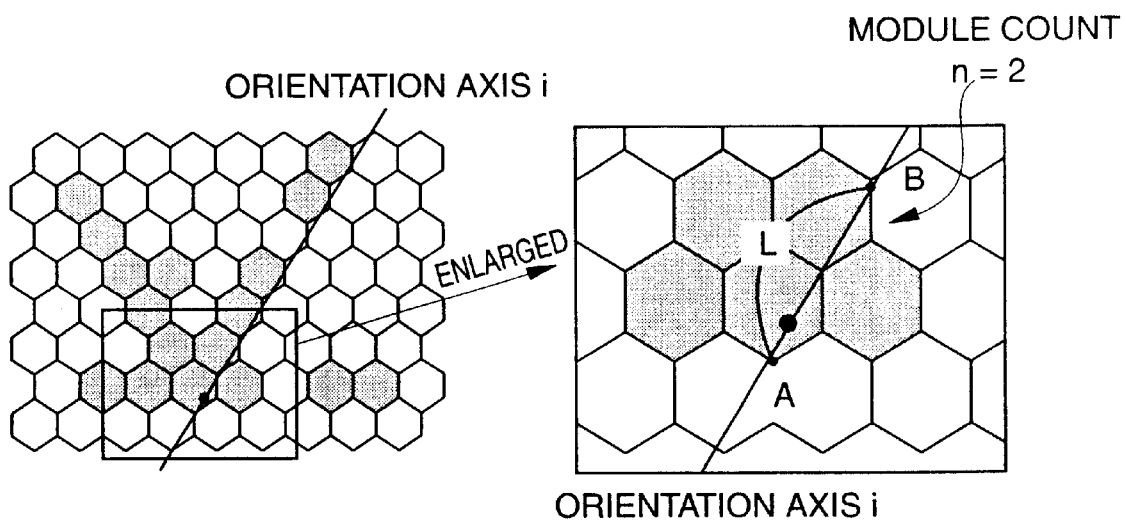
FIG. 48(a) shows area L of a module group on an orientation axis, and (b) shows the center point of the modules constituting the module group.
Figure 48:
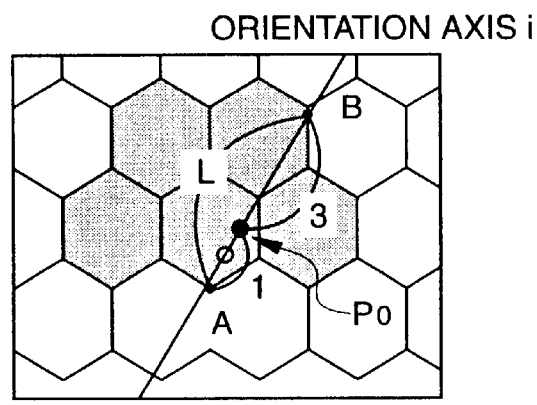

FIG. 48 illustrates the process for calculating the location of a module center point. FIG. 48(*a*) shows area L in a module group on an orientation axis, and FIG. 48(*b*) shows the location of the center point of a module in the module group.

As shown in FIG. 48(*a*), length L of orientation axis i crossing a module group of black modules is measured based on the boundaries between black and white pixels. If these points are A and B, orientation axis length L=line AB.

A value n' (=L/W) is then calculated based on module width W (calculated in step S304 of the orientation module search process shown in FIG. 3) and the just calculated length L. The number n of modules in the module group is then calculated based on a boundary value table or the rounded value of n' (S2402).

In FIG. 48(*a*), n=2 because there are two black modules in the module group.

Finally, the location of the module center point is calculated based on order r of the modules in the module group (S2403) where r=1 indicates the module closest to the finder pattern in the module group, and r=n indicates the module farthest from the finder pattern. It is further assumed to all modules in the module group are the same size, and the location of the module center point is calculated on the assumption that orientation axis i passes the center point of all modules. More specifically, the point at which length L divides into (2r−1):(2n−2r+1) is made the center point of the r-th module. As shown in FIG. 48(*b*), if point P0 is the module center point when r=1, point P0 is the point dividing length L (line segment AB) 1:3.

Figure 22:
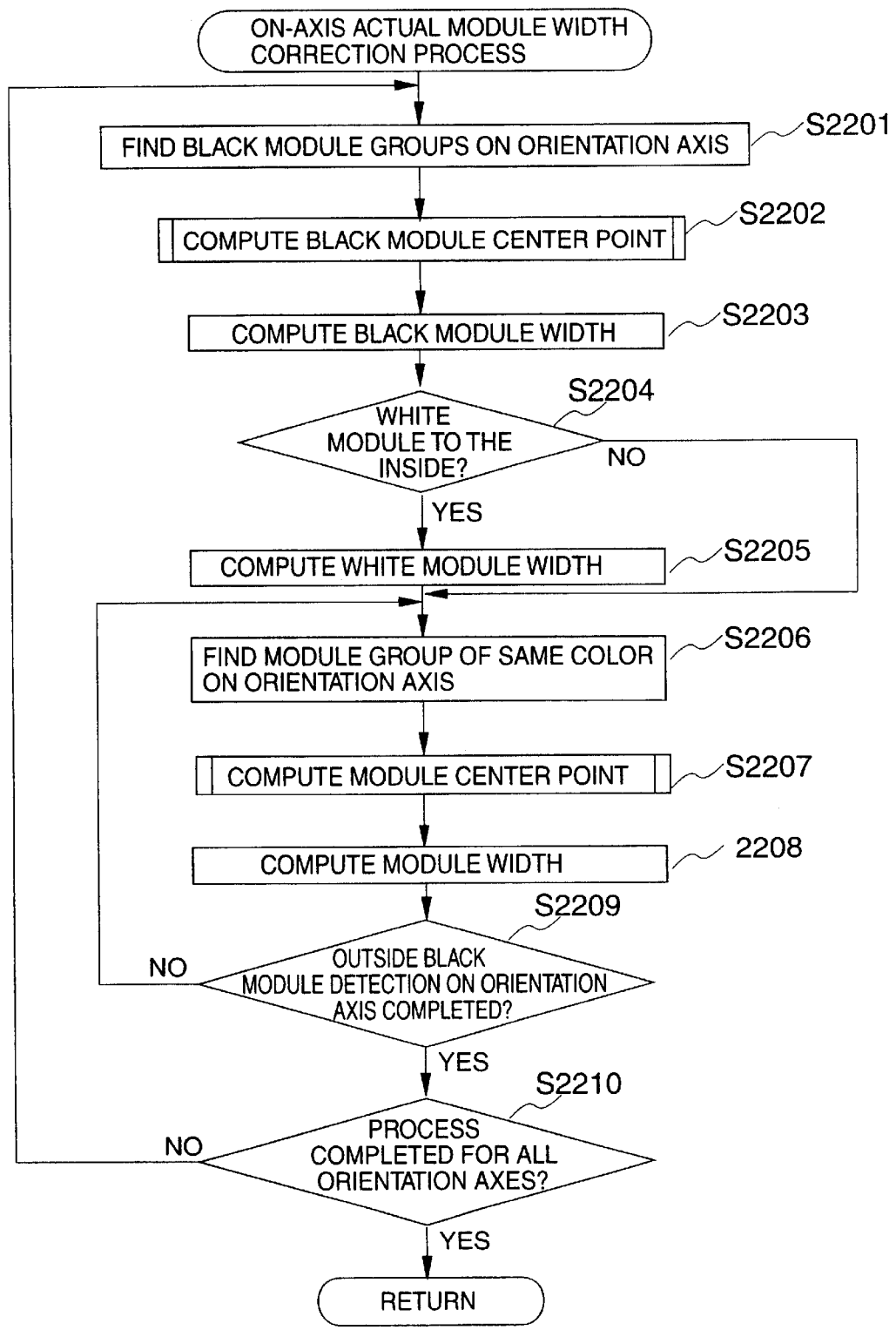
FIG. 22 is a flow chart of the orientation axis actual module width correction process in the orientation axis module position calculation process shown in FIG. 20.

FIG. 22 is a flow chart of a process for correcting the width of actual modules on an orientation axis in the process calculating data module positions on an orientation axis.

Orientation axis i is searched starting from an inside orientation module and proceeding to the outside of the symbol to find modules comprising black actual modules (S2201).

The locations of all actual module center points in the located module group are calculated (S2202), and the actual module width is then calculated (S2203).

Whether there are any white actual modules to the inside of the black actual modules closest to the inside of the symbol (nearest the finder pattern) on orientation axis i is then determined (S2204). If there are (S2204 returns Yes), the width of the black actual Is module closest to the symbol center is made the width of the white actual modules (S2205).

Next, using the module closest to the outside of the symbol in the located module group of the same color, orientation axis i is searched to the outside of the symbol for a module group comprising actual modules of a color different from the color of the previously found module group (S2206).

The locations of the center points of all actual modules constituting the located module group are then calculated (S2207), and the actual module width is calculated (S2208).

Whether a module group containing black actual modules was found at the outermost part of the symbol on orientation axis i is then determined (S2209). If not (S2209 returns No), the procedure loops back to S2201 and steps S2206 to S2208 are repeated until a module group containing a black actual module is found at the outermost part of the symbol.

If such a module group is found (S2209 returns Yes), whether the locations of the actual module center points and the actual module widths have been calculated for all six orientation axes is then determined (S2210). If the calculations have been completed for all axes (S2210 returns Yes), the process ends. If all calculations have not been completed (S2210 returns No), the procedure loops back to S2201 and steps S2201 to S2209 are repeated until calculations are completed for all axes.

Figure 23:
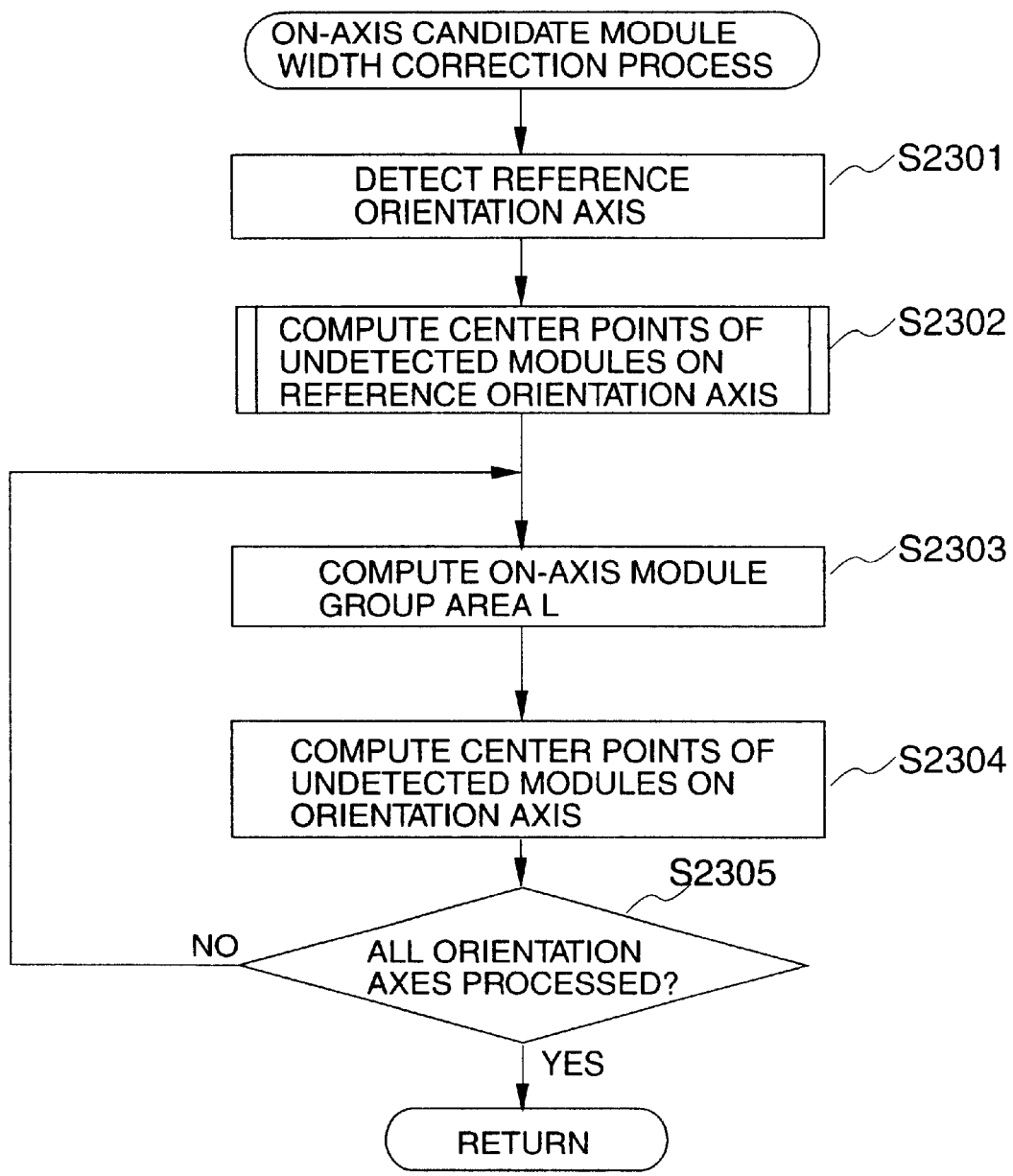
FIG. 23 is a flow chart of the orientation axis candidate module width correction process in the orientation axis module position calculation process shown in FIG. 20.

FIG. 23 is a flow chart of a process for correcting the width of candidate modules on the orientation axis in the process for calculating data module locations on an orientation axis.

First, of the six orientation axes, the orientation axis having the least distortion is detected and used as reference orientation axis m (S2301). For example, the amount of distortion Ei of an orientation axis can be calculated using the following equation based on ratio Ri between the width Wi of black actual modules present at the outermost part of the symbol and calculated by width correction of the actual modules as shown in FIG. 22, and the width W0i of the actual modules calculated by step S304 of the orientation module search process shown in FIG. 3. Note that i is the axis number.

$$Ei=|Ri\_1|=|Wi/W0i\_1|$$

Distortion Ei is thus calculated for each of the six orientation axes, and the orientation axis with the least distortion is used as reference orientation axis m.

The locations of all actual modules and candidate modules not calculated on reference orientation axis m are then calculated (S2302) assuming the width of actual modules and the width of the candidate modules not calculated on reference orientation axis m are the same as the width of black actual modules at the outermost part of the symbol.

The module center point location on orientation axis (i+1) is also considered based on the locations of the center points of the actual modules and candidate modules on orientation axis i where reference orientation axis m is orientation axis i.

The distance L from the center point of a black actual module at the outermost part of the symbol on orientation axis (i+1) to the center point of a candidate module at the outermost part of the candidate symbol area on orientation axis (i+1) is then calculated based on the location of the finder pattern center point, the location of a module on orientation axis i, and the location of the center point of a black actual module at the outermost part of the symbol on orientation axis (i+1) (S2303). Note that the candidate symbol area is the area shown in FIG. 46 as described above.

The locations of the center points of all actual modules and candidate modules not calculated on orientation axis (i=1) are then calculated based on calculated length L and the number of modules from the black actual module at the outermost part of the symbol on orientation axis (i+1) to the candidate module at the outermost part of the candidate symbol area on orientation axis (i+1) (S2304).

Figure 53:
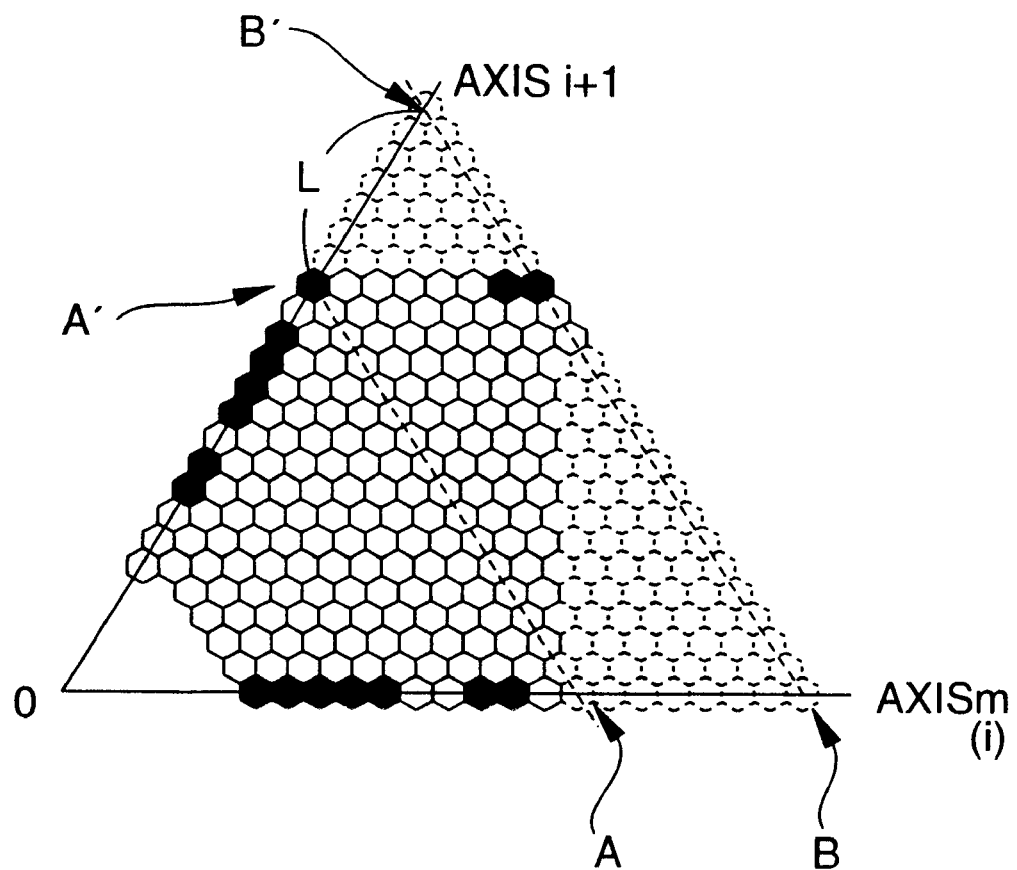
FIG. 53 shows a module center point calculation process.

FIG. 53 shows the process for calculating length L and the locations of the module center points not calculated.

As shown in FIG. 53, point 0 is the finder pattern center point, point A' is the center point of the black actual module at the outermost part of the symbol on orientation axis (i+1), point B' is the center of the candidate module at the outermost part of the candidate symbol area on orientation axis (i+1), and point B is the center of the candidate module at the outermost part of the candidate symbol area on orientation axis i. The module center point on orientation axis i at which the number of modules from the inside orientation module on orientation axis i is equal to the number of modules from the inside orientation module on orientation axis (i+1) to the black actual module at the outermost part of the to symbol is set as point A. Note that the distance L from point A' to B' can be calculated using the following equation:

$$L = A'B' = AB*(0A'/0A)$$

The module center point locations are then calculated assuming that the (n+1) modules from the module in which point A' is present to the module where point B' is present are the same.

Last, it is checked whether the locations of the center points of all actual modules and candidate modules for all six axes have been calculated (S2305). If the calculation process is completed for all orientation axes (S2305 returns Yes), the process ends. If not (S2305 returns No), the procedure loops back to S2303, and steps S2303 to S2304 are repeated to complete the calculations for all axes after substituting orientation axis (i+1) as orientation axis i for the next calculation series.

An example of the data character conversion step is described next.

Figure 25:
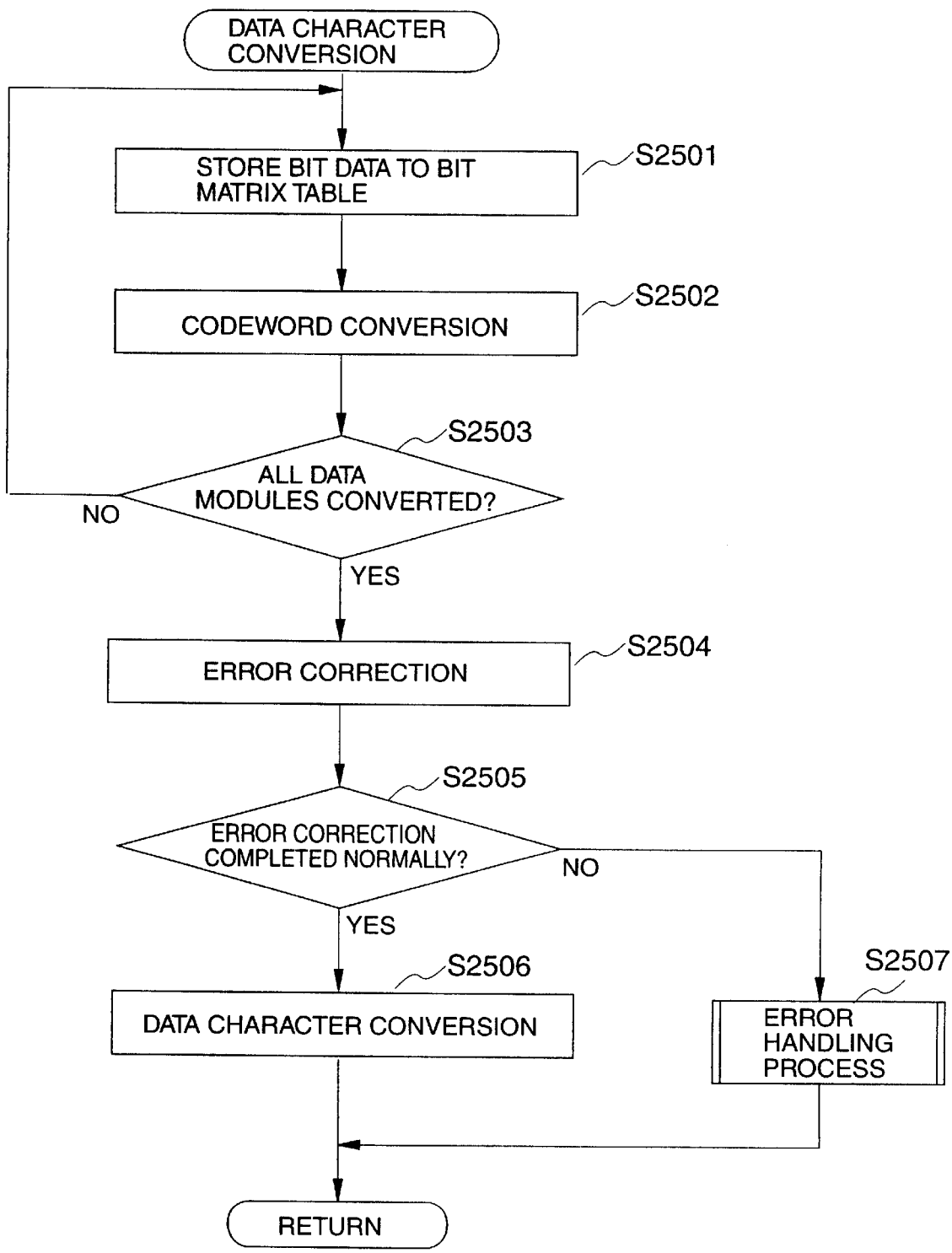
FIG. 25 is a flow chart of the data character conversion process in the decoding process of the present invention.

FIG. 25 is a flow chart of the data character conversion process in the MaxiCode symbol decoding process according to the present invention.

Figure 54:
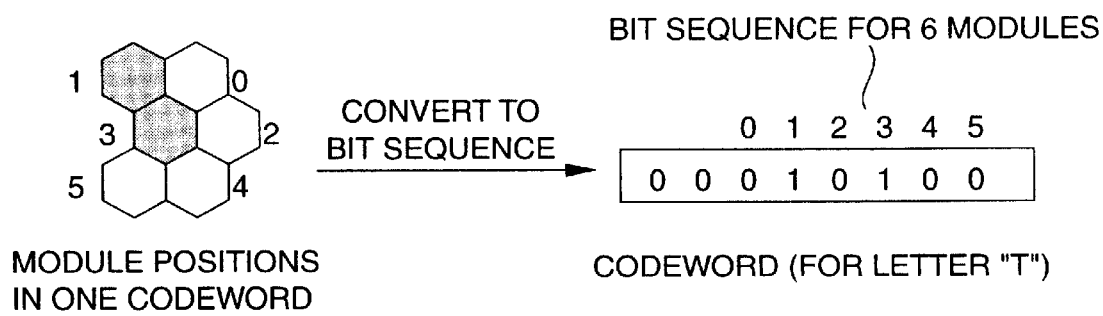
FIG. 54 shows a codeword.

Data character conversion converts the data modules to a bit pattern of 1s and 0s where black has a bit value of 1 and white has a bit value of 0, the bit pattern data is then converted to a codeword, and the codewords are then converted to data characters. 30 FIG. 54 shows a typical codeword.

As shown in FIG. 54, a codeword is a bit train representing one data character. Each codeword consists of the six data bits from the six data modules, and two 0 bits. Codeword conversion thus computes the values i and j where the respective bit data corresponds to the j-th bit of the i-th codeword.

The bit pattern for the location of the data module in the MaxiCode symbol is stored as the bit data to a bit matrix table (S2501), referred to below as BT(n,m) where n is an integer from 0 to 29 and m is an integer from 0 to 32.

Figure 55A:
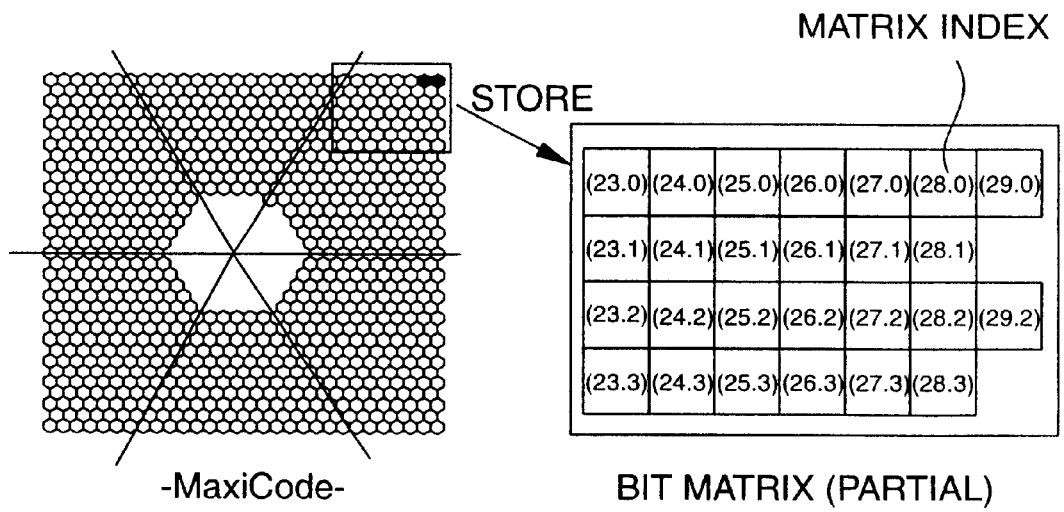
FIG. 55(a) shows the relationship between a bit matrix table and data module position in a MaxiCode symbol, and (b) shows the data stored by the bit matrix table.
Figure 55B:
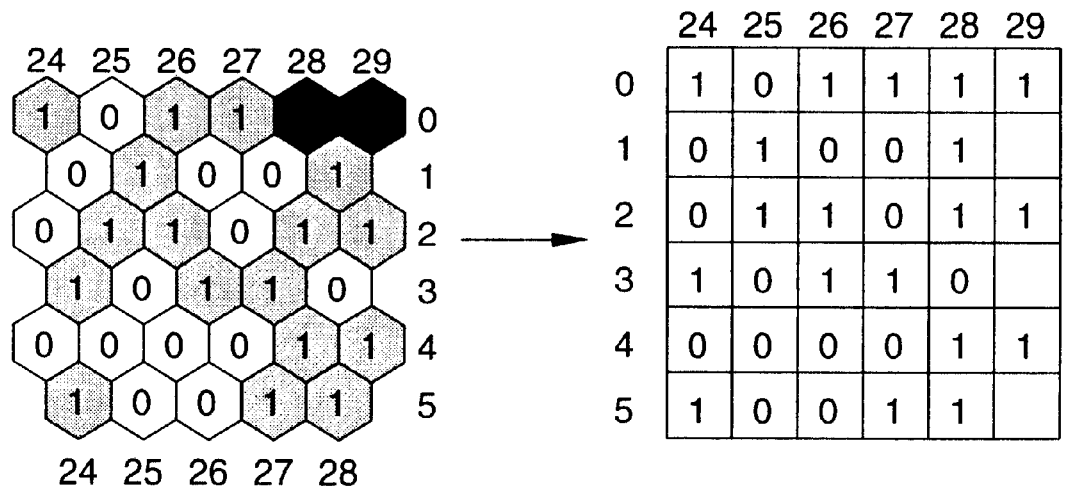

FIG. 55 shows a bit matrix table. FIG. 55(a) shows the relationship between the location of a data module in a MaxiCode symbol, and the location of the data stored in the bit matrix table. FIG. 55(b) shows the data stored to the bit matrix table.

As shown in FIG. 55, the value of the data module third from the right and third from the top in the MaxiCode symbol is stored to BT(27,2) in the bit matrix table.

Based on the data elements of the codeword bit matrix table, the bit data stored to the bit matrix table is converted to the j-th bit in the i-th codeword during codeword conversion (S2502).

FIG. 56 shows a typical codeword bit matrix table referenced as CT(n,m) where n is an integer from 0 to 29 and m is an integer from 0 to 32.

The relationship between values i and j in the codeword conversion operation and Is codeword bit matrix table CT(n,m) is shown by the following equations:

$$i = [CT(n,m)/256]$$

$$j = CT(n,m) - i*256$$

As shown in FIG. 56, the value of this codeword bit matrix table at CT(27,2) is 8452. As a result, i=[8452/256]=33, and j=8452−33*256=4, and this cell stores the bit data for the 4th bit in the 33rd codeword. It should be noted that a software process is accomplished by substituting for the i-th codeword the value obtained by shifting (5−j) bits the 1 or 0 bit value expressed by BT(n,m).

Figure 57:
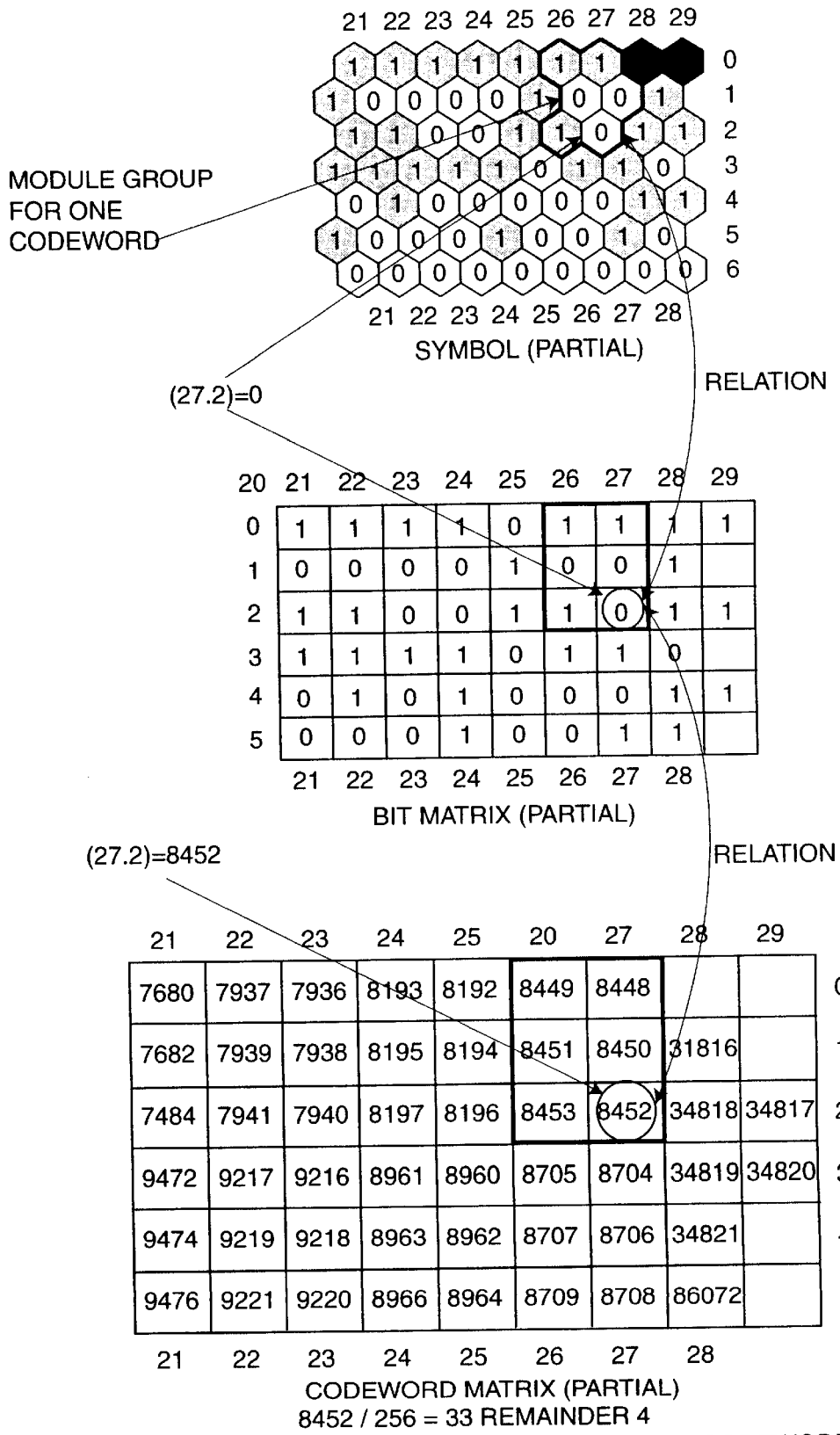
FIG. 57 shows the relationship between the bit data stored to the bit matrix table and the data elements in the codeword matrix table.

FIG. 57 shows the relationship between the bit data stored to the bit matrix table and data elements in the codeword matrix table.

As shown in FIG. 57, the bit data at BT(n,m) is the value of the j-th bit in the i-th codeword calculated from codeword table CT(n,m). For example, BT(27,2)=0, which is the value of the 4th bit in the 33rd codeword.

Next, whether all data modules have been codeword converted is determined (S2503). If all data modules have been converted (S2503 returns Yes), step S2504 is performed. If not (S2503 returns No), steps S2501 and S2502 are repeated until all data modules are converted to codewords.

Bit sequences lost as a result of conversion operations and data loss are then restored to the correct data by an error correction process (S2504). There are also cases in which the error correction process cannot restore the correct data because of the amount of bit sequences lost. It is therefore determined if the correct data was restored by the error correction process (S2505). If the correct data was restored (S2505 returns Yes), all codewords are converted to data characters based on the default character set table (S2506) and the decoding process ends. FIG. 58 shows part of the default character set table.

If the correct data could not be restored (S2505 returns No), an error handling process is run because the MaxiCode symbol could not be recognized (S2507), and the decoding process ends.

A data storage medium according to the present invention stores a computer executable program including the steps of the two-dimensional bar code reading method described above.

A data storage medium according to the present invention can be a Compact Disc, floppy disk, hard disk, magneto-optical disk, Digital Versatile Disc (DVD), magnetic tape, memory card or other computer readable medium.

The present invention provides the following benefits.

The center of the finder pattern of a MaxiCode symbol can be found quickly and easily in the scanned image of a MaxiCode symbol by searching the detection patterns from scan lines crossing the image for a detection pattern that matches a specific reference pattern along a scan line passing through the finder pattern center point. A two-dimensional bar code can thus be easily decoded.

It is also possible to shorten the time required to process a scanned image of a MaxiCode symbol, which is used in this description as exemplary of a two-dimensional bar code symbol, by means of an orientation module search method that detects pixel data matching a color template pattern in the pixel data of the orientation module search range of the scanned image of the bar code symbol, and then finds all orientation modules based on the detected pixel data.

It is also possible to decode a MaxiCode symbol from a scanned image captured at an angle instead of from directly in front by making the equation describing the relationship between the finder pattern of an actual MaxiCode symbol and the finder pattern in a scanned image of a MaxiCode symbol captured from an angle approximate the equation of a circle and an ellipse, and image correcting the scanned image based on this equation.

Furthermore, the distortion correction method of the present invention is suitable for planar distortion in the scanned image of a MaxiCode symbol, and can correct the orientation axes of a distorted scanned image by correcting the angles of the axes so that they pass through the centers of the orientation modules and data modules based on the areas of the black module groups present on the orientation axis passing the finder pattern center point and orientation modules.

It is also possible to correct the location and shape information of modules on the orientation axes of a distorted scanned image based on the areas of the module groups of the same color on the corrected orientation axes, and correct the positions of data modules between orientation axes based on the location and shape information of the modules on the corrected orientation axes.

It is yet also possible to shorten the time needed to decode the scanned image of a MaxiCode symbol, which is used as representative of two-dimensional bar code symbols, by detecting the module position and shape information based on the above-described scanned image correction.

It is yet also possible to shorten the time needed to decode the scanned image of a MaxiCode symbol, which is used as representative of two-dimensional bar code symbols, by means of a data character conversion method that stores bit data from the detected data modules to a bit matrix table, converts the bit data to codewords based on a codeword matrix table, and then converts the bit data to data characters.

A program embodying the steps of the two-dimensional bar code reading method of the present invention can also be written as a software product to a data storage medium, which can be easily distributed and marketed.

It is also possible to provide a two-dimensional bar code reading apparatus having means for accomplishing the two-dimensional bar code reading method of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of reading a two-dimensional bar code symbol having orientation modules and a finder pattern with a center point, the method comprising a data module search step that calculates position and shape information for all modules constituting the bar code symbol by calculating an orientation axis passing through an orientation module and the finder pattern center point in a scanned image of the bar code symbol based on finder pattern position, orientation module position, and orientation module shape information in the scanned image, wherein the data module search step comprises the following steps:

(a) an orientation axis module position calculating step that calculates, based on finder pattern position information and orientation module position information and shape information, position and shape information for a plurality of modules constituting a module group on said orientation axis;

(b) an orientation axis data module bit pattern detecting step that detects a bit pattern of said plural data modules on the orientation axis calculated by the orientation axis module position calculating step;

(c) a between-orientation axis module position calculating step that calculates, based on the position and shape information of the plural modules of the module group on the orientation axis calculated by the orientation axis module position calculating step, position information for a plurality of modules constituting a module group between adjacent orientation axes; and (d) a between-orientation axis data module bit pattern detecting step that detects the bit pattern of the plural data modules present between the orientation axes calculated by the between-orientation axis module position calculating step.

2. The method of claim 1, wherein the orientation axis module position calculating step comprises the following steps:

(a) an orientation axis angle correcting step that corrects the angle of the orientation axis so that the orientation axis passes the center points of the plural modules constituting a module group on the orientation axis;

(b) an orientation axis actual module width correcting step that calculates position information for a plurality of actual modules present on an orientation axis corrected by the orientation axis angle correcting step and based on the calculated position information correcting the module width, which is shape information for the plural actual modules;

(c) an orientation axis candidate module width correcting step that calculates position information for a plurality of candidate modules present on the orientation axis based on actual module position and shape information calculated by the orientation axis actual module width correcting step.

3. The method of claim 2, wherein the orientation axis angle correcting step comprises the following steps:

(a) a first corrected center point calculating step that calculates based on a black module group area containing one or a plurality of contiguous black modules present on the orientation axis, a first corrected center point of a black module closest to the finder pattern in the black module group;

(b) a second corrected center point calculating step that calculates a second corrected black module center point based on the area of a black module group comprising one or a plurality of contiguous black modules including the black module present on a neighboring reserve axis parallel to an orientation axis adjacent to the orientation axis and passing through the first corrected black module center point calculated by the first corrected center point calculating step;

(c) a center point calculating step that calculates a black module center point based on the second corrected black module center point calculated by the second corrected center point calculating step, and the area of a black module group comprising one or a plurality of contiguous black modules including the black module present on an orientation reserve axis passing the finder pattern center point; and (d) an orientation axis correction angle calculating step that calculates a correction angle of an orientation axis passing the finder pattern center point and black module center point calculated by the center point calculating step.

4. The method of claim 2, wherein the orientation axis actual module width correcting step comprises a step that calculates a center point and module width of actual modules constituting a same-color actual module group based on the area of a same-color actual module group comprising one or a plurality of contiguous same-color actual nodules on the same orientation axis.

5. The method of claim 2, wherein the orientation axis candidate module width correcting step comprises the following steps:

(a) a reference orientation axis detecting step that detects a reference orientation axis as the orientation axis having the least correction of all orientation axes;

(b) a step that calculates center points and module widths for a plurality of candidate modules present on an orientation axis based on shape information for the black module farthest from the finder pattern on the reference orientation axis detected by the reference orientation axis detecting step; and (c) a step that calculates center points and module widths for a plurality of candidate modules present on an orientation axis other than the reference orientation axis based on actual module and candidate module positions on the reference orientation axis.

6. The method of claim 1, wherein the bar code symbol encodes data by means of alternating black and white cells.

7. The method of claim 2, wherein the bar code symbol is a MaxiCode symbol.

8. A method of reading a two-dimensional bar code symbol having a finder pattern, the method comprising:

a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:

(a) scanning a scanned image of the bar code symbol in a first scanning direction;

(b) obtaining a first detection pattern by means of the first scanning step;

(c) comparing the first detection pattern obtained by step (b) with a previously stored specific reference pattern;

(d) defining said scan line as a first center line when step (c) determines the first detection pattern matches the specific reference pattern;

(e) scanning the finder pattern in a second scanning direction that is different from the first scanning direction;

(f) obtaining a second detection pattern by means of the second scanning step;

(g) comparing the second detection pattern with the previously stored specific reference pattern;

(h) defining said scan line as a second center line when step (g) determines the second detection pattern matches the specific reference pattern; and (i) setting the intersection of the first center line and the second center line as the center point of the finder pattern.

9. The method of claim 8, wherein the second scanning direction is orthogonal to the first scanning direction.

10. The method of claim 8, wherein the finder pattern consists of plural concentric black circles and white circles, and comparison of the specific reference pattern with the first detection pattern and/or second detection pattern uses a ratio between an edge-to-edge distance between concentric black circles, and an edge-to-edge distance between concentric white circles.

11. The method of claim 8, wherein the bar code symbol encodes data by means of alternating black and white cells.

12. The method of claim 8, wherein the bar code symbol is a MaxiCode symbol.

13. A method of reading a two-dimensional bar code symbol having a finder pattern, the method comprising:

a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:

(a) scanning a scanned image of a the bar code symbol in a first scanning direction;

(b) obtaining a first detection pattern by means of the first scanning step;

(c) comparing the first detection pattern obtained by step (b) with a previously stored specific reference pattern;

(d) setting said scan line as a first center line when step (c) determines the first detection pattern matches the specific reference pattern;

(e) setting the midpoint between the two intersections of the first center line and outside circumference member of the finder pattern as a first center point;

(f) repeating steps (b) to (e) after shifting parallel to the first center line to find plural first center points;

(g) calculating a distribution of said plural first center points to the second scanning direction, which is different from the first scanning direction;

(h) detecting a segment where the distribution to the second scanning direction is highest as a first line segment where the number of plural first center points in the second scanning direction is highest;

(i) scanning in a second scanning direction on a line where the number of plural center points in the second scanning direction is highest;

(j) obtaining a second detection pattern by means of the second scanning step;

(k) comparing the second detection pattern with the previously stored specific reference pattern;

(l) setting said scan line as a second center line when step (k) determines the second detection pattern matches the specific reference pattern; and (m) setting the midpoint between the two intersections of the second center line and outside circumference member of the finder pattern as a second center point;

(n) finding plural second center points by shifting parallel to the second center line direction and repeating steps (j) to (m);

(o) calculating a distribution of said plural second center points to the first scanning direction;

(p) detecting a segment where the distribution to the first scanning direction is highest as a second line segment where the number of plural second center points in the first scanning direction is highest; and (q) setting the finder pattern center point to the intersection of the first line segment and second line segment.

14. The method of claim 13, wherein the second scanning direction is orthogonal to the first scanning direction.

15. The method of claim 13, wherein the finder pattern consists of plural concentric black circles and white circles, and comparison of the specific reference pattern with the first detection pattern and/or second detection pattern uses a ratio between an edge-to-edge distance between concentric black circles, and an edge-to-edge distance between concentric white circles.

16. The method of claim 13, wherein the bar code symbol encodes data by means of alternating black and white cells.

17. The method of claim 13, wherein the bar code symbol is a MaxiCode symbol.

18. A method of reading a two-dimensional bar code symbol having a finder pattern, the method comprising:

a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:

(a) scanning a scanned image of the bar code symbol in a first scanning direction;

(b) obtaining a first detection pattern by means of the first scanning step;

(c) comparing the first detection pattern obtained by step (b) with a previously stored specific reference pattern;

(d) setting the midpoint between the two intersections of the scan line and outside circumference member of the finder pattern as a first center point when step (c) detects a match between the first detection pattern and the specific reference pattern;

(e) finding plural first center points by shifting parallel to the first scanning direction and repeating steps (b) to (d);

(f) scanning the finder pattern in a second scanning direction, which is different from the first scanning direction;

(g) obtaining a second detection pattern by means of the second scanning step;

(h) comparing the second detection pattern with the previously stored specific reference pattern;

(i) setting the midpoint between the two intersections of the scan line and outside circumference member of the finder pattern as a second center point when step (h) detects a match between the second detection pattern and the specific reference pattern;

(j) finding plural second center points by shifting parallel to the second scanning direction and repeating steps (g) to (i);

(k) setting the finder pattern center point to the intersection of a line connecting the plural first center points and a line connecting the plural second center points.

19. The method of claim 18, wherein the second scanning direction is orthogonal to the first scanning direction.

20. The method of claim 18, wherein the finder pattern consists of plural concentric black circles and white circles, and comparison of the specific reference pattern with the first detection pattern and/or second detection pattern uses a ratio between an edge-to-edge distance between concentric black circles, and an edge-to-edge distance between concentric white circles.

21. The method of claim 18, wherein the bar code symbol encodes data by means of alternating black and white cells.

22. The method of claim 18, wherein the bar code symbol is a MaxiCode symbol.

23. A method of reading a two-dimensional bar code symbol having a finder pattern, the method comprising:

a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:

(a) scanning a scanned image of the bar code symbol in a first scanning direction;

(b) obtaining a first detection pattern by means of the first scanning step;

(c) comparing the first detection pattern obtained by step (b) with a previously stored specific reference pattern;

(d) setting a first center line to the scan line from which the first detection pattern was obtained when step (c) detects a match between the first detection pattern and the specific reference pattern;

(e) setting the midpoint between the two intersections of the first center line and outside circumference member of the finder pattern as a first center point;

(f) scanning a second scanning direction different from the first scanning direction through the first center point;

(g) obtaining a second detection pattern by means of the second scanning step;

(h) comparing the second detection pattern with the previously stored specific reference pattern;

(i) setting a second center line to the scan line from which the second detection pattern was obtained when step (h) detects a match between the second detection pattern and the specific reference pattern;

(j) setting the midpoint between the two intersections of the second center line and outside circumference member of the finder pattern as a second center point;

(k) calculating two intersections of the first center line and inside circumference member of the finder pattern, and two intersections of the second center line and inside circumference member of the finder pattern, from the midpoint between two intersections of the second center line and outside circumference member of the finder pattern; and (l) setting a barycenter determined from the two intersections of the first center line and inside circumference member of the finder pattern, and two intersections of the second center line and inside circumference member of the finder pattern, as the finder pattern center point.

24. The method of claim 23, wherein the second scanning direction is orthogonal to the first scanning direction.

25. The method of claim 23, wherein the finder pattern consists of plural concentric black circles and white circles, and comparison of the specific reference pattern with the first detection pattern and/or second detection pattern uses a ratio between an edge-to-edge distance between concentric black circles, and an edge-to-edge distance between concentric white circles.

26. The method of claim 23, wherein the bar code symbol encodes data by means of alternating black and white cells.

27. The method of claim 23, wherein the bar code symbol is a MaxiCode symbol.

28. A method of reading a two-dimensional bar code symbol having a finder pattern, the method comprising:

a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:

(a) comparing a detected black and white pattern of a finder pattern obtained by scanning in the first scanning direction with a specific black and white reference pattern;

(b) comparing a detected black and white pattern of a finder pattern obtained by scanning in the second scanning direction with a specific black and white reference pattern; and (c) obtaining center coordinates of the finder pattern by means of (a) and (b).

29. The method of claim 28, wherein the bar code symbol encodes data by means of alternating black and white cells.

30. The method of claim 28, wherein the bar code symbol is a MaxiCode symbol.

31. A method of reading a two-dimensional bar code symbol, comprising:

a data character conversion step that converts data module bit data to codewords, and converting the converted codewords to specific data characters, by correlating the positions of data modules constituting a data module group in the scanned image of the bar code symbol to specific codewords and specific bit data in the specific codewords based on a specific codeword conversion table, wherein when said specific codeword is an i-th codeword, and said specific bit data in said specific codeword is a j-th, bit of the i-th codeword, the specific codeword conversion table in the data character conversion step is a codeword matrix table of which values CT(n,m) satisfy the following equations:

$i=[CT(n,m)/256]$ $j=CT(n,m)-i*256.$

32. The method of claim 31, wherein data module positions in the data character conversion step are specified by a bit matrix table having elements of a matrix BT(n,m).

33. The method of claim 31, wherein the bar code symbol encodes data by means of alternating black and white cells.

34. The method of claim 31, wherein the bar code symbol is a MaxiCode symbol.

35. An apparatus for reading a two-dimensional bar code symbol, comprising:

a data module search unit that calculates position and shape information for all modules constituting the bar code symbol by calculating an orientation axis passing through an orientation module and finder pattern center point in a scanned image of the bar code symbol based on finder pattern position, orientation module position, and orientation module shape information in the scanned image, wherein the data module search unit comprises:

(a) an orientation axis module position calculating unit for calculating, based on finder pattern position information and orientation module position information and shape information, position and shape information for a plurality of modules constituting a module group on said orientation axis;

(b) an orientation axis data module bit pattern detecting unit for detecting a bit pattern of said plural data modules on the orientation axis calculated by the orientation axis module position calculating unit;

(c) a between-orientation axis module position calculating unit for calculating, based on the position and shape information of the plural modules of the module group on the orientation axis calculated by the orientation axis module position calculating unit, position information for a plurality of modules constituting a module group between adjacent orientation axes; and (d) a between-orientation axis data module bit pattern detecting unit for detecting the bit pattern of the plural data modules present between the orientation axes calculated by the between-orientation axis module position calculating unit.

36. The apparatus of claim 35, wherein the orientation axis module position calculating unit comprises:

(a) an orientation axis angle correcting unit for correcting the angle of the orientation axis so that the orientation axis passes the center points of the plural modules constituting a module group on the orientation axis;

(b) an orientation axis actual module width correcting unit for calculating position information for a plurality of actual modules present on an orientation axis corrected by the orientation axis angle correcting unit and based on the calculated position information correcting the module width, which is shape information for the plural actual modules;

(c) an orientation axis candidate module width correcting unit for calculating position information for a plurality of candidate modules present on the orientation axis based on actual module position and shape information calculated by the orientation axis actual module width correcting unit.

37. The apparatus of claim 36, wherein the orientation axis angle correcting unit comprises:

(a) a first corrected center point calculating unit for calculating, based on a black module group area containing one or a plurality of contiguous black modules present on the orientation axis, a first corrected center point of a black module closest to the finder pattern in the black module group;

(b) a second corrected center point calculating unit for calculating a second corrected black module center point based on the area of a black module group comprising one or a plurality of contiguous black modules including the black module present on a neighboring reserve axis parallel to an orientation axis adjacent to the orientation axis and passing through the first corrected black module center point calculated by the first corrected center point calculating unit;

(c) a center point calculating unit for calculating a black module center point based on the second corrected black module center point calculated by the second corrected center point calculating unit, and the area of a black module group comprising one or a plurality of contiguous black modules including the black module present on an orientation reserve axis passing the finder pattern center point; and (d) an orientation axis correction angle calculating unit for calculating a correction angle of an orientation axis passing the finder pattern center point and black module center point calculated by the center point calculating unit.

38. The apparatus of claim 36, wherein the orientation axis actual module width correcting unit comprises a calculating unit for calculating a center point and module width of actual modules constituting a same color actual module group based on the area of a same-color actual module group comprising one or a plurality of contiguous same-color actual modules on the same orientation axis.

39. The apparatus of claim 36, wherein the orientation axis candidate module width correcting unit comprises:

(a) a reference orientation axis detecting unit for detecting a reference orientation axis as the orientation axis having the least correction of all orientation axes;

(b) a first computing unit for calculating center points and module widths for a plurality of candidate modules present on an orientation axis based on shape information for the black module farthest from the finder pattern on the reference orientation axis detected by the reference orientation axis detecting unit; and (c) a second computing unit for calculating center points and module widths for a plurality of candidate modules present on an orientation axis other than the reference orientation axis based on actual module and candidate module positions on the reference orientation axis.

40. The apparatus of claim 35, wherein the bar code symbol encodes data by means of alternating black and white cells.

41. The apparatus of claim 35, wherein the bar code symbol is a MaxiCode symbol.

42. The apparatus of claim 35, wherein the bar code symbol encodes data by means of alternating black and white cells.

43. The apparatus of claim 35, wherein the bar code symbol is a MaxiCode symbol.

44. A two-dimensional bar code reading apparatus, comprising:

a finder pattern search unit for searching a scanned image of the bar code symbol for a scan line where a detected pattern in a specific scanning direction matches a specified reference pattern, detecting a finder pattern in the scanned bar code symbol image based on plural searched scan lines, and obtaining finder pattern position and shape information, wherein the finder pattern search unit comprises:

(a) a scanning unit for scanning the finder pattern in plural directions;

(b) a pattern detector for detecting a plurality of patterns by means of the scanning unit scanning plural directions;

(c) memory for storing a specific template;

(d) a comparison unit for comparing said plural patterns with each said specific template stored to memory; and (e) a decision unit for setting scan lines of the scanning unit as at least two center lines, and determining tinder pattern center coordinates based on said two center lines.

45. The apparatus of claim 44, wherein the bar code symbol encodes data by means of alternating black and white cells.

46. The apparatus of claim 44, wherein the bar code symbol is a MaxiCode symbol.

47. A two-dimensional bar code reading apparatus, comprising:

a finder pattern search unit for searching a scanned image of the bar code symbol for a scan line where a detected pattern in a specific scanning direction matches a specified reference pattern, detecting a finder pattern in the scanned bar code symbol image based on plural searched scan lines, and obtaining finder pattern position and shape information, wherein the finder pattern search unit comprises:

(a) a storage unit for prestoring a template determined by black and white pattern lengths;

(b) a scanning unit for scanning the finder pattern in first and second scanning directions, and obtaining a black and white pattern;

(c) a comparison unit for comparing black and white patterns of the finder pattern scanned by the scanning unit with said templates previously stored to the storage unit;

(d) a decision unit for setting the first scan line scanned by the scanning unit as a first center line when the comparison unit determines the black and white pattern obtained by scanning in the first scanning direction matches the black and white pattern of the template, setting the second scan line scanned by the scanning unit as a second center line when the comparison unit determines the black and white pattern obtained by scanning in the second scanning direction matches the black and white pattern of the template, and setting the finder pattern center point to the intersection of the first center line and second center line.

48. The apparatus of claim 47, wherein the bar code symbol encodes data by means of alternating black and white cells.

49. The apparatus of claim 47, wherein the bar code symbol is a MaxiCode symbol.

50. The apparatus of claim 51, wherein data module positions in the data character conversion unit are specified by a bit matrix table having elements of a matrix BT(n,nz).

51. An apparatus for reading a two-dimensional bar code symbol, comprising:

a data character conversion unit for converting data module bit data to codewords, and converting the converted codewords to specific data characters, by correlating the positions of data modules constituting a data module group in the scanned image of the bar code symbol to specific codewords and specific bit data in the specific codewords based on a specific codeword conversion table, wherein when said specific codeword is an i-th codeword, and said specific bit data in said specific codeword is a j-th bit of the i-th codeword, the specific codeword conversion table in the data character conversion unit is a codeword matrix table of which values CT(n,m) satisfy the following equations:

$i=[CT\ (n,m)/256]$ $j=CT\ (n,m)-i*256.$

52. A machine-readable data storage medium carrying a program for implementing steps of a method of reading a two-dimensional bar code symbol having orientation modules and a finder pattern with a center point, the method comprising:
 a data module search step that calculates position and shape information for all modules constituting the bar code symbol by calculating an orientation axis passing through an orientation module and the finder pattern center point in a scanned image of the bar code symbol based on finder pattern position, orientation module position, and orientation module shape information in the scanned image, wherein the data module search step comprises the following steps:
  (a) an orientation axis module position calculating step that calculates, based on finder pattern position information and orientation module position information and shape information, position and shape information for a plurality of modules constituting a module group on said orientation axis;
  (b) an orientation axis data module bit pattern detecting step that detects a bit pattern of said plural data modules on the orientation axis calculated by the orientation axis module position calculating step;
  (c) a between-orientation axis module position calculating step that calculates, based on the position and shape information of the plural modules of the module group on the orientation axis calculated by the orientation axis module position calculating step, position information for a plurality of modules constituting a module group between adjacent orientation axes; and
  (d) a between-orientation axis data module bit pattern detecting step that detects the bit pattern of the plural data modules present between the orientation axes calculated by the between-orientation axis module position calculating step.

53. The data storage medium of claim 52, wherein the being a Compact Disc, floppy disk, hard disk, magneto-optical disk, Digital Versatile Disc (DVD), magnetic tape, or memory card.

54. A machine-readable data storage medium carrying a program for implementing steps of a method of reading a two-dimensional bar code symbol having a finder pattern, the method comprising:
 a finder pattern search that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:
  (a) scanning a scanned image of the bar code symbol in a first scanning direction;
  (b) obtaining a first detection pattern by means of the first scanning step;
  (c) comparing the first detection pattern obtained by step (b) with a previously stored specific reference pattern;
  (d) defining said scan line as a first center line when step (c) determines the first detection pattern matches the specific reference pattern;
  (e) scanning the finder pattern in a second scanning direction that is different from the first scanning direction;
  (f) obtaining a second detection pattern by means of the second scanning step;
  (g) comparing the second detection pattern with the previously stored specific reference pattern;
  (h) defining said scan line as a second center line when step (g) determines the second detection pattern matches the specific reference pattern; and
  (i) setting the intersection of the first center line and the second center line as the center point of the finder pattern.

55. The data storage medium of claim 54, wherein the being a Compact Disc, floppy disk, hard disk, magneto-optical disk, Digital Versatile Disc (DVD), magnetic tape, or memory card.

56. A machine-readable data storage medium carrying a program for implementing steps of a method of reading a two-dimensional bar code symbol having a finder pattern, the method comprising:
 a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:
  (a) scanning a scanned image of a the bar code symbol in a first scanning direction;
  (b) obtaining a first detection pattern by means of the first scanning step;
  (c) comparing the first detection pattern obtained by step (b) with a previously stored specific reference pattern;
  (d) setting said scan line as a first center line when step (c) determines the first detection pattern matches the specific reference pattern;
  (e) setting the midpoint between the two intersections of the first center line and outside circumference member of the finder pattern as a first center point;
  (f) repeating steps (b) to (e) after shifting parallel to the first center line to find plural first center points;
  (g) calculating a distribution of said plural first center points to the second scanning direction, which is different from the first scanning direction;
  (h) detecting a segment where the distribution to the second scanning direction is highest as a first line segment where the number of plural first center points in the second scanning direction is highest;
  (i) scanning in a second scanning direction on a line where the number of plural center points in the second scanning direction is highest;
  (j) obtaining a second detection pattern by means of the second scanning step;
  (k) comparing the second detection pattern with the previously stored specific reference pattern;
  (l) setting said scan line as a second center line when step (k) determines the second detection pattern matches the specific reference pattern; and (m) setting the midpoint between the two intersections of the second center line and outside circumference member of the finder pattern as a second center point;
(n) finding plural second center points by shifting parallel to the second center line direction and repeating steps (j) to (m);
(o) calculating a distribution of said plural second center points to the first scanning direction;
(p) detecting a segment where the distribution to the first scanning direction is highest as a second line segment where the number of plural second center points in the first scanning direction is highest; and
(q) setting the finder pattern center point to the intersection of the first line segment and second line segment.

57. The data storage medium of claim 56, wherein the being a Compact Disc, floppy disk, bard disk, magneto-optical disk, Digital Versatile Disc (DVD), magnetic tape, or memory card.

58. A machine-readable data storage medium carrying a program for implementing steps of a method of reading a two-dimensional bar code symbol having a finder pattern, the method comprising:
a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:
(a) scanning a scanned image of the bar code symbol in a first scanning direction;
(b) obtaining a first detection pattern by means of the first scanning step;
(c) comparing the first detection pattern obtained by step (b) with a previously stored specific reference pattern;
(d) setting the midpoint between the two intersections of the scan line and outside circumference member of the finder pattern as a first center point when step (c) detects a match between the first detection pattern and the specific reference pattern;
(e) finding plural first center points by shifting parallel to the first scanning direction and repeating steps (b) to (d);
(f) scanning the finder pattern in a second scanning direction, which is different from the first scanning direction;
(g) obtaining a second detection pattern by means of the second scanning step;
(h) comparing the second detection pattern with the previously stored specific reference pattern;
(i) setting the midpoint between the two intersections of the scan line and outside circumference member of the finder pattern as a second center point when step (h) detects a match between the second detection pattern and the specific reference pattern;
(j) finding plural second center points by shifting parallel to the second scanning direction and repeating steps (g) to (i);
(k) setting the finder pattern center point to the intersection of a line connecting the plural first center points and a line connecting the plural second center points.

59. The data storage medium of claim 58, wherein the being a Compact Disc, floppy disk, hard disk, magneto-optical disk, Digital Versatile Disc (DVD), magnetic tape, or memory card.

60. A machine-readable data storage medium carrying a program for implementing steps of a method of reading a two-dimensional bar code symbol having a finder pattern, the method comprising:
a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:
(a) scanning a scanned image of the bar code symbol in a first scanning direction;
(b) obtaining a first detection pattern by means of the first scanning step;
(c) comparing the first detection pattern obtained by step (b) with a previously stored specific reference pattern;
(d) setting a first center line to the scan line from which the first detection pattern was obtained when step (c) detects a match between the first detection pattern and the specific reference pattern;
(e) setting the midpoint between the two intersections of the first center line and outside circumference member of the finder pattern as a first center point;
(f) scanning a second scanning direction different from the first scanning direction through the first center point;
(g) obtaining a second detection pattern by means of the second scanning step;
(h) comparing the second detection pattern with the previously stored specific reference pattern;
(i) setting a second center line to the scan line from which the second detection pattern was obtained when step (h) detects a match between the second detection pattern and the specific reference pattern;
(j) setting the midpoint between the two intersections of the second center line and outside circumference member of the finder pattern as a second center point;
(k) calculating two intersections of the first center line and inside circumference member of the finder pattern, and two intersections of the second center line and inside circumference member of the finder pattern, from the midpoint between two intersections of the second center line and outside circumference member of the finder pattern; and
(l) setting a barycenter determined from the two intersections of the first center line and inside circumference member of the finder pattern, and two intersections of the second center line and inside circumference member of the finder pattern, as the finder pattern center point.

61. The data storage medium of claim 60, wherein the being a Compact Disc, floppy disk, hard disk, magneto-optical disk, Digital Versatile Disc (DVD), magnetic tape, or memory card.

62. A machine-readable data storage medium carrying a program for implementing steps of a method of reading a two-dimensional bar code symbol having a finder pattern, the method comprising:
a finder pattern search step that searches a scanned image of the bar code symbol for a scan line where a detected pattern in a specific scanning direction matches a specified reference pattern, detecting the finder pattern in the scanned bar code symbol image based on plural searched scan lines, and obtaining finder pattern position and shape information, wherein the finder pattern search step comprises:
(a) comparing a detected black and white pattern of a finder pattern obtained by scanning in the first scanning direction with a specific black and white reference pattern;
(b) comparing a detected black and white pattern of a finder pattern obtained by scanning in the second scanning direction with a specific black and white reference pattern; and
(c) obtaining center coordinates of the finder pattern by means of (a) and (b).

63. The data storage medium of claim 62, wherein the being a Compact Disc, floppy disk, hard disk, magneto-optical disk, Digital Versatile Disc (DVD), magnetic tape, or memory card.

64. A machine-readable data storage medium carrying a program for implementing steps of a method of reading a two-dimensional bar code symbol, comprising:
a data character conversion step that converts data module bit data to codewords, and converting the converted codewords to specific data characters, by correlating the positions of data modules constituting a data module group in the scanned image of the bar code symbol to specific codewords and specific bit data in the specific codewords based on a specific codeword conversion table, wherein when said specific codeword is an i-th codeword, and said specific bit data in said specific codeword is a j-th bit of the i-th codeword, the specific codeword conversion table in the data character conversion step is a codeword matrix table of which values CT(n,m) satisfy the following equations:

$$i=[CT(n,m)/256]$$

$$j=CT(n,m)-i*256.$$

65. The data storage medium of claim 64, wherein the being a Compact Disc, floppy disk, hard disk, magneto-optical disk, Digital Versatile Disc (DVD), magnetic tape, or memory card.

* * * * *